(12) United States Patent
Mori et al.

(10) Patent No.: US 7,953,309 B2
(45) Date of Patent: May 31, 2011

(54) OPTICAL FIBER AND PRODUCTION METHOD THEREOF

(75) Inventors: Atsushi Mori, Atsugi (JP); Masao Kato, Atsugi (JP); Kouji Enbutsu, Atsugi (JP); Shinichi Aozasa, Atsugi (JP); Kiyoshi Oikawa, Atsugi (JP); Takashi Kurihara, Atsugi (JP); Kazuo Fujiura, Atsugi (JP); Makoto Shimizu, Mito (JP); Kouji Shikano, Hakodate (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 414 days.

(21) Appl. No.: 12/261,815

(22) Filed: Oct. 30, 2008

(65) Prior Publication Data

US 2009/0060438 A1   Mar. 5, 2009

Related U.S. Application Data

(62) Division of application No. 10/537,179, filed as application No. PCT/JP2004/011625 on Aug. 12, 2004, now Pat. No. 7,677,059.

(30) Foreign Application Priority Data

Aug. 13, 2003 (JP) ................. 2003-293141
Feb. 20, 2004 (JP) ................. 2004-045500
Jul. 9, 2004 (JP) ................. 2004-202954
Jul. 14, 2004 (JP) ................. 2004-207728

(51) Int. Cl.
*G02B 6/032* (2006.01)
*H04J 14/02* (2006.01)
*C03B 37/022* (2006.01)

(52) U.S. Cl. ........ 385/125; 385/122; 385/126; 385/123; 385/141; 398/81; 65/393; 65/412

(58) Field of Classification Search .................. 385/125, 385/126, 127, 128, 123, 141, 142, 144, 122; 65/393, 412; 398/81
See application file for complete search history.

(56) References Cited

U.S. PATENT DOCUMENTS 6,097,870 A   8/2000 Ranka et al.
(Continued)

FOREIGN PATENT DOCUMENTS

EP   0652184   5/1995
(Continued)

OTHER PUBLICATIONS

Supplementary European Search Report from corresponding European Patent Application No. 04771600.6 dated Sep. 24, 2010.
(Continued)

*Primary Examiner* — Brian M Healy
(74) *Attorney, Agent, or Firm* — Workman Nydegger

(57) ABSTRACT

An optical fiber, which has a zero-material dispersion wavelength equal to or greater than 2 μm, and a high nonlinear susceptibility $\chi^3$ equal to or greater than $1 \times 10^{-12}$ esu, and uses tellurite glass having sufficient thermal stability for processing into a low loss fiber, employs a PCF structure or HF structure having strong confinement into a core region. This enables light to propagate at a low loss. The size and geometry of air holes formed in the core region, and the spacing between adjacent air holes make it possible to control the zero dispersion wavelength within an optical telecommunication window (1.2-1.7 μm), and to achieve large nonlinearity with a nonlinear coefficient γ equal to or greater than 500 $W^{-1}$ $km^{-1}$.

18 Claims, 73 Drawing Sheets

U.S. PATENT DOCUMENTS

| | | | | |
|---|---|---|---|---|
| 6,256,440 | B1 * | 7/2001 | Kato et al. | 385/123 |
| 6,356,387 | B1 | 3/2002 | Ohishi et al. | |
| 6,404,966 | B1 | 6/2002 | Kawanishi et al. | |
| 6,487,353 | B2 * | 11/2002 | Kato et al. | 385/127 |
| 6,684,016 | B2 * | 1/2004 | Kim et al. | 385/123 |
| 7,440,672 | B2 * | 10/2008 | Seo et al. | 385/142 |
| 7,677,059 | B2 * | 3/2010 | Mori et al. | 65/393 |
| 2003/0161599 | A1 | 8/2003 | Broderick et al. | |

FOREIGN PATENT DOCUMENTS

| | | |
|---|---|---|
| EP | 1 285 891 A1 | 2/2003 |
| JP | 11-236240 | 8/1999 |
| JP | 2000-035521 | 2/2000 |
| JP | 2000-356719 | 12/2000 |
| JP | 2002-293562 | 10/2002 |
| JP | 2003-149464 | 5/2003 |
| WO | WO 99/00685 | 1/1999 |
| WO | WO 02/14946 A1 | 2/2002 |
| WO | 02/072489 A2 | 9/2002 |
| WO | WO 02/095460 A1 | 11/2002 |

OTHER PUBLICATIONS

Mori A et al., "Low noise broadband tellurite-based Er3+-doped fibre amplifiers," Electronics Letters vol. 34, No. 9, Apr. 30, 1998.

Atsushi Mori et al., *1.5 μm Broadband Amplification by Tellurite-Based EDFAs*, Optical Fiber Communication Conference and Exhibit 1997, vol. 6, Feb. 16-21, 1997, PD1-4

Shojiroh Kawakami et al., *Optical Fibers and Fiber-type Devices*, Baifukan, Inc., Advanced Electronic Series, p. 97, with English translation.

A. Bjarklev et al., *Photonic Crystal Fibres—The State-of-the-Art*, 28th European Conference on Optical Communication, Sep. 8-12, 2002, vol. 1, Holey Fibers Symposium 1.1.

Eric S. Hu et al., *Design of Highly-Nonlinear Tellurite Fibers with Zero Disperson Near 1550 nm*, 28th European Conference on Optical Communication, Sep. 8-12, 2002, vol. 2, Nonlinearities—Parametric Amplifiers 3.2.3.

Atsushi Mori, et al., *Broadband Amplification Characteristics of Tellurite-Based EDFAs*, 11th International Conference on Integrated Optics and Optical Fibre Communications, Sep. 22-25, 1997, Paper We2C.4, pp. 135-138.

Se-Hoon Kim et al., *Linear and Nonlinear Optical Properties of $TeO_2$ Glass*, Journal of the American Ceramic Society, vol. 76, No. 10, 1993, pp. 2486-2490.

M.J. Gander et al., *Experimental Measurement of Group Velocity Dispersion in Photonic Crystal Fibre*, Electronic Letters, vol. 35, No. 1, Jan. 7, 1999, pp. 63-64.

T.A. Birks et al., *Endlessly Single-Mode Photonic Crystal Fiber*, Optics Letters, vol. 22, No. 13, Jul. 1, 1997, pp. 961-963.

A. Mori et al., *Ultra-Wide-Band Tellurite-Based Fiber Raman Amplifier*, Journal of Lightwave Technology, vol. 21, No. 2, May 2003, pp. 1300-1306.

P. Petropoulos et al., *Solution-self-frequency-shift Effects and Pulse Compression in an Anomalously Dispersive High Nonlinearity lead Silicate Holey Fiber*, Optical Fiber Communication Conference & Exposition, Mar. 23-29, 2003, PD3-1-3-3.

V. V. Ravi Kanth Kumar et al., *Tellurite Glass Photonic Crystal Fiber*, ECOC-IOOC 2003, Sep. 21-2, 2003, pp. 38-39.

Gorachand Ghosh, *Sellmeier Coefficients and Chromatic Dispersions for Some Tellurite Glasses*, Journal of the American Ceramic Society, vol. 78, No. 10, 1995, pp. 2828-2830.

T.A. Birks, et al., *Dispersion Compensation Using Single-Material Fibers*, IEEE Photonics Technology Letters, vol. 11, No. 6, Jun. 1999, pp. 674-676.

A. Mori et al., *Ultra-wideband Tellurite-based Raman Fibre Amplifier*, Electronics Letters, vol. 37, No. 24, Nov. 22, 2001, pp. 1442-1443.

Govind P. Agrawal, *Nonlinear Fiber Optics*, Second Edition, Academic Press, 1995, pp. 42-43.

Ning Guan et al., *Analysis of Field Confined Holey Fibers Based on Boundary Element Method*, The Institute of Electronics, Information, and Communication Engineers, Technical Report of IEICE, OFT2002-11, 2002-05, pp. 9-14, with English translation.

Ning Guan et al., *Characteristics of Field Confined Holey Fiber Analyzed by Boundary Element Method*, Optical Fiber Communications, Mar. 21, 2002, pp. 525-527.

J.C. Knight et al., *Two-Dimensional Photonic Crystal Material in Fibre Form*, Conference on Lasers and Electro-optics, Sep. 8-13, 1996, pp. 75.

Office action dated Sep. 16, 2010 from corresponding Canadian Patent Application No. 2643338.

Onishi, Masashi, "New nonlinear fibers with application to amplifiers," Optical Communications R&D Laboratories, Feb. 23-27, 2004.

* cited by examiner

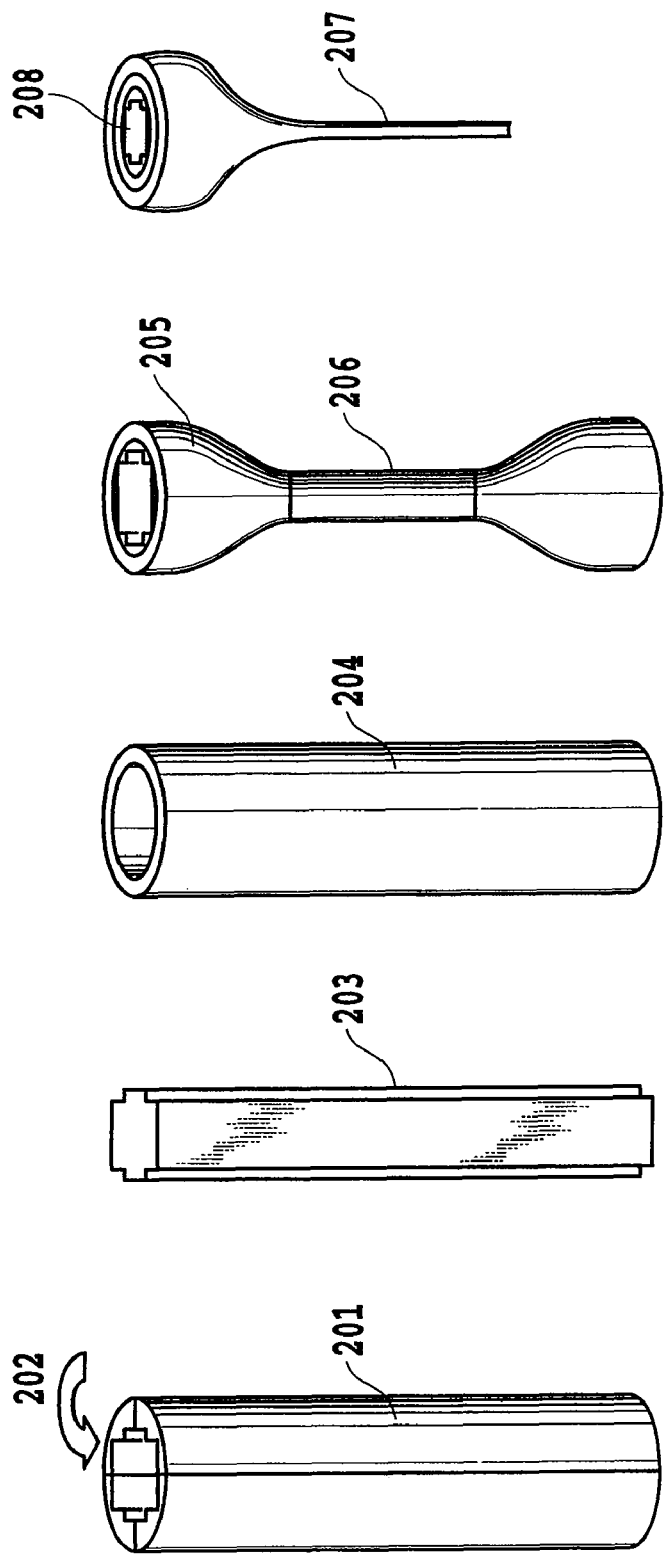

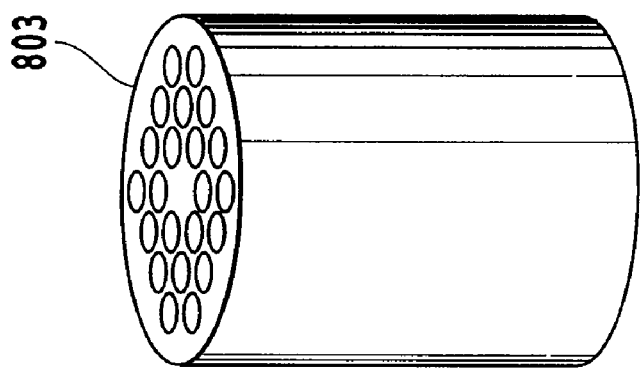
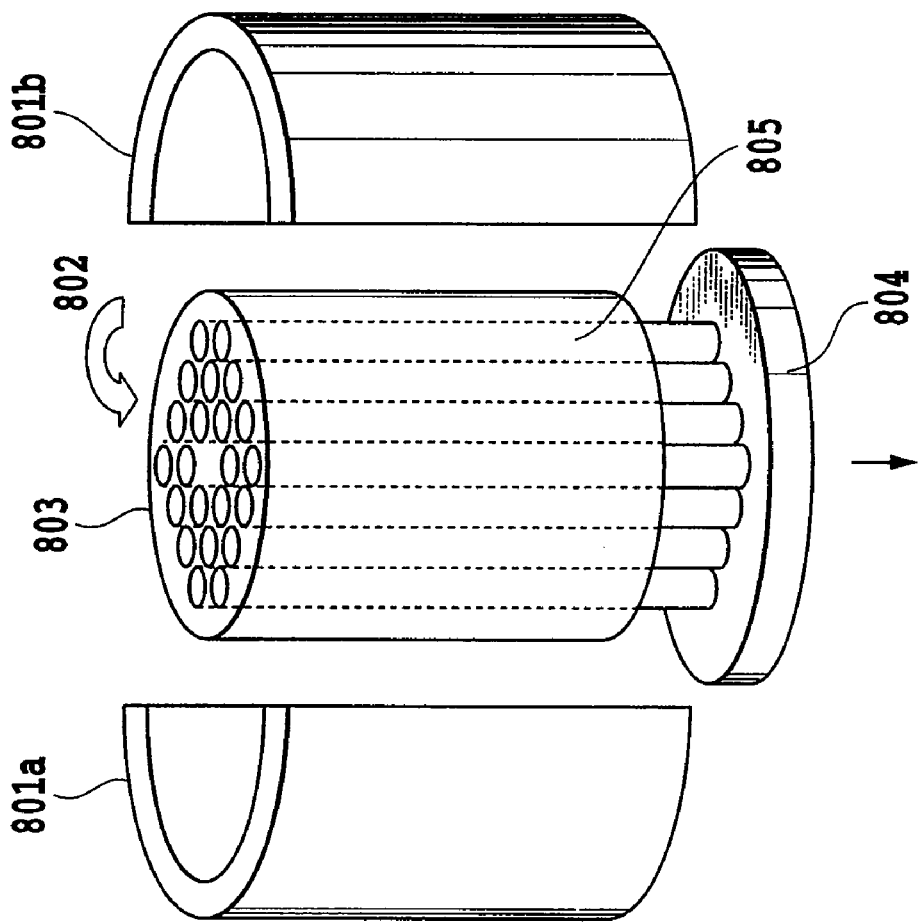
FIG.35B
FIG.35A

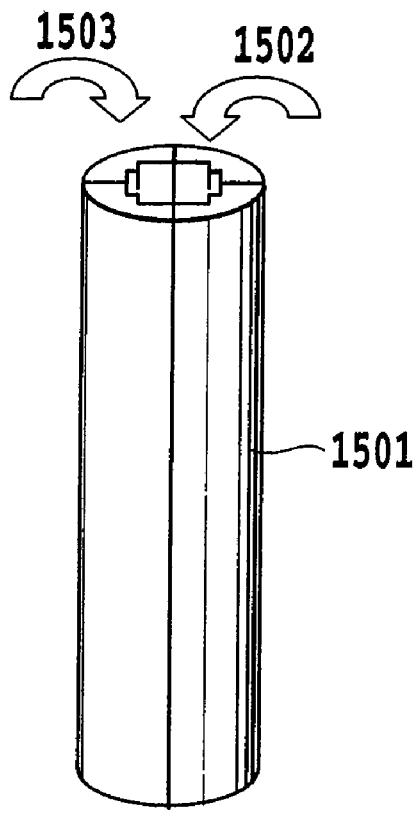 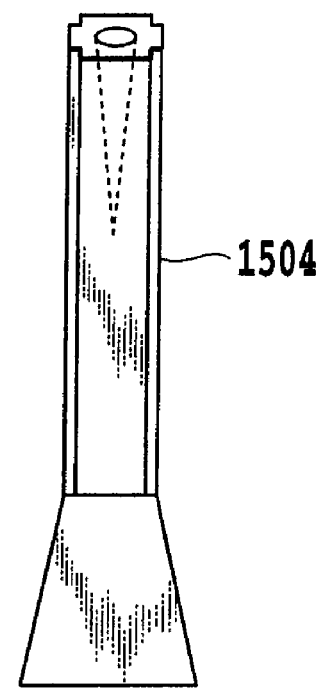
FIG.39A  FIG.39B

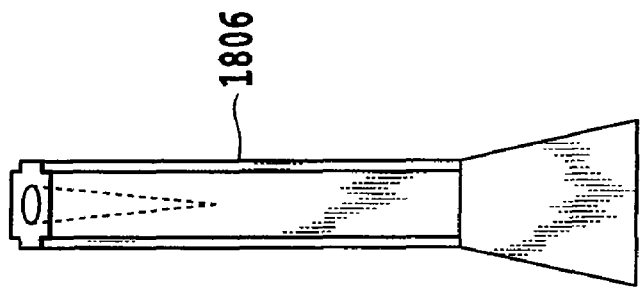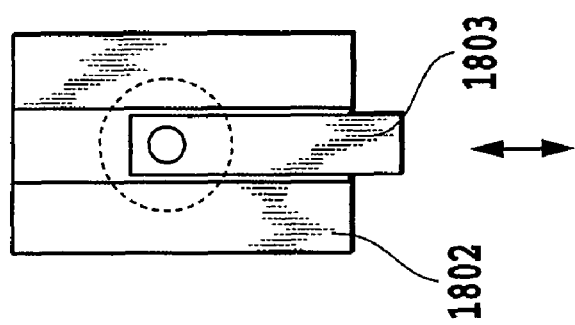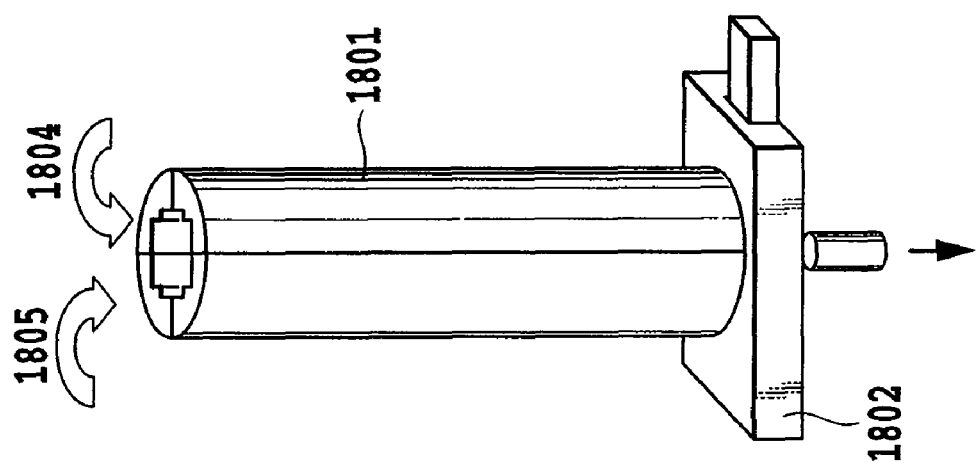
FIG.43C
FIG.43B
FIG.43A

OPTICAL FIBER AND PRODUCTION METHOD THEREOF

CROSS-REFERENCE TO RELATED APPLICATIONS

This application is a divisional of U.S. patent application Ser. No. 10/537,179, filed Jun. 1, 2005, which claims priority to Japanese Patent Application Nos. 2003-293141 filed Aug. 13, 2003, 2004-045500 filed Feb. 20, 2004, 2004-202954 filed Jul. 14, 2004, 2004-207728 filed Jul. 14, 2004 and PCT/JP04/11625 filed Aug. 12, 2004, the contents of which are incorporated herein by specific reference.

BACKGROUND OF THE INVENTION

1. The Field of the Invention

The present invention relates to a tellurite glass optical fiber and its fabrication method, the optical fiber having its zero dispersion wavelength controlled in an optical telecommunication window and having high nonlinearity. More specifically, the present invention relates to an optical fiber and its fabrication method, the optical fiber having its zero dispersion wavelength in a 1.2-1.7 µm band, an optical telecommunication window, which is implemented by designing the refractive index, structure and material of the tellurite glass fiber.

2. The Relevant Technology

Recently, studies of increasing capacity of optical communication systems have been made because of the explosive growth in communication demand due to a rapid proliferation of the Internet, and to the demand for cost reduction of optical communication systems. In addition to time division multiplexing transmission systems which have been studied as means for increasing the capacity, wavelength division multiplexing (WDM) transmission systems, which transmit signal lights with different wavelengths by multiplexing them onto a single optical fiber, have been developed and spread at an increasingly fast pace. The WDM transmission systems can multiplex signals with different modulation schemes, and expand the systems using new wavelengths, thereby being able to construct more flexible optical communication systems.

To expand the scale and to improve the functions of a WDM transmission network more flexibly, functional optical devices such as wavelength conversion devices, high-speed optical switches and supercontinuum lightwave sources are essential. In the development of the functional optical devices, nonlinear optical devices have been studied intensively which utilize the nonlinear effect in optical fibers.

The amount of production of the nonlinear effect in an optical fiber is proportional to a nonlinear optical coefficient $\gamma$. The nonlinear optical coefficient $\gamma$ has the following relationship between an effective core cross sectional area $A_{eff}$ and a nonlinear refractive index $n_2$.

$$\gamma \propto n_2/A_{eff}$$

Accordingly, to achieve a large nonlinearity, it is necessary to use an optical material with a large nonlinear refractive index $n_2$ and to make $A_{eff}$ small. Here, the effective core cross sectional area $A_{eff}$ is given by the following expression (for example, see non-patent document 1).

$$A_{eff} = \frac{\left(\int_{-\infty}^{\infty}\int_{-\infty}^{\infty} |F(x,y)|^2 dxdy\right)^2}{\int_{-\infty}^{\infty}\int_{-\infty}^{\infty} |F(x,y)|^4 dxdy}$$

Many of the silica glass nonlinear optical fibers currently reported increase the nonlinear refractive index of the silica glass itself by doping germanium or the like to the core to increase the nonlinearity, and decrease the effective core cross sectional area by increasing the relative refractive-index difference by doping fluorine to the cladding. In addition, to produce the nonlinear effect at high efficiency in the optical telecommunication window, the zero dispersion wavelength of the optical fibers must be set at 1.2 µm-1.7 µm to fulfill the phase matching conditions.

As for the silica fiber, however, its zero-material dispersion wavelength is about 1.2 µm, and it is difficult to shift the zero-material dispersion wavelength greatly by a dopant. Thus, a method is used which brings the wavelength dispersion value at the 1.55 µm band close to zero by optimizing the structural parameters of the optical fiber (see non-patent document 2, for example).

On the other hand, optical fibers called photonic crystal fiber (abbreviated to PCF from now on) or holy fiber (abbreviated to HF from now on) are now reported which mainly use silica glass and have many air holes formed in the longitudinal direction inside the silica fiber intentionally (see non-patent document 3, for example).

Employing the fiber structure having such air holes can provide a variety of characteristics that cannot be achieved by optical fibers with a conventional core-cladding structure, and hence applications to optical fibers with high nonlinearity are expected.

However, a silica based PCF or HF having a zero dispersion wavelength of 1.2 µm-1.7 µm and high nonlinearity has not yet been implemented. In addition, although the silica glass is superior in the transparency, since its nonlinearity is not so large, it generally lengthens the interaction length to ensure the interaction length needed for the nonlinear effect. For example, long optical fibers of several hundred meters are used sometimes. Thus, realizing more compact nonlinear optical devices with higher efficiency have been much needed which uses optical materials with higher nonlinearity.

Recently, on the other hand, technology development efforts have been conducted for applying tellurite EDFAs (Erbium-Doped Fiber Amplifiers) to an optical communication field. The tellurite refers to tellurite based glass that is predominantly composed of $TeO_2$. The tellurite EDFA, which consists of a erbium-doped tellurite fiber formed by doping erbium to tellurite based glass, is an amplifier that amplifies light by guiding the light wave through the optical fiber by several tens of meters. Using the tellurite EDFA enables the lumped amplification of the wavelength band from 1.53 µm to 1.61 µm which is twice or more wider than the wavelength band from 1.53 µm to 1.56 µm that can be amplified by a conventional silica based EDFA or fluoride EDFA (see non-patent document 1). Furthermore, using the tellurite EDFA enables the fabrication of amplifiers at a wavelength in the 1.6 µm band (see non-patent document 4). Accordingly, the tellurite EDFAs attract attention to be EDFAs for future ultra large capacity WDM systems.

As shown in FIG. 1, the cross section of an optical fiber 4 for an optical amplifier composed of conventional tellurite glass includes a circular core 1 placed at its center, a cladding 2 covering the core's surroundings concentrically, and a jacket 3 further cloaking the cladding's surroundings concentrically. FIG. 2 shows a refractive-index profile of the optical fiber 4. Assume that the difference between the refractive index of the core 1 and the refractive index of the cladding 2 is Δ1, the difference between the refractive index of the core 1 and the refractive index of the jacket 3 is Δ3, and the difference between the refractive index of the cladding 2 and the refractive index of the jacket 3 is Δ2, then Δ1 is much greater than Δ2, thereby strongly confining the light within the core 1.

In the optical fiber 4, the core 1 is doped with a dopant so that the refractive index of the core 1 is sufficiently greater than the refractive index of the cladding 2. Thus, a light beam travels through the core 1 with carrying out total reflection at the interface between the core 1 and cladding 2. In addition, the dispersion can be controlled to some extent by varying the refractive index of the core 1 and the diameter of core 1. However, the single mode condition is not met when the diameter of the core 1 is increased. This results in a multi-mode optical fiber having a plurality of modes, which deteriorates the transmission characteristics. In contrast, when the diameter of the core 1 is decreased, matching of connection with other devices cannot be made. For these reasons, it is impossible for the conventional tellurite glass optical fiber to establish the control range of the dispersion.

Since the tellurite glass has large third order nonlinearity (see, non-patent document 5), it is expected to apply the tellurite glass to such as pulse compression, optical parametric amplification (OPA), and third harmonic generation (THG). Here, the wavelength at which the material dispersion value of the tellurite glass becomes zero is located at a wavelength band longer than 2 μm.

The wavelength dispersion value of a high NA (Numerical Aperture) fiber used for an optical amplifier at 1.55 μm band is usually of the order of −100 ps/km/nm. Accordingly, the wavelength dispersion value becomes a large value of the order of −1 ps/nm even when a short optical fiber of about 10 m is used.

To apply the optical fiber to a long distance, or to high-speed wavelength division multiplexing transmission, it is necessary to bring the wavelength dispersion value of the optical fiber as close to zero as possible. In contrast, the zero dispersion wavelength of the tellurite glass optical fiber is at the wavelength band beyond 2 μm as mentioned above. Accordingly, the tellurite glass optical fiber cannot make the wavelength dispersion value zero at the 1.55 μm band even if the optimum technique based on the well-known structural dispersion is used which is applied to silica fibers.

Therefore it is difficult to implement the foregoing application in the present optical fiber telecommunication window by utilizing the high nonlinearity of the tellurite glass.

The above-mentioned PCF (or HF) is divided into two types according to the waveguide principle. One of them is a photonic bandgap PCF that confines a light beam by a photonic bandgap. The PCF has a structure including a periodic air hole disposition and a uniform air hole size. The other of them is a refractive index waveguide PCF that confines a light beam by the total reflection achieved by effective refractive index of a medium having air holes. The refractive index waveguide PCF has a structure that does not necessarily have the periodic air hole disposition or the uniform air hole size.

Such PCF or HF can make the refractive index difference greater than the conventional optical fiber by an order of magnitude, thereby being able to achieve large structural dispersion. Because of the structural dispersion, the silica based PCF or HF has its zero dispersion wavelength shifted to a shorter wavelength side. M. J. Gander et al. empirically measured dispersion characteristics of a silica glass optical fiber consisting of a core without air holes and a cladding having air holes disposed hexagonally, and disclosed the results in the non-patent document 6. According to the document, the dispersion value at the 813 nm band was about −77 ps/km/nm. In addition, Birks et al. calculate the dispersion of a PCF, an optical fiber composed of a single material, and advocate the effect of the dispersion compensation of the PCF in the non-patent document 7. Thus, the PCF structure or HF structure is expected to be one of the dispersion compensation methods of tellurite glass optical fibers.

N. G. R. Broderick et al. disclosed fibers with a PCF structure or HF structure using multi-component glass in the patent document 1. The document refers to the tellurite glass as an example of the multi-component glass, and shows that it is a composition of components selected from $Na_2O$, $Li_2O$, $Al_2O_3$, CaO, $Ga_2O_3$, $GeO_2$, $As_2O_3$, $SrO_2$, $Y_2O_3$, $Sb_2O_5$, $In_2O_3$, ZnO, BaO, $La_2O_3$, $TeO_2$ and $TiO_2$. However, the patent document 1 does not refer to the thermal stability or nonlinear characteristics of the glass or to the dispersion of the tellurite fiber.

E. S. Hu et al. designed a PCF structure or HF structure using the tellurite glass, and disclosed fibers that shift the zero dispersion wavelength to 1.55 μm in the non-patent document 8. The document discloses that three different PCF structures or HF structures were formed using tellurite glass with a zero-material dispersion wavelength of 1.7 μm, and that each structure was able to shift the zero dispersion wavelength to 1.55 μm. As for the fibers disclosed in the non-patent document 8, however, since the tellurite glass used have low nonlinear susceptibility, and the zero-material dispersion wavelength is 1.7 μm, the optical confinement within the core region is insufficient, and hence it is impossible to obtain sufficiently large nonlinearity (the nonlinear coefficient γ reported was 260 $W^{-1}$ $km^{-1}$ at the maximum).

The tellurite glass has large third order nonlinearity. Accordingly, systems utilizing optical fibers composed of the tellurite glass having the high nonlinearity have been studied. For example, as shown in FIG. 3, it has been proposed to utilize an optical fiber 8, which has a core 5 and a cladding 6 composed of tellurite glass, for optical amplification such as a Raman amplifier (see non-patent document 9, for example).

In addition, the limit at which the gain is achieved on the longer wavelength side of the tellurite EDFA is increased by 7-9 nm compared with a silica based EDFA or fluoride EDFA. This enables an amplifier at a 1.6 μm band wavelength which cannot be utilized conventionally (see non-patent document 4, for example). Consequently, the tellurite EDFAs attract attention as EDFAs in the future super large capacity WDM transmission systems.

Fibers using the tellurite glass have been applied to $Er^{3+}$-doped fiber amplifiers or Raman amplifiers, and implement wideband amplifiers (see non-patent document 1 and non-patent document 8). The tellurite glass has nonlinear effect 10 or more times greater than that of the silica glass, and at the same time implements low loss fibers with a loss of 20 dB/km in the application to the Raman amplifier. Thus, the tellurite glass has wideband optical amplification characteristics and high transparency. In addition, the tellurite glass has large optical nonlinear susceptibility $\chi^3$ (see non-patent document 5, for example). Accordingly, nonlinear devices are expected which are more compact and have higher efficiency than ever.

However, it is difficult for the tellurite glass optical fibers to satisfy the phase matching condition between the pumping light and the 1.55 μm band signal light, which is the optical telecommunication window, because the wavelength at which the material dispersion becomes zero is located in a wavelength band longer than 2 μm, thereby making it difficult to utilize the nonlinearity positively. For example, the tellurite glass optical fibers used for optical amplifiers have a wavelength dispersion value of about −100 ps/km/nm at the wavelength 1.55 μm.

A dispersion-shifted optical fiber or dispersion compensation optical fiber controls the dispersion by increasing the relative refractive-index difference between the core and the cladding by applying the structure of the conventional optical fiber. Applying the method to the tellurite glass optical fiber, however, causes the zero dispersion wavelength to be further shifted to a longer wavelength side. Accordingly, it is very difficult for the tellurite glass optical fiber to implement the zero dispersion at the 1.55 μm band which is the optical telecommunication window. As a result, a communication system cannot be implemented which utilizes the optical fiber composed of the tellurite glass with high nonlinearity.

As for a fabrication method, an extrusion process is reported as a fabrication method of a photonic crystal fiber or holy fiber composed of oxide glass other than the silica-based glass (see non-patent document 10, and non-patent document 11). The extrusion process fabricates a preform having air holes by heating fabricated bulk glass to a high temperature at which it has deformable viscosity, and by pressing it into a mold, followed by extruding it. It is difficult for the extrusion process to fabricate a low loss fiber because the glass is kept at a high temperature for a long time and undergoes deformation, and hence crystal nuclei are apt to grow in the glass. Accordingly, loss values of fibers disclosed in the non-patent documents 10 and 11 each exceed 1000 dB/km, and no fibers have been implemented which have a loss usable as practical devices.

Patent document 1: EP1313676, USP2003/0161599 "Holy optical fiber of non-silica based glass" Southampton University.

Patent document 2: Japanese Patent Application Laid-open No. 2003-149464.

Patent document 3: Japanese Patent Application Laid-open No. 2000-356719.

Non-patent document 1: A. Mori, Y. Ohishi, M. Yamada, H. Ono, Y. Nishida, K. Oikawa, and S. Sudo, "1.5 μm broadband amplifier by tellurite-based DFAs", in OFC'97, 1997, Paper PD1.

Non-patent document 2: Shojiro Kawakami, Kazuo Shiraishi, and Masaharu Oohashi, "Optical fiber and fiber mold devices", Baifuukan, Inc. p. 97.

Non-patent document 3: A. Bjarklev, et al., "Photo Crystal Fibers The State of The Art", Holy fibers Symposium vol. 1.1, ECOC2002.

Non-patent document 4: A. Mori, Y. Ohishi, M. Yamada, H. Ono and S. Sudo, "Broadband amplification characteristics of tellurite-based EDFAs", in ECOC '97, vol. 3, 1997, Paper We2C.4, pp. 135-138.

Non-patent document 5: S. Kim, T. Yoko and S. Sakka, "Linear and Nonlinear Optical Properties of $TeO_2$ Glass", J. Am. Ceram. Soc., Vol. 76, No. 10, pp. 2486-2490, 1993.

Non-patent document 6: M. J. Gander, R. McBride, J. D. C. Jones, D. Mogilevtsev, T. A. Birks, J. C. Knigth, and P. St. J. Russell, "Experimental measurement of group velocity dispersion in photonic crystal fibre", Electron. Lett., January 1999, vol. 35, no. 1, pp. 63-64.

Non-patent document 7: T. A. Birks, D. Mogilevtsev, J. C. Knight, P. St. J. Russell, "Endlessly single-mode photonic crystal fiber-Dispersion compensation using single-material fibers" Opt. Lett. 22, 1997, pp. 961-963.

Non-patent document 8: ECOC2002 nonlinearity-Parametric Amplifiers 3.2.3 "Design of Highly-Nonlinear tellurite fibers with Zero Dispersion Near 1550 nm" Stanford University.

Non-patent document 9: "Journal of Lightwave Technology", 2003, Vol. 21, No. 5, pp. 1300-1306.

Non-patent document 10: P. Petropoulos, et al., "Soliton-self-frequency-shift effects and pulse compression in an anomalously dispersive high nonlinearity lead silicate holy fiber", PD3-1, OFC2003.

Non-patent document 11: V. V. Ravi Kanth Kunth, et al., "Tellurite glass photonic crystal fiber" PD3 ECOC2003.

Non-patent document 12: Gorachand Ghosh, "Sellmeier Coefficients and Chromatic Dispersions Dispersiond for Some Tellurite Glasses", J. Am. Soc., 78(10) 2828-2830, 1995.

Non-patent document 13: "Photonics Technology Letters", 1999, Vol. 11, No. 6, pp. 674-676.

Non-patent document 14: A. Mori, et al., "Ultra-wideband tellurite-Based Raman fibre amplifier", Electronics Letter vol. 37, No. 24, pp. 1442-1443, 2001.

Non-patent document 15: Govind P. Agrawal, "Nonlinear Fiber Optics", 2nd edition, Academic Press, pp. 42-43.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 26A is a process diagram showing a first step of a fabrication method of a photonic crystal fiber of an example 13 and example 20 in accordance with the present invention;

FIG. 26B is a process diagram showing a second step of the fabrication method of the photonic crystal fiber of the example 13 and example 20 in accordance with the present invention;

FIG. 26C is a process diagram showing a third step of the fabrication method of the photonic crystal fiber of the example 13 and example 20 in accordance with the present invention;

FIG. 26D is a process diagram showing a fourth step of the fabrication method of the photonic crystal fiber of the example 13 and example 20 in accordance with the present invention;

FIG. 26E is a process diagram showing a fifth step of the fabrication method of the photonic crystal fiber of the example 13 and example 20 in accordance with the present invention;

FIG. 35A is a process diagram showing a fabrication method of a photonic crystal fiber of an example 16 in accordance with the present invention;

FIG. 35B is a diagram showing the photonic crystal fiber fabricated by the process of FIG. 35A;

FIG. 39A is a process diagram showing a first step of a fabrication method of a photonic crystal fiber of an example 17 in accordance with the present invention;

FIG. 39B is a process diagram showing a second step of the fabrication method of the photonic crystal fiber of the example 17 in accordance with the present invention;

FIG. 43A is a process diagram showing a fabrication method of a photonic crystal fiber of an example 19 in accordance with the present invention;

FIG. 43B is a view showing a structure of a major portion of a fabrication apparatus of FIG. 43A;

FIG. 43C is a view showing the photonic crystal fiber fabricated by the process of FIG. 43A;

DISCLOSURE OF THE INVENTION

Figure 1:
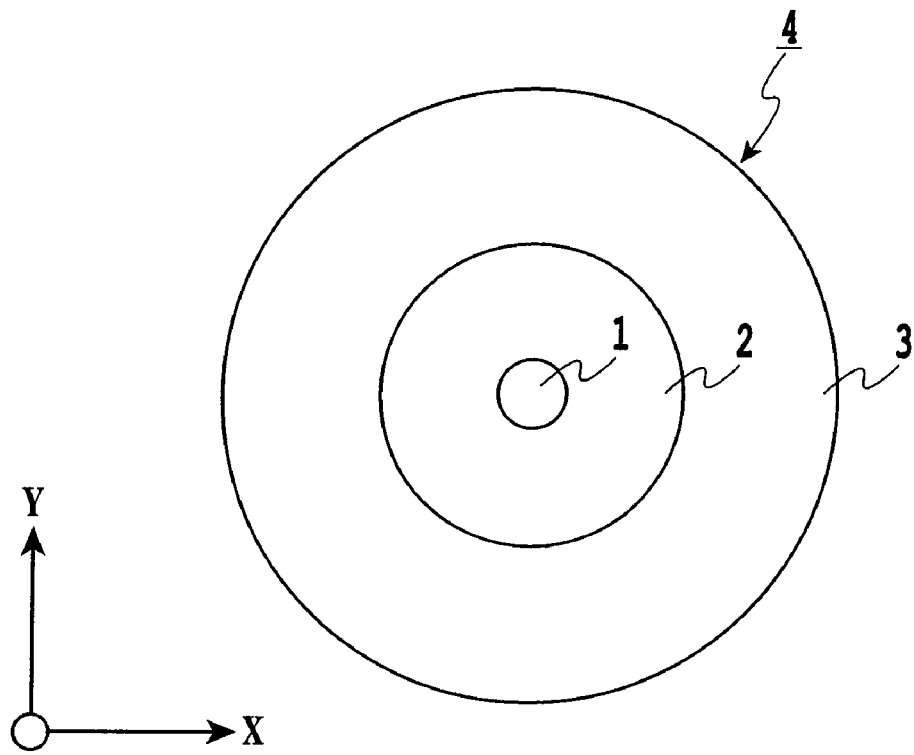
FIG. 1 is a cross-sectional view showing a conventional tellurite glass optical fiber.
Figure 2:
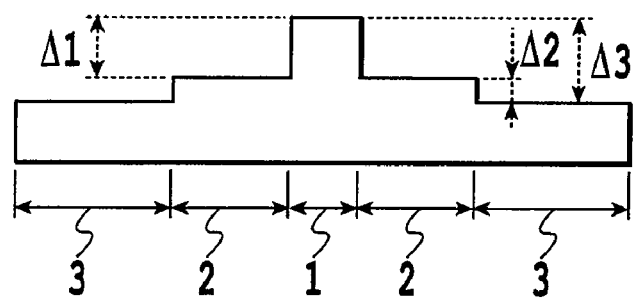
FIG. 2 is a refractive-index profile of the optical fiber as shown in FIG. 1.
Figure 3:
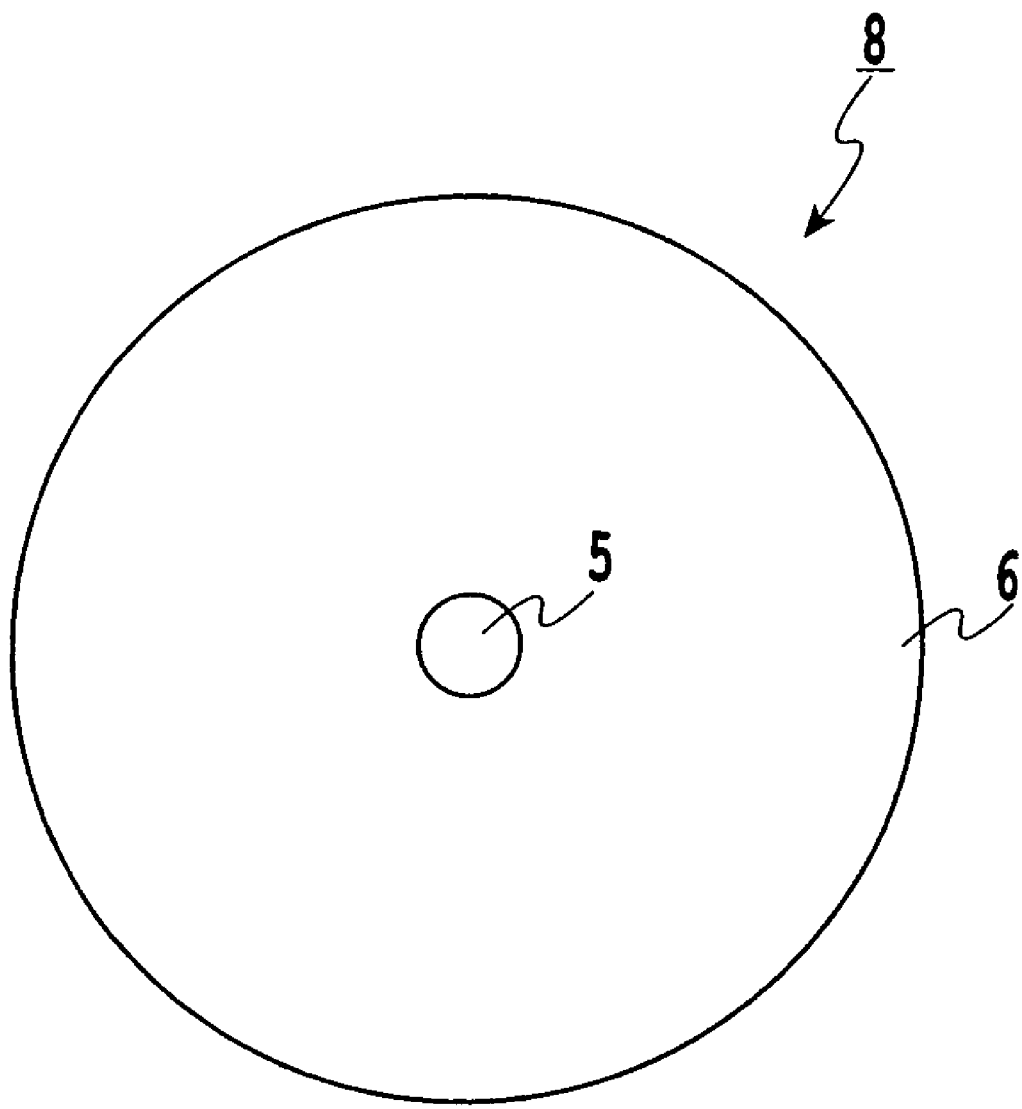
FIG. 3 is a cross-sectional view in a radial direction showing a schematic structure of a conventional optical fiber.

1. Problems to be Solved by the Present Invention

The present invention is implemented considering the foregoing problems in the conventional techniques. Therefore a first object of the present invention to provide a tellurite glass optical fiber with high nonlinearity capable of circumventing the effect of the material dispersion, having large effect on optical signal processing utilizing the nonlinearity, and implementing wideband zero dispersion in the optical telecommunication window.

A second object of the present invention is to provide a fabrication method of a low loss, highly efficient, tellurite glass optical fiber whose zero dispersion wavelength is controlled in the 1.2-1.7 µm band which is an optical telecommunication window.

2. Means for Solving the Problems

Generally, as the nonlinear susceptibility of glass increases its value, the zero-material dispersion wavelength is shifted to a longer wavelength. The technique to shift the zero dispersion wavelength to the optical telecommunication window using the strong confinement of the PCF structure or HF structure is effective as an application of a nonlinear fiber.

The inventors of the present invention show that the foregoing problems of the conventional techniques can be solved by employing a PCF structure or HF structure having strong confinement into a core region in an optical fiber which has a zero-material dispersion wavelength equal to or greater than 2 µm, and a high nonlinear susceptibility $\chi^3$ equal to or greater than $1 \times 10^{-12}$ esu, and uses tellurite glass having sufficient thermal stability for processing into a low loss fiber. More specifically, the inventors find that the size and geometry of air holes formed in the core region, and the spacing between adjacent air holes make it possible to control the zero dispersion wavelength within an optical telecommunication window (1.2-1.7 µm), and to achieve large nonlinearity with a nonlinear coefficient γ equal to or greater than 500 $W^{-1}$ $km^{-1}$.

To accomplish the first object of the present invention, according to the optical fiber of a first aspect of the present invention, there is provided an optical fiber for transmitting light used in optical fiber communication or optical devices, wherein at least a core region of the optical fiber is composed of tellurite glass with a zero-material dispersion wavelength equal to or greater than 2 µm, and the optical fiber has air holes disposed in the optical fiber in a manner that confines light in a center of the optical fiber, thereby controlling the zero dispersion wavelength in a 1.2-1.7 µm band.

Here, the optical fiber may further comprise a region with an area 0.1 to five times $\pi\lambda^2$ at the center of the optical fiber, where λ is a wavelength of the light and π is the circular constant, wherein the air holes may be disposed in an entire cross section of the optical fiber except for the region, or in locations surrounding the region in the cross section so that the region becomes the core for confining the light.

The tellurite glass with the zero-material dispersion wavelength equal to or greater than 2 μm may have a composition of $TeO_2$—$Bi_2O_3$-LO-$M_2$O—$N_2O_3$-$Q_2O_5$, where L is at least one of Zn, Ba and Mg, M is at least one alkaline element selected from Li, Na, K, Rb and Cs, N is at least one of B, La, Ga, Al and Y, and Q is at least one of P and Nb, and components of the tellurite glass are 50<$TeO_2$<90 (mol %)
1<$Bi_2O_3$<30 (mol %) and
1<LO+$M_2$O+$N_2O_3$+$Q_2O_5$<50 (mol %).

The tellurite material glass may be doped with at least one type of rare-earth ions selected from $Ce^{3+}$, $Pr^{3+}$, $Nd^{3+}$, $Pm^{3+}$, $Sm^{3+}$, $Eu^{3+}$, $Tb^{3+}$, $Dy^{3+}$, $Ho^{3+}$, $Er^{3+}$, $Tm^{3+}$ and $Yb^{3+}$.

To accomplish the first object of the present invention, according to the optical fiber of a second aspect of the present invention, the optical fiber is composed of tellurite glass and comprises: a core region; a first cladding section that is formed in such a manner as to enclose the core region, and has a plurality of air holes in a circumferential direction of the core region and along an axial direction of the core region; and a second cladding section that is formed in such a manner as to enclose the first cladding section, and has a refractive index approximately equal to an equivalent refractive index of the first cladding section.

The air holes of the first cladding section may be formed at fixed intervals along the circumferential direction of the core region, or may be formed in a multilayer fashion in a radial direction of the first cladding section, or may be filled with a material having a refractive index lower than a refractive index of the second cladding section. The core region may have a refractive index higher than a refractive index of a material of the first cladding section, or the central section to become the core may have tellurite glass, a refractive index of which differs from the refractive index of the tellurite glass, embedded in the central section.

The relative refractive-index difference between the core region and the first cladding section may be equal to or greater than 2%.

The central section of a region to become the core may have air holes formed in the central section.

The air holes formed in a region other than the region to become the core may be disposed in one of triangular lattice-like, quadrilateral lattice-like, and honeycomb geometries. The air holes may have one of geometries of circular cylinder, elliptical prism and polygonal prism.

The number of the air holes formed in a region other than the region to become the core may be three, and a diameter of a region to become the core may be 0.6-6.5 μm. The number of the air holes may be four, and the diameter of the region to become the core is 0.6-5 μm.

To accomplish the second object of the preset invention, according to a fabrication method of the optical fiber of the third aspect of the present invention, an optical fiber uses, at least as its core material, tellurite glass (referred to as "tellurite glass specified in the present invention" from now on) that has the zero-material dispersion wavelength equal to or greater than 2 μm and has a composition of $TeO_2$—$Bi_2O_3$-LO-$M_2$O—$N_2O_3$-$Q_2O_5$, where L is at least one of Zn, Ba and Mg, M is at least one alkaline element selected from Li, Na, K, Rb and Cs, N is at least one of B, La, Ga, Al and Y, and Q is at least one of P and Nb, and components of the tellurite glass are 50<$TeO_2$<90 (mol %)
1<$Bi_2O_3$<30 (mol %) and
1<LO+$M_2$O+$N_2O_3$+$Q_2O_5$<50 (mol %), wherein the fabrication method of the optical fiber comprises: a first process of forming a preform by cast molding tellurite glass melt into a mold having a plurality of portions convex on the inside of the inner wall; and a second process of inserting the glass preform produced in the first process into a hollow cylindrical jacket tube composed of tellurite glass, and of carrying out fiber drawing under pressure with maintaining or enlarging air holes in a gap between the glass preform and the jacket tube.

To accomplish the second object of the preset invention, according to a fabrication method of the optical fiber of the fourth aspect of the present invention, the optical fiber uses the tellurite glass specified in the present invention as at least the core material, and the fabrication method of the optical fiber comprises: a first process of forming a preform by cast molding tellurite glass melt into a mold having a plurality of portions convex on the inner wall which is conically enlarged towards a bottom of the inner wall; a second process of forming a glass preform by injecting glass melt of core glass composed of tellurite glass, and by suction molding the core glass conically by volume contraction of the cladding glass; and a third process of inserting the glass preform produced by the second process into a hollow cylindrical jacket tube composed of tellurite glass, and of carrying out fiber drawing under pressure with maintaining or enlarging air holes in a gap between the glass preform and the jacket tube.

To accomplish the second object of the preset invention, according to a fabrication method of the optical fiber of the fifth aspect of the present invention, the optical fiber uses the tellurite glass specified in the present invention as at least the core material, and the fabrication method of the optical fiber comprises: a first process of forming a preform by cast molding tellurite glass melt into a mold that has a plurality of portions convex on the inner wall which is conically enlarged towards a bottom of the inner wall, and that has a hole in the bottom of the mold; a second process of forming a glass preform by injecting glass melt of core glass composed of tellurite glass, and by suction molding the core glass conically by volume contraction of the cladding glass and by causing the cladding glass to flow out of the hole; and a third process of inserting the glass preform produced by the second process into a hollow cylindrical jacket tube composed of tellurite glass, and of carrying out fiber drawing under pressure with maintaining or enlarging air holes in a gap between the glass preform and the jacket tube. The second process may carry out vacuum degassing through the hole to cause the cladding glass to flow out of the hole.

To accomplish the second object of the preset invention, according to a fabrication method of the optical fiber of the sixth aspect of the present invention, the optical fiber uses the tellurite glass specified in the present invention as at least the core material, and the fabrication method of the optical fiber comprises: a first process of forming a cylindrical glass block by cast molding tellurite glass melt into a mold; a second process of forming a glass preform having air holes by boring holes in a longitudinal direction of the glass block formed in the first process; and a third process of inserting the glass preform produced by the second process into a hollow cylindrical jacket tube composed of tellurite glass, and of carrying out fiber drawing under pressure with maintaining or enlarging air holes in a gap between the glass preform and the jacket tube.

To accomplish the second object of the preset invention, according to a fabrication method of the optical fiber of the seventh aspect of the present invention, the optical fiber uses the tellurite glass specified in the present invention as at least the core material, and the fabrication method of the optical fiber comprises: a first process of forming a preform having air holes formed by cast molding tellurite glass melt into a mold having a jig including a plurality of cylindrical rodlike pins disposed on a base inside the mold, followed by extracting the jig; and a second process of inserting the glass preform produced in the first process into a hollow cylindrical jacket tube composed of tellurite glass, and of carrying out fiber drawing under pressure with maintaining or enlarging the air holes in a gap between the glass preform and the jacket tube.

3. Advantageous Results of the Invention

According to an optical fiber of a first aspect of the invention, there is provided an optical fiber for transmitting light used in optical fiber communication or optical devices, wherein at least a core region of the optical fiber is composed of tellurite glass having high nonlinearity and a zero-material dispersion wavelength equal to or greater than 2 μm, and the optical fiber has air holes disposed in the optical fiber in a manner that confines light in a center of the optical fiber, thereby being able to cause the light to propagate through the core region, to control the zero dispersion wavelength in a 1.2-1.7 μm band by structural dispersion, and to achieve a high nonlinear coefficient. Accordingly, the optical fiber is provided which is a compact, highly efficient, nonlinear device.

The optical fiber can further comprise a region with an area 0.1 to five times $\pi\lambda^2$ at the center of the optical fiber, where $\lambda$ is a wavelength of the light and $\pi$ is the circular constant, and the air holes can be disposed in an entire cross section of the optical fiber except for that region, or in locations surrounding that region in the cross section so that the light is confined in the core consisting of the region, and transmits through the core of the optical fiber. Thus, high order modes are suppressed effectively.

In addition, selecting the composition of the tellurite glass enables the fabrication of the fiber that has sufficient thermal stability for the fiber fabrication process, high nonlinear coefficient and low loss. Among the components, $TeO_2$ and $Bi_2O_3$, which are essential for achieving the high nonlinearity, must satisfy 50<$TeO_2$<90 (mol %)
1<$Bi_2O_3$<30 (mol %)

Otherwise, it is impossible to implement quality glass having high thermal stability and good transmission characteristics. The remaining components are added to make the glass thermally stable, and to facilitate the process by reducing the viscosity.

The tellurite material glass can be doped with at least one type of rare-earth ions selected from $Ce^{3+}$, $Pr^{3+}$, $Nd^{3+}$, $Pm^{3+}$, $Sm^{3+}$, $Eu^{3+}$, $Tb^{3+}$, $Dy^{3+}$, $Ho^{3+}$, $Er^{3+}$, $Tm^{3+}$ and $Yb^{3+}$. This makes it possible to implement such characteristics as optical amplification and filtering effect by absorption, as well as nonlinearity.

The optical fiber, which is composed of the tellurite glass, can comprise: a core region; a first cladding section that is formed in such a manner as to enclose the core region, and has a plurality of air holes in a circumferential direction of the core region and along an axial direction of the core region; and a second cladding section that is formed in such a manner as to enclose the first cladding section, and has a refractive index approximately equal to an equivalent refractive index of the first cladding section. Thus, it becomes a highly nonlinear tellurite fiber capable of implementing broad band zero dispersion in the optical telecommunication window. In addition, since it can reduce the number of the air holes, a low cost, highly accurate optical fiber can be fabricated with ease.

In addition, embedding, in the core region, tellurite glass with a composition providing a refractive index higher than that of the tellurite glass of the cladding sections makes it possible for the light propagating through the core region to undergo total reflection at the interface between the embedded tellurite glass with the higher refractive index and the tellurite glass surrounding it, and to propagate through the core of optical fiber. Thus, the transmission loss of the light can be reduced.

Furthermore, filling the air holes with a material with a refractive index lower than the refractive index of the tellurite glass can improve the mechanical strength of the optical fiber in its entirety. Moreover, as compared with the case where the air holes are filled with air, since the geometry of the air holes can be more easily maintained in the process of drawing the optical fiber from the preform, the fabrication quality is improved. In addition, compared with the case where the air holes are filled with air, the light scattering loss can be reduced.

In addition, the air holes can be disposed in triangular lattice-like, quadrilateral lattice-like, or honeycomb geometries. This makes it possible for the light to concentrate in the core surrounded with the air holes, and to propagate through the core, which obviates the need for fabricating the optical fiber at high accuracy, and hence can curb the fabrication cost.

Furthermore, the air holes can have a geometry of circular cylinder, elliptical prism or polygonal prism. This makes it possible for the light to concentrate in the core surrounded with the air holes, and to propagate through the core, which obviates the need for fabricating the optical fiber at high accuracy, and hence can curb the fabrication cost.

According to the fabrication method of the optical fiber of a third to seventh aspect of the present invention, the glass is fabricated by cast molding the preform using a tellurite glass composition which has high thermal stability and has a nonlinear susceptibility ($\chi^3$) 30 or more times greater than that of silica glass. Since the method can reduce the duration of the heating process of the glass preform as compared with that of the conventional extrusion process, the method enables the fabrication of the low loss tellurite fiber in volume. In addition, since it can shift the zero dispersion to the 1.2-1.7 μm band, which is the optical telecommunication window, it can provide the optical fiber which is a compact, highly efficient nonlinear device.

4. Description of Reference Numerals 10 optical fiber
11 air holes
12 core
13 cladding
100, 120, 130, 140, 150, 160, 170 optical fiber
101, 111 core section
102 first cladding section
102a air holes
103 second cladding section
201 metal mold
202 glass melt
203 glass preform
204 jacket tube
205 elongated preform
206 portion at which line diameter is constant
207 photonic crystal fiber
208 portion in which holes are formed 2101, 2301, 2305, 2401, 2405, 2501, 2601, 2701, 2801, 2805, 2901, 2905, 3001, 3101, 3201, 3205, 3301, 3305 tellurite glass
2102, 2302, 2402, 2502, 2602, 2702, 2802, 2902, 3002, 3102, 3202, 3302 region to become core
2103, 2303, 2403, 2503, 2505, 2603, 2703, 2803, 2903, 3003, 3103, 3203, 3303 air holes
2104, 2304, 2404, 2504, 2604, 2704, 2804, 2904, 3004, 3104, 3204, 3304 jacket tube 5. Best Mode for Carrying out the Invention An embodiment in accordance with the present invention has, in a photonic crystal fiber using tellurite glass, a structure that has a plurality of air holes with a refractive index of unity around the portion corresponding to the core, and controls the zero dispersion wavelength at the 1.2-1.7 µm band which belongs to the optical communication band. In particular, it is preferable that the number of air holes be made four, so that the portion corresponding to the core is supported by cross-shaped cladding glass. Maintaining the structural symmetry by forming an even number of air holes enables the reduction in the polarization dependence. In addition, the simple structure with four air holes can facilitate the control of the elongating process, and dividing the mold for fabricating the preform into for subdivisions can facilitate the extraction of the glass preform.

Selecting the composition of the tellurite glass appropriately in the embodiment in accordance with the present invention makes it possible to fabricate a highly nonlinear coefficient, low loss fiber which is thermally stable enough for fiber fabrication process. Among the components, although $TeO_2$ and $Bi_2O_3$ are essential to provide high nonlinearity, quality glass that has high thermal stability and good transmission characteristics cannot be obtained if they deviate from the following ranges.

$50 < TeO_2 < 90$ (mole percent)
$1 < Bi_2O_3 < 30$ (mole percent)

The remaining components are doped to thermally stabilize the glass, and to facilitate the processing by reducing the viscosity.

In the embodiment in accordance with the present invention, doping at least one of $Ce^{3+}$, $Pr^{3+}$, $Nd^{3+}$, $Pm^{3+}$, $Sm^{3+}$, $Eu^{3+}$, $Tb^{3+}$, $Dy^{3+}$, $Ho^{3+}$, $Er^{3+}$, $Tm^{3+}$, and $Yb^{3+}$ to the tellurite glass material as rare-earth ions can provide not only the nonlinearity, but also characteristics such as optical amplification, filtering effect due to absorption, and the like.

A tellurite fiber of the embodiment in accordance with the present invention will now be described. Glass that is predominantly composed of $TeO_2$ has a refractive index $n_D$ of about two. In addition, its material wavelength dispersion has large negative dispersion in the 1.2-1.7 µm band, and the zero dispersion wavelength is located at a longer wavelength side beyond 2 µm (see non-patent document 12, for example). Accordingly, even if a fiber with a step-index core/cladding refractive index profile is fabricated using the tellurite glass, it is impossible to greatly change the wavelength dispersion characteristics of the fiber from the characteristics of the material wavelength dispersion.

Table 1 shows an example of a glass composition (mole percent representation) used for the tellurite photonic crystal fiber of the embodiment in accordance with the present invention, and test results measured for thermal stability (Tx–Tg: °C.), refractive index $n_D$, nonlinear susceptibility $\chi^3$(esu), ultraviolet absorption edge UV (nm), and zero-material dispersion wavelength (µm) of each glass composition.

TABLE 1

| No | 1 | 2 | 3 | 4 | 5 | 6 | 7 | 8 | 9 | 10 | 11 | 12 |
|---|---|---|---|---|---|---|---|---|---|---|---|---|
| $TeO_2$ | 75 | 80 | 70 | 65 | 55 | 40 | 60 | 65 | 65 | 70 | 70 | 70 |
| $Bi_2O_3$ | 0 | 2 | 10 | 20 | 30 | 10 | 8 | 15 | 12 | 12 | 7 | 8 |
| ZnO | 5 | | 5 | | | | | 7 | 5 | | 8 | |
| BaO | | 5 | | | 5 | 20 | 7 | | | 5 | | |
| MgO | | | | 5 | | | | | | | | 5 |
| Li2O | 10 | | | | | 10 | | | 13 | | | 10 |
| Na2O | | 7 | | | 5 | 6 | | | | | 5 | |
| K2O | | | 8 | | | | 5 | | | | | |
| Rb2O | | | | 5 | | | 10 | | | 10 | | |
| Cs2O | | | | | 5 | | | 8 | | | | |
| B2O3 | 5 | | | | | 4 | | | | | | |
| La2O3 | | | | | | | | 5 | | | 5 | |
| Ga2O3 | | 6 | | | | | | | 5 | | | 2 |
| Al2O3 | | | 7 | | | | | | | 3 | | |
| Y2O3 | | | | 5 | | | | 5 | | | 5 | |
| P2O5 | 5 | | | | | | | | | | | 5 |
| Nb2O3 | | | | | | 10 | | 5 | | | | |
| Tx – Tg | 90 | 150 | 120 | 140 | 70 | 80 | 150 | 140 | 2.2 | 180 | 160 | 150 | 160 |
| nD | 1.98 | 2.07 | 2.18 | 2.21 | 2.23 | 1.85 | 2.15 | 2.2 | 2.18 | 2.13 | 2.1 | 2.05 |
| $\chi^3$ (×10$^{-12}$) | 0.5 | 1 | 1.2 | 2 | 2.6 | 0.6 | 1.2 | 2 | 1.8 | 1.3 | 1.2 | 1.1 |
| UV (nm) | 360 | 365 | 370 | 378 | 410 | 390 | 380 | 390 | 385 | 375 | 370 | 380 |
| Zero (µm) | 1.8 | 2.1 | 2.4 | 2.7 | 3 | 1.9 | 2.2 | 2.6 | 2.4 | 2.3 | 2.2 | 2.15 |

| No | 13 | 14 | 15 | 16 | 17 | 18 | 19 | 20 | 21 | 22 | 23 | 24 |
|---|---|---|---|---|---|---|---|---|---|---|---|---|
| $TeO_2$ | 70 | 75 | 75 | 75 | 75 | 80 | 80 | 80 | 80 | 85 | 85 | 90 |
| $Bi_2O_3$ | 10 | 15 | 10 | 10 | 7 | 7 | 8 | 7 | 7 | 5 | 5 | 5 |
| ZnO | | | 5 | | 5 | 5 | | | | | 3 | |
| BaO | | | | 5 | | | 5 | | 5 | | | |
| MgO | | | | | | | | | 5 | | | |
| Li2O | | | | | 12 | 8 | | | | | | |
| Na2O | | 5 | | | | | | | | 5 | | |
| K2O | 7 | | | | | | 7 | | | 7 | | |
| Rb2O | | | | 10 | | | | | | | | 5 |
| Cs2O | | | 5 | | | | | 5 | | | | |
| B2O3 | 5 | | | | | | | | | | | |

TABLE 1-continued

| | | | | | | | | | | | | |
|---|---|---|---|---|---|---|---|---|---|---|---|---|
| La2O3 | | | | | | | | | | | 5 | |
| Ga2O3 | | 5 | | | | | | | | | | |
| Al2O3 | | | | | | | | | | | | |
| Y2O3 | | | 5 | | | | | | | 5 | | |
| P2O5 | | | | | | | | | 3 | | | |
| Nb2O3 | 8 | | | | | | | 3 | | | | |
| Tx − Tg | 170 | 150 | 300< | 140 | 300< | 300< | 300< | 160 | 180 | 140 | 130 | 50 |
| nD | 2.09 | 2.2 | 2.09 | 2.03 | 2.07 | 2.12 | 2.11 | 2.13 | 2.08 | 2.12 | 2.13 | 2.16 |
| $\chi^3$ (×10$^{-12}$) | 1.5 | 2 | 1.6 | 1.4 | 1.3 | 1.7 | 1.5 | 1.8 | 1.5 | 1.6 | 1.5 | 2 |
| UV (nm) | 375 | 380 | 375 | 380 | 370 | 375 | 370 | 380 | 370 | 365 | 380 | 390 |
| Zero (μm) | 2.3 | 2.5 | 2.3 | 2.2 | 2.3 | 2.5 | 2.4 | 2.6 | 2.2 | 2.5 | 2.6 | 2.8 |

Glass test samples were fabricated by the following procedure. Materials were mixed in a glove box filled with nitrogen gas, and melted in an oxygen atmosphere at 800-1100° C. using a gold or platinum crucible, followed by flowing the melt into a mold preheated at 300-400° C. Since the process to form a fiber requires reheating such as elongating and fiber drawing of the glass preform, the thermal stability is an important factor to implement a low loss, strong fiber. Since the tellurite glass usually undergoes the elongating and fiber drawing process at a temperature higher than the glass transition temperature Tg by 30-80° C., the index of the thermal stability in terms of Tx (crystallization temperature)–Tg (glass transition temperature) is preferably 100° C. or higher.

Among the glass compositions of Table 1, although the doped amounts of $Bi_2O_3$ of samples No. 1-5 vary from 0 to 30 mol %, as for the samples No. 1 and No. 5 whose mole percent is 0 mol % and 30 mol %, respectively, the index of the thermal stability in terms of Tx–Tg is equal to or less than 100° C., which indicates that the thermal stability is not enough. The sample No. 6 includes $TeO_2$ of equal to or less than 50 mol %, and the sample No. 24 includes $TeO_2$ of equal to or greater than 90 mol %, in which case Tx–Tg is equal to or less than 100° C., which indicates that the thermal stability is insufficient. $TeO_2$ and $Bi_2O_3$ are essential components for achieving the high nonlinearity in the present embodiment, and they must be in the following ranges from the viewpoint described above.

$50 < TeO_2 < 90$ (mol %)
$1 < Bi_2O_3 < 30$ (mol %)
$1 < LO + M_2O + Q_2O_3 + R_2O_5 < 50$ (mol %)

It is seen that compositions other than the foregoing examples lack the thermal stability for processing into the fiber.

Summarizing the compositions of Table 1, the tellurite glass has a composition of $TeO_2$—$Bi_2O_3$-LO-$M_2O$-$Q_2O_3$—$R_2O_5$, where L is at least one of Zn, Ba and Mg, M is at least one of Li, Na, K, Rb and Cs, Q is at least one of B, La, Ga, Al and Y, and R is at least one of P and Nb. As for the tellurite glass having the high nonlinearity and thermal stability at the same time, the wavelength at which the material dispersion becomes zero is equal to or greater than 2 μm, which is an important physical property value for designing the structure for controlling the zero dispersion wavelength of the fiber.

Referring to the accompanying drawings, examples in accordance with the present invention will be described in detail. Although the embodiments of the optical fiber in accordance with the present invention will be described by way of examples, the present invention is not limited to the following examples. Furthermore, although the following examples are optical fibers having the photonic bandgap structure as the basis of the waveguide principle, a total reflection structure based on the effective index difference between the core and cladding is also prepared. Therefore the optical fiber does not necessarily require the photonic bandgap condition or periodicity/uniformity.

Example 1

Figure 4:
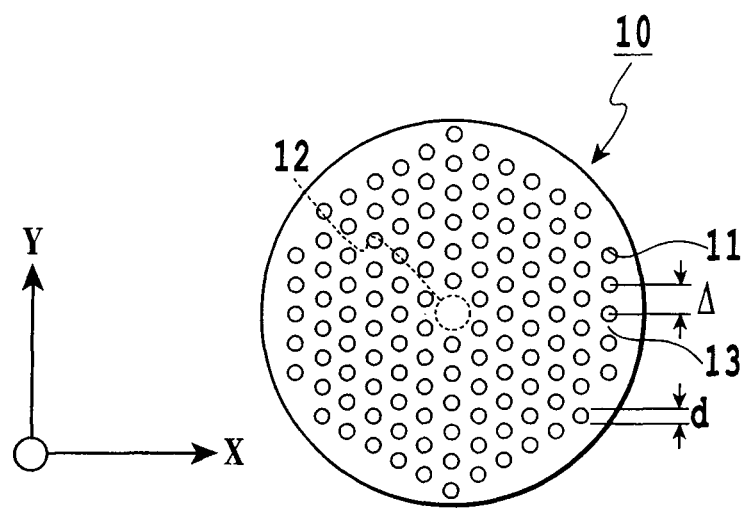
FIG. 4 is a cross-sectional view showing an optical fiber of an example 1 in accordance with the present invention.

FIG. 4 shows a cross section of the optical fiber of the example 1 in accordance with the present invention. As shown in FIG. 4, an optical fiber 10 composed of tellurite glass whose zero-material dispersion wavelength is 2.08 μm has a lot of circular air holes 11 which are filled with air. Accordingly, the refractive index of light in the air holes 11 is approximately equal to one, the refractive index of light in a vacuum.

As for the disposition of the air holes 11 in a cross section in the direction of the diameter of the optical fiber 10, it has a triangular lattice-like arrangement consisting of individual vertices of a lot of triangles placed in such a manner that they are regularly (periodically) adjacent to each other. The air holes 11 have the same structure in the longitudinal direction of the optical fiber 10. In other words, the air holes 11 are disposed uniformly in the longitudinal direction rather than in the photonic bandgap manner disposed three dimensionally. Accordingly, the cross section of the optical fiber has the same structure throughout the longitudinal direction of the optical fiber 10 disregarding fluctuations (distortion) in the geometry due to the fabrication process of the optical fiber 10. Thus no structure is present in which the air holes intersect the longitudinal direction of the optical fiber 10 orthogonally or obliquely. In other words, the air holes 11 disposed in the optical fiber 10 extend continuously in the longitudinal direction of the optical fiber 10, and have the same cross section at any locations in the longitudinal direction.

However, at the center of the optical fiber 10, the disposition of the air holes 11 lacks periodicity. The region surrounded by the air holes 11 arranged with lacking the periodicity is from 0.1 to five time of $\pi\lambda^2$, where λ is the wavelength of the light, and π is the circular constant. The region becomes the core 12 to which the light is concentrated, and the light does not propagate from that region in the radial direction of the optical fiber 10. In other words, the optical fiber 10 has a photonic bandgap structure having a diffraction grating in which the air holes 11 are disposed periodically arrangement. Thus, the optical fiber 10 has the core 12 at the center of the optical fiber 10, and the cladding 13 including the air holes 11 periodically disposed around the core 12. Incidentally, changing the spacings between adjacent air holes makes it possible to vary the diameter of the core 12, that is, the region surrounded by the air holes 11 arranged with lacking the periodicity.

Figure 5:
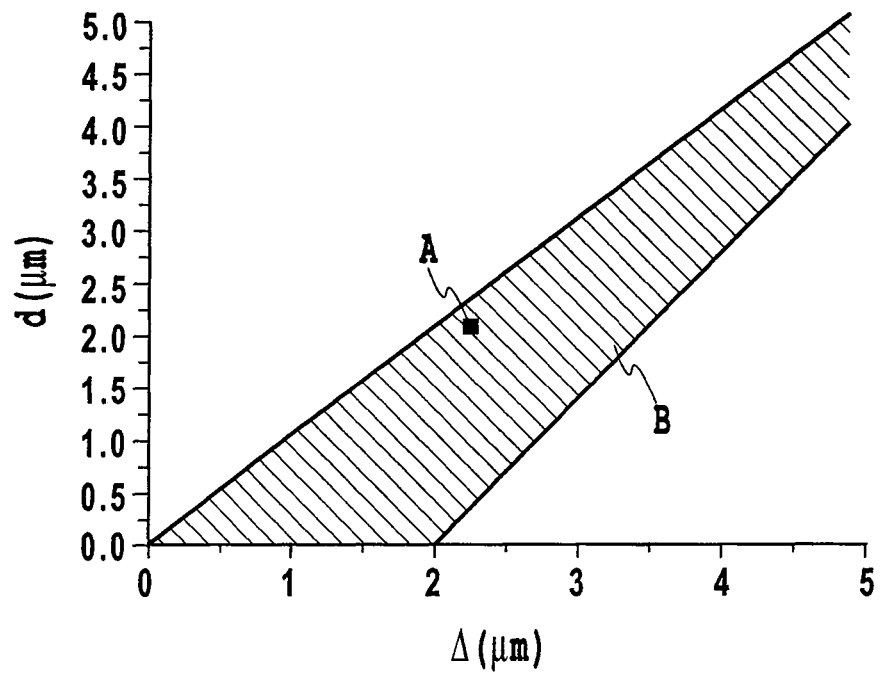
FIG. 5 is a graph illustrating a zero dispersion region in the optical fiber of the example 1 in accordance with the present invention.

Assume that the spacing between adjacent air holes is A, and the diameter of the air holes is d. Then, the region which brings about the zero dispersion in the optical fiber 10 is the region B as shown in FIG. 5 enclosed by the line given by connecting the points at which (Δ, d) is (0, 0) and (5, 5), and the line given by connecting the points at which (Δ, d) is (2, 0) and (5, 4). The point A, at which (Δ, d) is (2.3, 2.0), belongs to the region B in which zero dispersion is achieved.

When the material composition of the tellurite glass is changed, the wavelength at which the dispersion becomes zero varies in the range from 1.3 μm to 1.6 μm. In this case, although the range of the spacing Λ between the adjacent air holes and the range of the diameter d of the air holes vary, they are substantially present in the region B as shown in FIG. 5.

Figure 6:
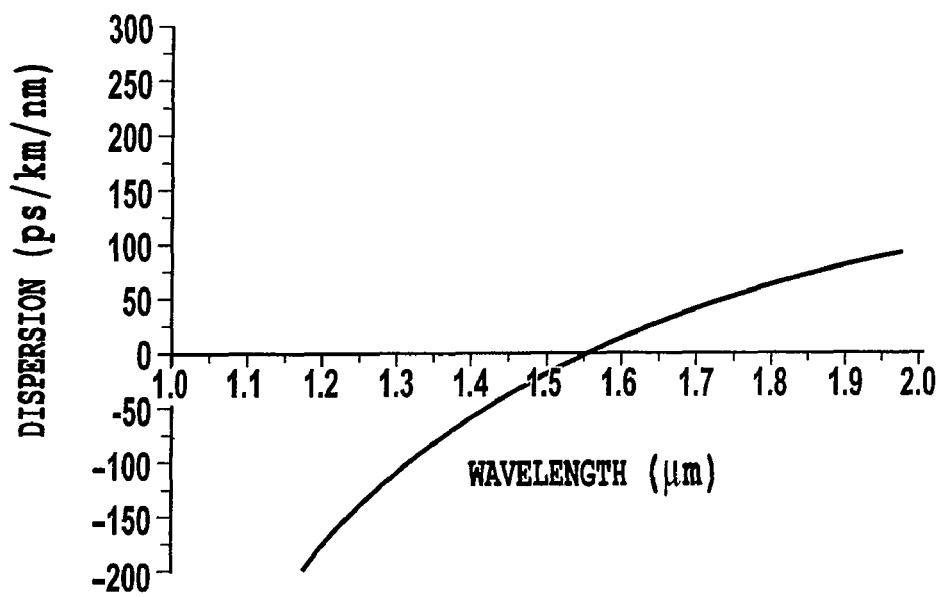
FIG. 6 is a graph illustrating wavelength dispersion characteristics of the optical fiber of the example 1 in accordance with the present invention.
Figure 7:
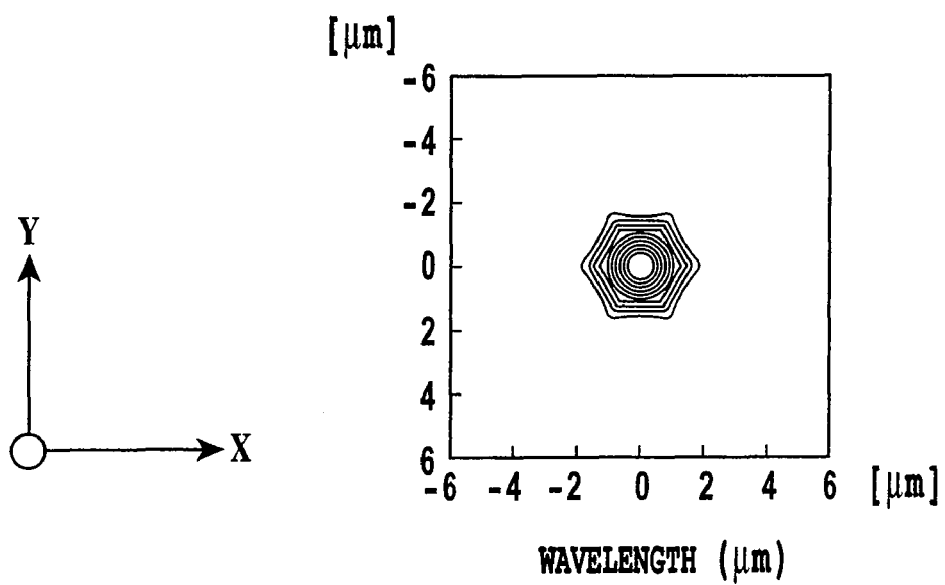
FIG. 7 is an electric field distribution diagram illustrating a state of the electric field around the core in the optical fiber of the example 1 in accordance with the present invention.

FIG. 6 illustrates the wavelength dispersion characteristics at point A of FIG. 5 of the optical fiber 10, the spacing Δ of the adjacent air holes of which is 2.3 μm, and the diameter d of the air holes of which is 2.0 μm. As illustrated in FIG. 6, the optical fiber 10 has the zero dispersion at the wavelength 1.56 μm. FIG. 7 illustrates the opto-electric field distribution around the core of the optical fiber 10, which is obtained by applying the calculus of finite difference method, one of the numerical calculations, to the optical fiber 10. In FIG. 7, solid lines show contours every 10% difference in the electric field. As illustrated in FIG. 7, the optical fiber 10 has a structure that confines the light in the core 12 as the ordinary optical fiber.

Thus, the optical fiber 10 can confine the light in the core 12 by the photonic bandgap or total reflection effect, thereby being able to suppress the high order modes effectively, and to maintain the single mode condition in spite of an increase in the diameter of the core 12.

Example 2

Figure 8A:
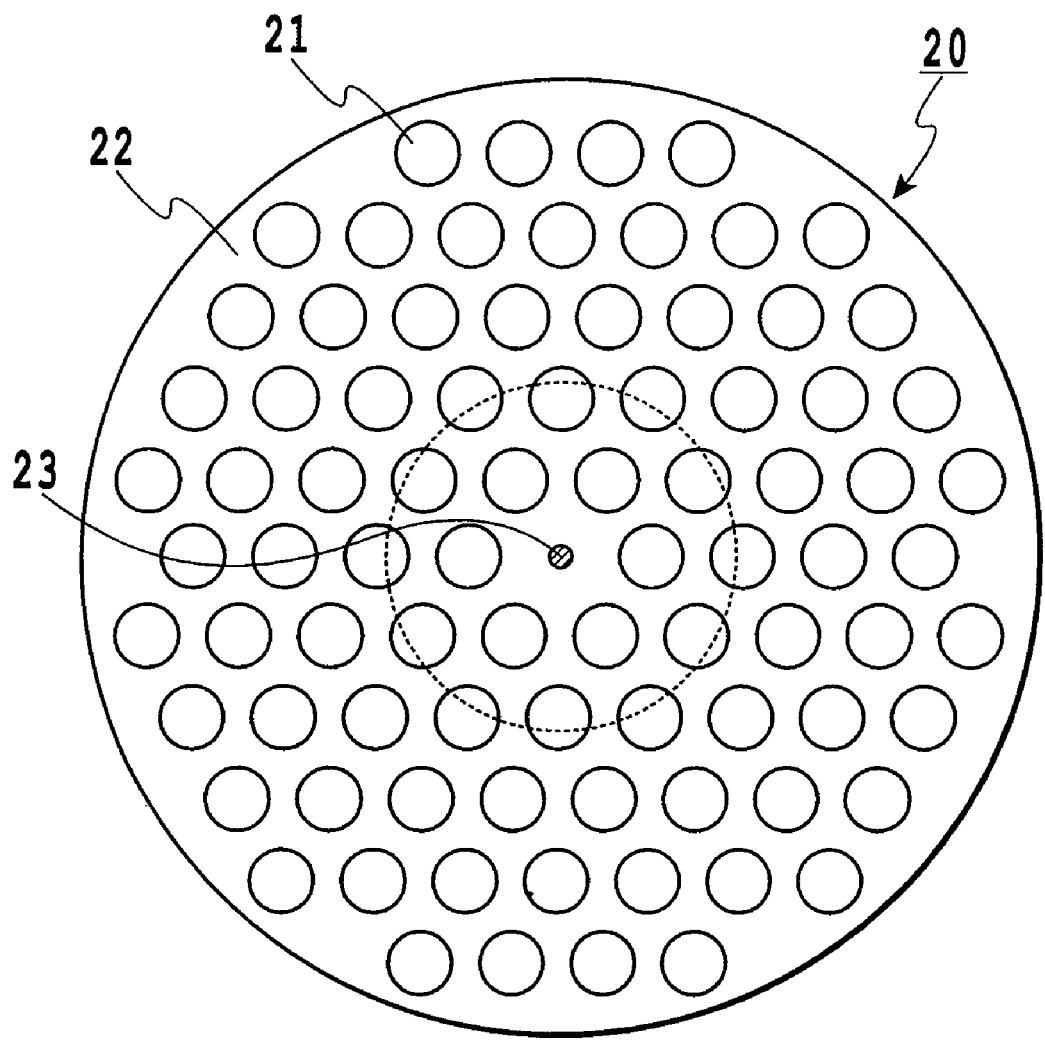
FIG. 8A is a cross-sectional view showing an optical fiber of an example 2 in accordance with the present invention.
Figure 8B:
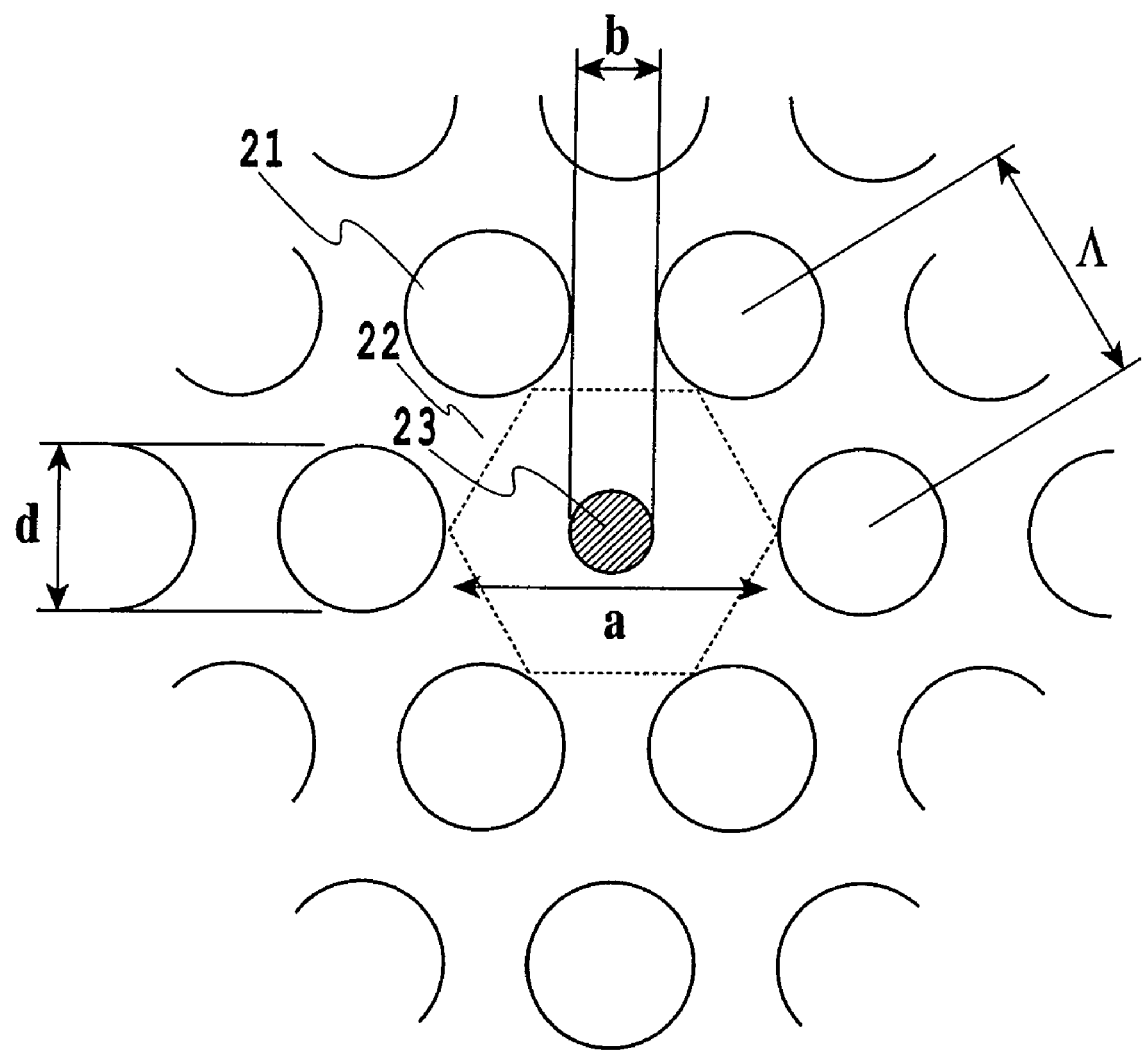
FIG. 8B is an enlarged view of a major portion of FIG. 8A.

FIGS. 8A and 8B each show an optical fiber cross section of an example 2 in accordance with the present invention. In FIGS. 8A and 8B, the reference numeral 21 designates an air hole which is filled with air and has a refractive index of approximately one. The reference numeral 22 designates tellurite glass with the same composition as the sample No. 18 of Table 1. A fiber 20 of the present example has a lot of air holes 21 disposed in the entire region of a cross section except for its center in a triangular lattice-like fashion. In addition, the following two types of fibers were fabricated: A first fiber has tellurite glass embedded at the fiber central section 23, which tellurite glass has a zero-material dispersion wavelength of 2.1 μm and a refractive index 1.1% higher than the tellurite glass 22 in terms of the relative refractive-index difference; and a second fiber has a region to become the core for transmitting light by embedding tellurite glass in the fiber central section 23, which tellurite glass has a refractive index 0.5% lower than the tellurite glass 22 in terms of the relative refractive-index difference. The two fibers each have an outside diameter of 105 μm, an air hole diameter d of 1.6 μm, an air hole spacing Λ of 2.2 μm, a tellurite glass diameter b of 1.5 μm which is embedded into the central section 23 and a core diameter a of 2.8 μm through which the light propagates.

Figure 9:
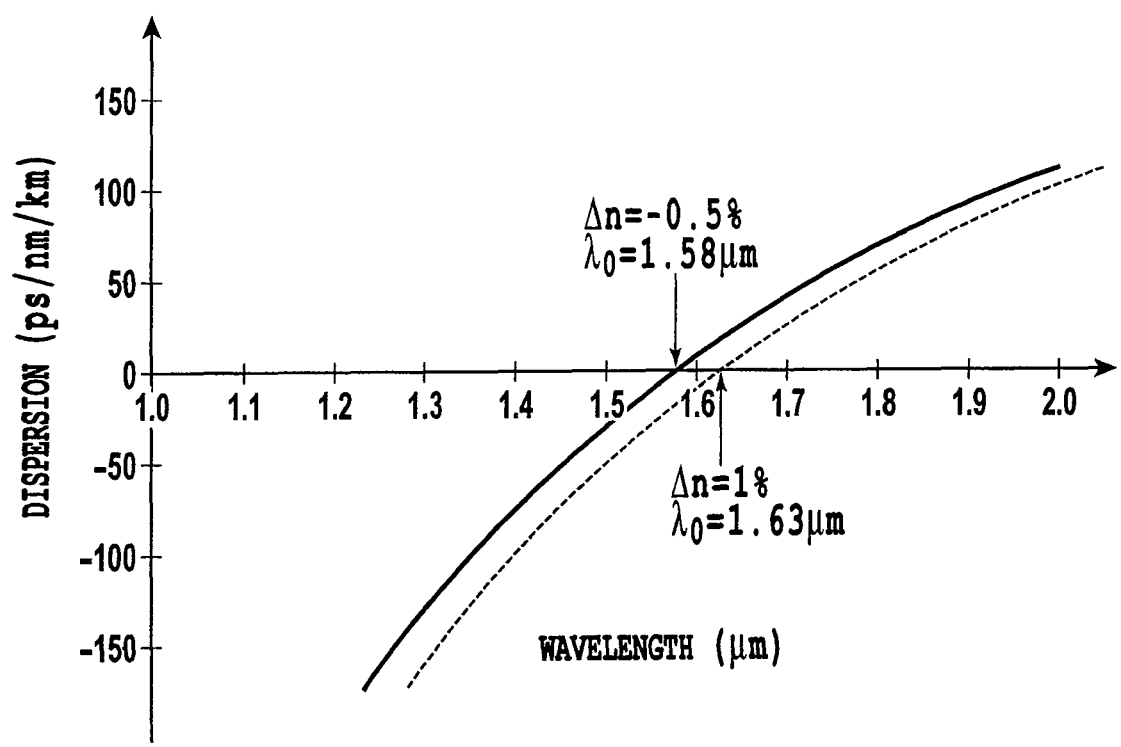
FIG. 9 is a graph illustrating wavelength dispersion characteristics of the optical fiber of the example 2 in accordance with the present invention.

The two types of fibers, which were fabricated by the extrusion process, were cut and polished, followed by observing a near field pattern (NFP) and far field pattern (FFP), thereby confirming that the light was confined in the fiber central section 23, and the single mode was achieved. FIG. 9 illustrates measured results of the wavelength dispersion of the optical fiber. The zero dispersion wavelength $\lambda_0$ of the present example was 1.63 μm for the first fiber into which the tellurite with the refractive index of 1.1% higher was buried, and 1.58 μm for the second fiber into which the tellurite with the refractive index of 0.5% lower was buried as illustrated in FIG. 9. In addition, their effective core cross sectional areas $A_{eff}$ were 3.7 μm$^2$ and 3.9 μm$^2$, and their nonlinear coefficient γ values were 650 W$^{-1}$ km$^{-1}$ and 610 W$^{-1}$ km$^{-1}$, respectively.

Example 3

Figure 10A:
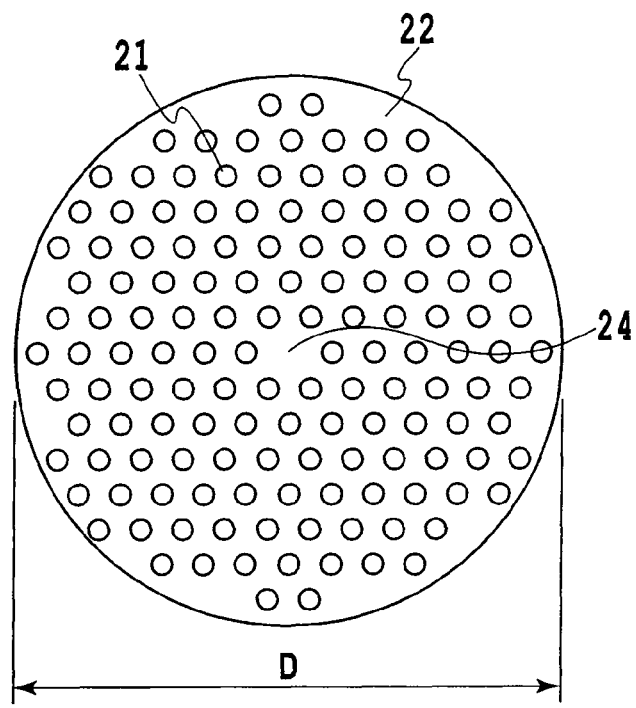
FIG. 10A is a cross-sectional view showing an optical fiber of an example 3 in accordance with the present invention.
Figure 10B:
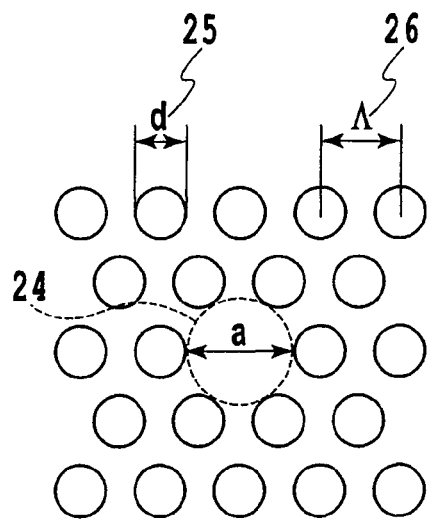
FIG. 10B is an enlarged view of a major portion of FIG. 10A.

FIG. 10A shows an optical fiber cross section of an example 3 in accordance with the present invention. In FIG. 10A, the reference numeral 21 designates an air hole which is filled with air and has a refractive index of approximately one. The reference numeral 22 designates tellurite glass with the same composition as the sample No. 15 of Table 1. A fiber of the present example has a lot of air holes 21 disposed in the entire region of a cross section except for its center in a triangular lattice-like fashion, and a region 24 to become a core for transmitting light is formed. The outside diameter D of the fiber is 105 μm. In addition, as illustrated in FIG. 10B, the air hole diameter d is 1.2 μm, the air hole spacing Λ is 1.5 μm, and the diameter a of the core for transmitting light is 1.8 μm.

The fabricated fiber was cut and polished, followed by observing a near field pattern (NFP) and far field pattern (FFP), thereby confirming that the light was confined in the fiber central section, and the single mode was achieved. The zero dispersion wavelength $\lambda_0$ of the present example was 1.3 μm. The core region 24, which is approximately represented by π(a/2)$^2$, where a is the core diameter and π is the circular constant, must have an area from 0.1 to five times of πλ$^2$, where λ is the wavelength. If the area is equal to or less than 0.1 times, the mode cannot be established, and at the same time, connection with a silica fiber is difficult. If the area is equal to or greater than five times, the zero dispersion becomes equal to or greater than 1.7 μm, and at the same time, the multi-mode propagation occurs.

Example 4

Figure 11A:
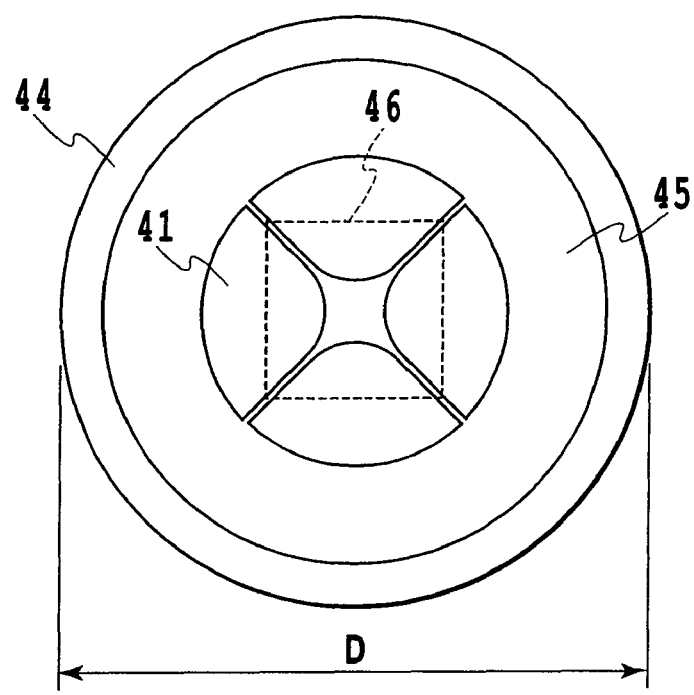
FIG. 11A is a cross-sectional view showing an optical fiber of an example 4 in accordance with the present invention.
Figure 11B:
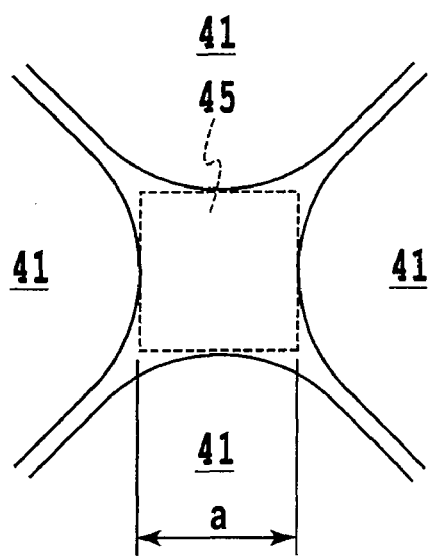
FIG. 11B is an enlarged view of a major portion of FIG. 11A.

FIG. 11A shows an optical fiber cross section of an example 4 in accordance with the present invention. In FIG. 11A, the reference numeral 44 designates a jacket. The reference numeral 41 designates an air hole which is filled with air and has a refractive index of approximately one. The reference numeral 45 designates tellurite glass whose zero-material dispersion wavelength is 2.18 μm. The fiber of the present example has four holes 41 disposed therein, and a region 46 to become a core for transmitting light. The outside diameter D of the is 120 μm, and the inside diameter of the air holes is 40 μm. As for the size of the core region, a side a of the square which is inscribed in the core region as shown in FIG. 11B is made 2.0 μm.

The fabricated fiber was cut and polished, followed by observing a near field pattern (NFP) and far field pattern (FFP), thereby confirming that the light was confined in the fiber central section, and the single mode was achieved. The zero dispersion wavelength $\lambda_0$ of the present example was 1.46 μm. The core region 24, which is approximately represented by π(a/2)$^2$, where a is the core diameter and π is the circular constant, must have an area from 0.1 to five times of πλ$^2$, where λ is the wavelength. If the area is equal to or less than 0.1 times, the mode cannot be established, and at the same time, connection with a silica fiber is difficult. If the area is equal to or greater than five times, the zero dispersion becomes equal to or greater than 1.7 μm, and at the same time, the multi-mode propagation occurs.

Example 5

Figure 12:
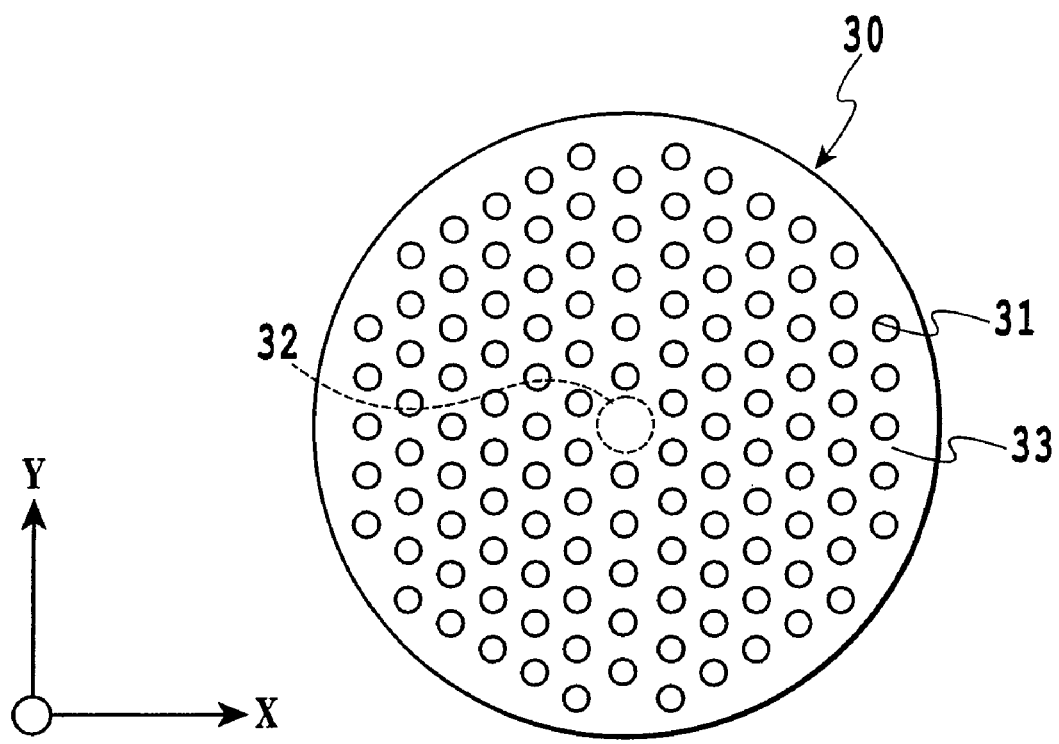
FIG. 12 is a cross-sectional view showing an optical fiber of an example 5 in accordance with the present invention.

FIG. 12 shows a cross section of the optical fiber of an example 5 in accordance with the present invention. As shown in FIG. 12, an optical fiber 30 composed of tellurite glass whose zero-material dispersion wavelength is 2.1 μm has a lot of circular air holes 31 which are disposed in a triangular lattice-like fashion, that is, in a periodic manner as in the foregoing example 1. However, at the center of the optical fiber 30, the disposition of the air holes 31 lacks periodicity. In addition, the air holes 31 are filled with a glass material whose refractive index is lower than that of the tellurite glass 33 by Δn. Since the air holes 31 separated from the central of the optical fiber 30 are arranged periodically, they form a cladding 33 for making the total reflection of light. In contrast, the region surrounded by the air holes 31 arranged at the center of the optical fiber 30 with lacking periodicity forms a core 32 that guides the light. The region has an area from 0.1 to five times of $\pi\lambda^2$, where λ is the wavelength of the light and π is the circular constant.

According to the optical fiber 30, since the air holes 31 constituting the photonic gap are filled with the material whose refractive index is lower than that of the tellurite glass 33, the mechanical strength of the optical fiber is increased in its entirety. In addition, as a result of filling the material can facilitate keeping the geometry of the air holes 31 in the process of drawing the optical fiber 30 from the preform of the optical fiber 30 as compared with the case where the air holes 31 are filled with air, thereby being able to improve the fabrication quality. Furthermore, as compared with the optical fiber whose air holes 31 are filled with air, it can reduce the scattering loss of light.

Example 6

Figure 13:
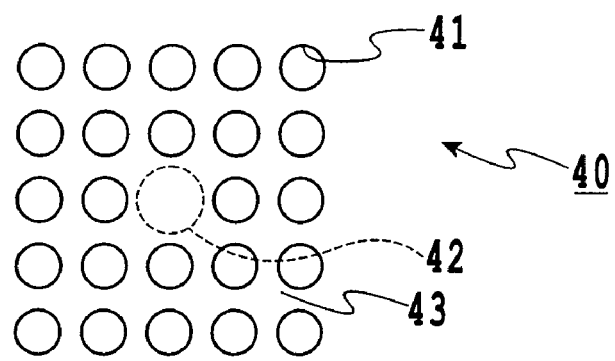
FIG. 13 is a cross-sectional view around the core of an optical fiber of an example 6 in accordance with the present invention.

FIG. 13 shows an optical fiber of an example 6 in accordance with the present invention. As shown in FIG. 13, the optical fiber 40 composed of tellurite glass changes the arrangement of the air holes 31 of the optical fiber 30 described in the foregoing example 5. The disposition of the air holes 41 in the optical fiber 40 is a quadrilateral lattice-like arrangement consisting of a lot of quadrilateral vertices arranged adjacently in a regular (periodical) fashion in a cross section in the direction of the diameter of the optical fiber 40. The arrangement of the air holes 41, however, lacks the periodicity at the center of the optical fiber 40. Since the air holes 41 separated from the central of the optical fiber 40 are arranged periodically, they form a cladding 43 for making the total reflection of light. In contrast, the region surrounded by the air holes 41 arranged at the center of the optical fiber 40 with lacking periodicity forms a core 42 through which the light propagates. The region has an area from 0.1 to five times the area of $\pi\lambda^2$, where λ is the wavelength of the light and π is the circular constant. Incidentally, the air holes 41 are filled with a material whose refractive index is lower than that of the tellurite glass.

Thus, the optical fiber 40 can offer the same effect and advantages as the optical fiber 30 described in the foregoing example 5.

As for the air holes 41, they can be simple air holes filled with air. In either case, the light is confined in the core 42, and the high order mode can be suppressed effectively. Thus, the single mode condition can be maintained in spite of an increase in the diameter of the core 42.

Example 7

Figure 14:
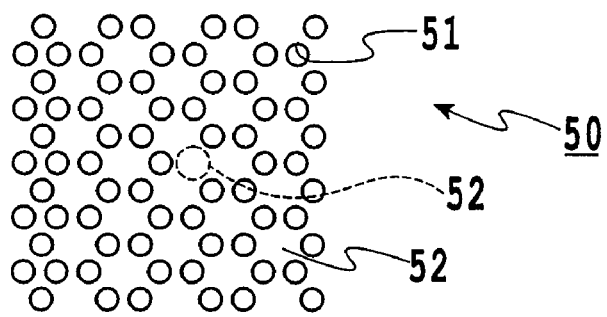
FIG. 14 is a cross-sectional view around the core of an optical fiber of an example 7 in accordance with the present invention.

FIG. 14 shows an optical fiber of an example 7 in accordance with the present invention. As shown in FIG. 14, the optical fiber 50 composed of tellurite glass changes the arrangement of the air holes 41 of the optical fiber 40 described in the foregoing example 6. The air holes 51 in the optical fiber 50 are disposed at vertices of a hexagonal (honeycomb), which are arranged adjacently in a regular (periodical) fashion in a cross section in the direction of the diameter of the optical fiber 50. The arrangement of the air holes 51, however, lacks the periodicity at the center of the optical fiber 50. Since the air holes 51 separated from the central of the optical fiber 50 are arranged periodically, they form a cladding 53 for making the total reflection of light. In contrast, the region surrounded by the air holes 51 arranged at the center of the optical fiber 50 with lacking periodicity forms a core 52 through which the light propagates. The region has an area from 0.1 to five times of $\pi\lambda^2$, where λ is the wavelength of the light and π is the circular constant. Incidentally, the air holes 51 are filled with a material whose refractive index is lower than that of the tellurite glass.

Thus, the optical fiber 50 can offer the same effect and advantages as the optical fiber 40 described in the foregoing example 6.

As for the air holes 51, they can be simple air holes filled with air. In either case, the light is confined in the core 52, and the high order mode can be suppressed effectively. Thus, the single mode condition can be maintained in spite of an increase in the diameter of the core 52.

Example 8

Figure 15:
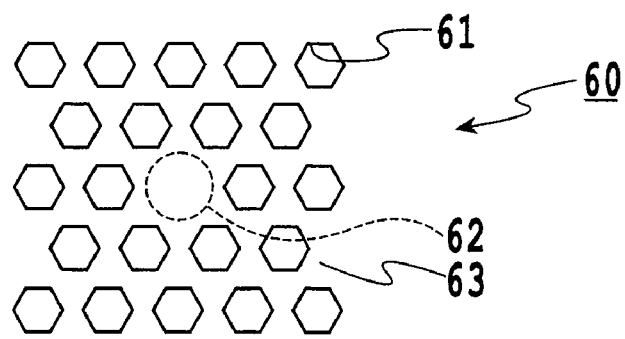
FIG. 15 is a cross-sectional view around the core of an optical fiber of an example 8 in accordance with the present invention.

FIG. 15 shows an optical fiber of an example 8 in accordance with the present invention. As shown in FIG. 15, the optical fiber 60 composed of tellurite glass changes the arrangement of the air holes 31 of the optical fiber 30 described in the foregoing example 5. In the optical fiber 60, a lot of air holes 61 have a hexagonal shape in a cross section perpendicular to the longitudinal direction of the optical fiber 60. The arrangement of the air holes 61, however, lacks the periodicity at the center of the optical fiber 60. Since the air holes 61 separated from the central of the optical fiber 60 are arranged periodically, they form a cladding 63 for making the total reflection of light. In contrast, the region surrounded by the air holes 61 arranged at the center of the optical fiber 60 with lacking periodicity forms a core 62 through which the light propagates. The region has an area from 0.1 to five times of $\pi\lambda^2$ where λ is the wavelength of the light and π is the circular constant. Incidentally, the air holes 61 are filled with a material whose refractive index is lower than that of the tellurite glass.

Thus, the optical fiber 60 can offer the same effect and advantages as the optical fiber 30 described in the foregoing example 5.

As for the air holes 61, they can be simple air holes filled with air. In either case, the light is confined in the core 62, and the high order mode can be suppressed effectively. Thus, the single mode condition can be maintained in spite of an increase in the diameter of the core 62.

As for the arrangement of the air holes forming the diffraction grating of the photonic crystals constituting the photonic bandgap, it is not limited in particular as long as it can confine the light in the core so that the light does not propagate in the radial direction from the center of the optical fiber, and it has a periodic disposition, that is, regular lattice-like disposition.

As for the shape of the air holes, it is not limited to a circular cylinder (circular air hole), but it may be a shape of a triangular prism (triangular air hole), rectangular prism (rectangular air hole), or hexagonal prism (hexagonal air hole), any of which can implement the waveguide structure based on the photonic bandgap.

Example 9

Figure 16:
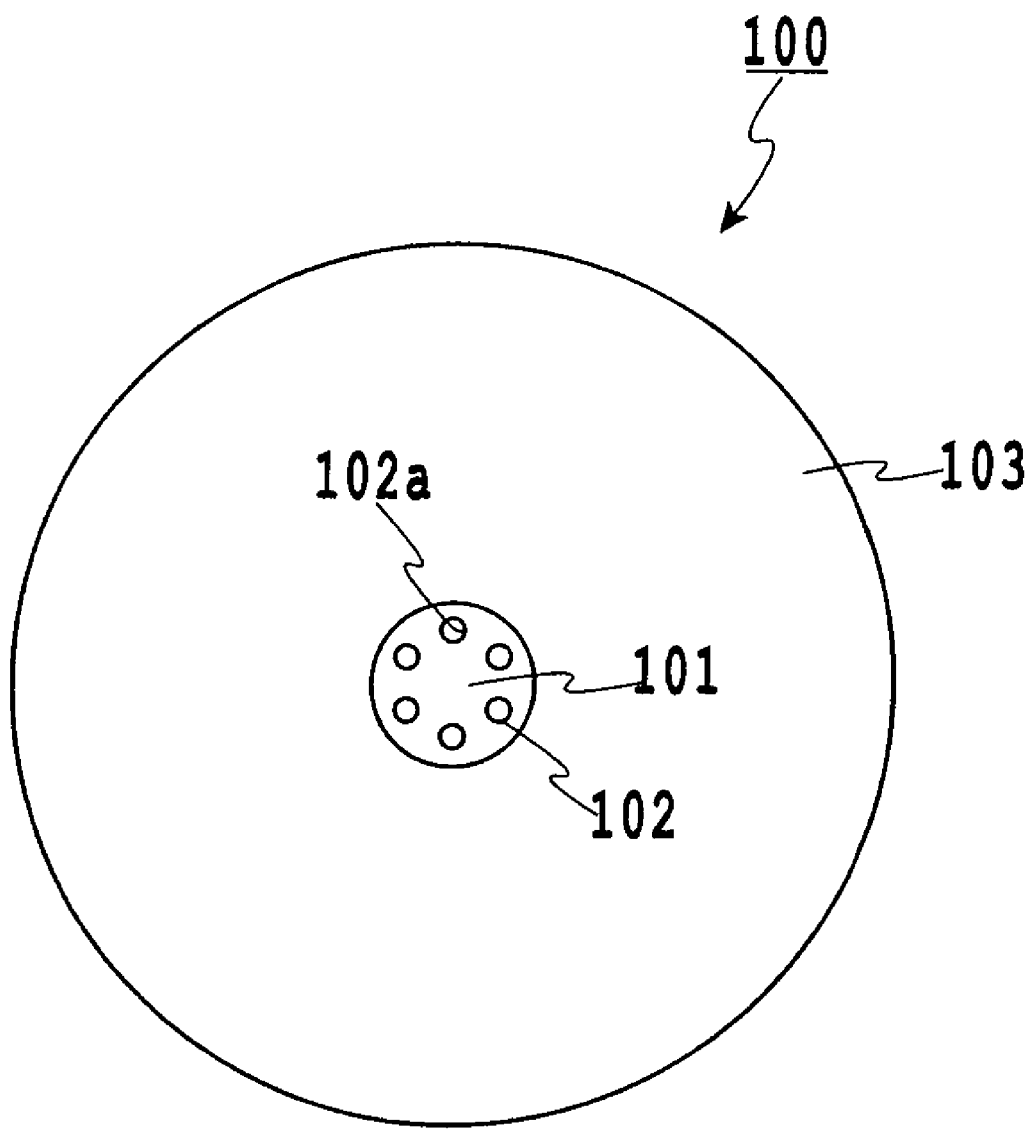
FIG. 16 is a cross-sectional view in a radial direction showing a schematic structure of an optical fiber of an example 9 in accordance with the present invention.
Figure 17:
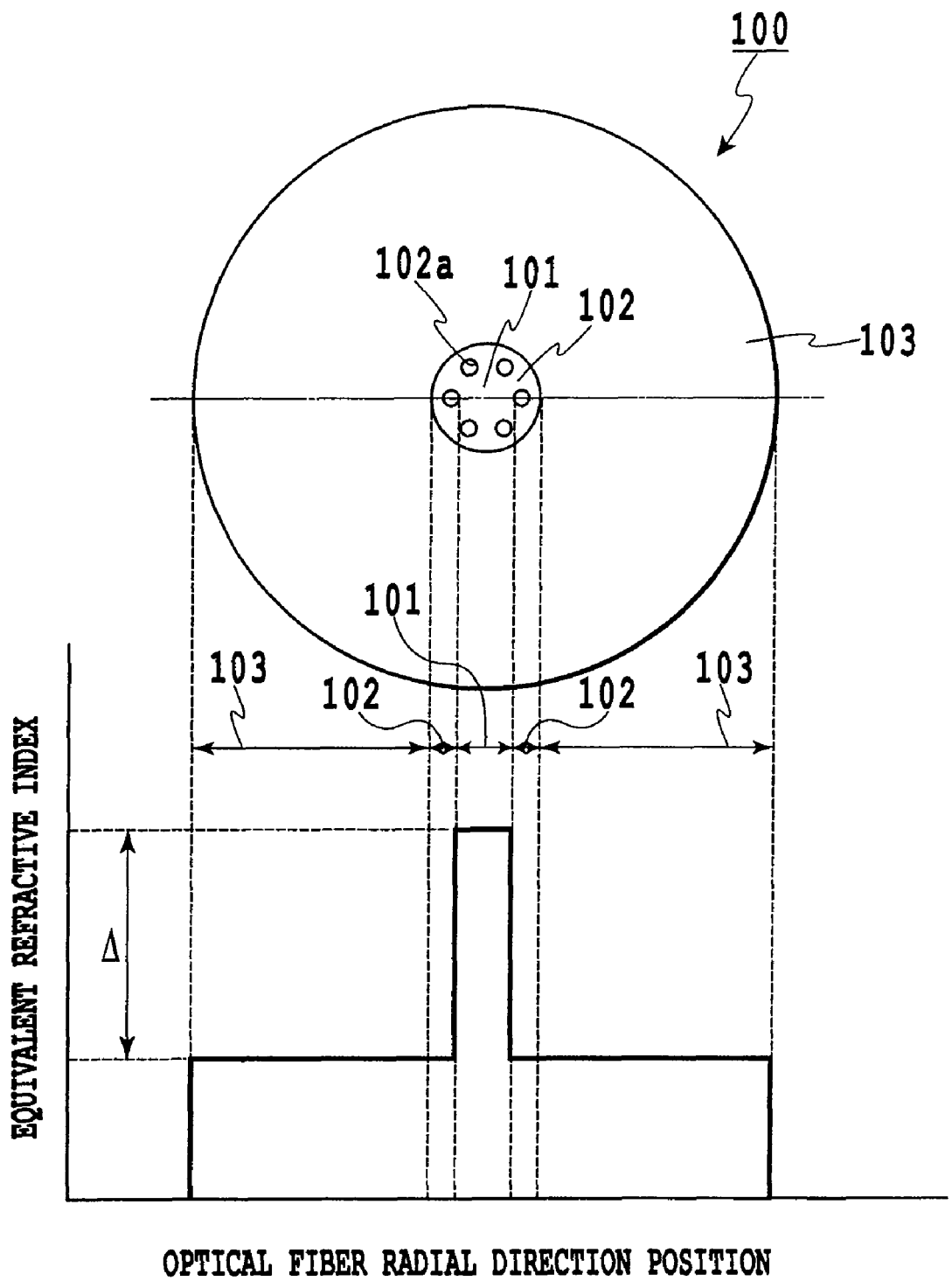
FIG. 17 is a graph illustrating an equivalent refractive-index profile of the optical fiber of FIG. 16.
Figure 18:
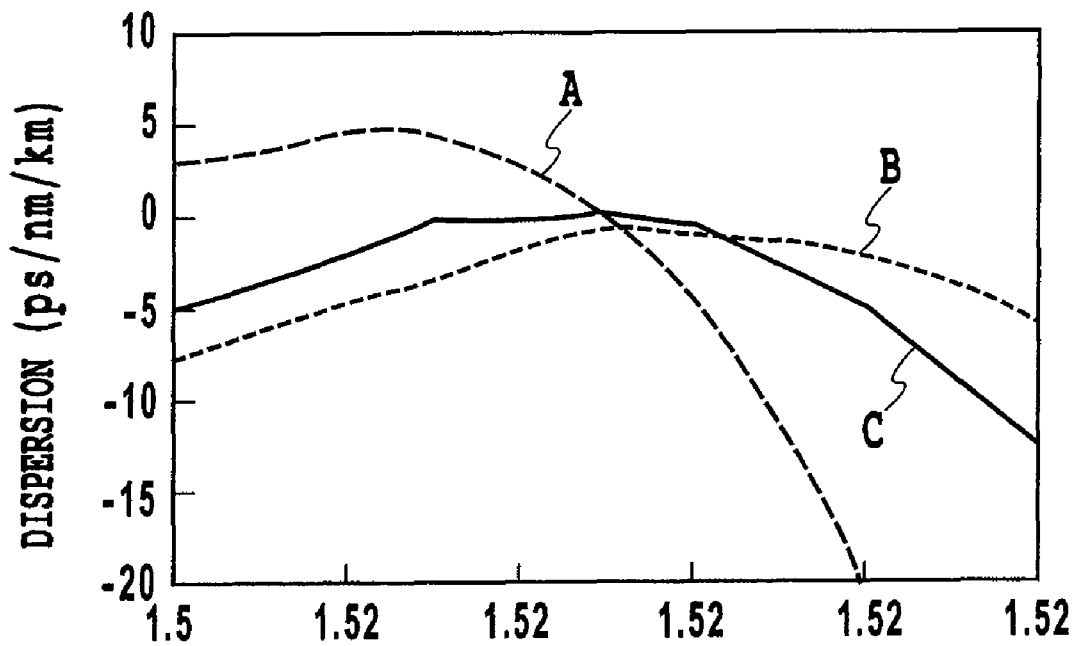
FIG. 18 is a graph illustrating the dispersion characteristics of the optical fiber of FIG. 16.
Figure 19:
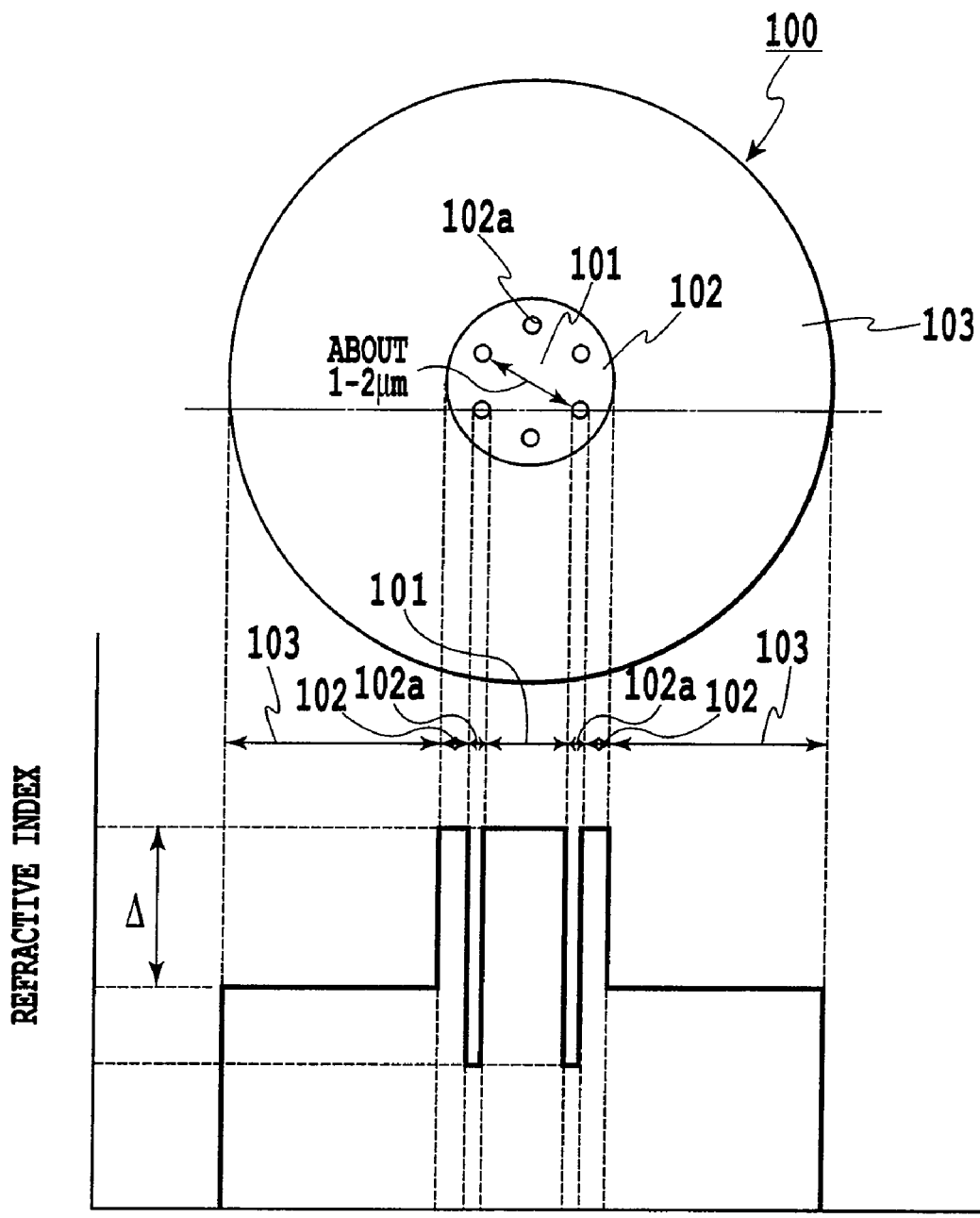
FIG. 19 is a graph illustrating a refractive-index profile of the optical fiber of FIG. 16.

Next, an optical fiber of an example 9 in accordance with the present invention will be described with reference to FIGS. 16-19. In this case, as the tellurite glass is used glass as defined in claim 1, which has the zero dispersion wavelength at 2 μm or above. In particular, among the glass composition ratios in the foregoing Table 1, the composition ratios other than No. 1 and No. 6 are effective. In addition, the glass material as defined in claim 3, which is doped with rare-earth is also effective. FIG. 16 is a cross-sectional view in a radial direction showing a schematic structure of the optical fiber; FIG. 17 is a graph illustrating an equivalent refractive-index profile of the optical fiber of FIG. 16; FIG. 18 is a graph illustrating the dispersion characteristics of the optical fiber of FIG. 16; and FIG. 19 is a graph illustrating a refractive-index profile of the optical fiber of FIG. 16. Incidentally, the term "equivalent refractive index" in the present invention refers to a refractive index that acts on the light substantially.

The optical fiber of the example 9 in accordance with the present invention is an optical fiber 100 composed of tellurite glass as shown in FIG. 16. It includes a core section 101; a first cladding section 102 that is formed in such a manner as to enclose the core section 101, and has a plurality of circular air holes 102a along the axial direction of the core section 101 in the circumferential direction of the core section 101; and a second cladding section 103 that is formed in such a manner to enclose the first cladding section 102, and has a refractive index approximately equal to the equivalent refractive index of the first cladding section 102.

The first cladding section 102 has a plurality of (six in the present example) air holes 102a formed at regular spacings along the circumferential direction of the core section 101. The air holes 102a of the first cladding section 102 are filled with air whose refractive index is approximately one equal to the refractive index in a vacuum. The relative refractive-index difference ($\Delta$) between the refractive index of the core section 101 and the equivalent refractive index of the first cladding section 102 is equal to or greater than 2%. The second cladding section 103, using tellurite glass with a composition different from that of the tellurite glass of the core section 101, has a refractive index lower than the refractive index of the core section 101, and approximately equal to the equivalent refractive index of the first cladding section 102.

The optical fiber 100 of the example 9 in accordance with the present invention is designed such that the radius r of the air holes 102a is 0.5-1.0 μm, the pitch γ between the air holes 102a is 1.0-2.0 μm, and the radius rr of the first cladding section 102 is equal to or less than 3 μm.

Incidentally, since the optical fiber 100 maintains a uniform structure in the axial direction, the cross section structure in a radial direction is the same throughout the length in the axial direction disregarding the fluctuations in the geometry due to the fabrication process. Thus no structure is present which intersects the axial direction of the optical fiber 10 orthogonally or obliquely.

In the optical fiber 100 of the example 9 in accordance with the present invention, the air holes 102a are disposed singly on the vertices of a regular hexagon to form the first cladding section 102. Since the air holes 102a are not formed in the core section 101 at the center, the core section 101 has the highest refractive index, thereby concentrating light to the core section 101.

As for the optical fiber 100 of the example 9 in accordance with the present invention, it is found that the polarity is reversed at the zero dispersion wavelength as illustrated in FIG. 18, and the dispersion becomes flat in a particular wavelength region. Accordingly, the optical fiber 100 of the example 9 in accordance with the present invention can implement a broad zero dispersion wavelength region.

As described in the section of the background art, optical fibers called photonic crystal fibers (PCFs) or holy fibers (TFs) have been developed recently which use silica glass and have air holes formed intentionally. The PCFs or TFs are divided into two types according to the waveguide principle. One of them is a photonic bandgap type that confines light by the photonic bandgap, and its structure requires strict periodicity and uniformity of the air hole size. The other of them is a refractive index waveguide type that confines light by the total reflection achieved by the effective refractive index difference of the medium having the air holes, and its structure does not necessarily requires the strict periodicity or the uniformity of the air hole size.

For example, the foregoing non-patent document 6 reports experimentally measured results of the dispersion characteristics of a silica glass optical fiber including a core section without air holes and a cladding section having air holes arranged in a hexagonal fashion. The non-patent document 6 reports the optical fiber that has a dispersion value of about −77 ps/km/nm at the wavelength of 813 nm. In addition, the non-patent document 13, for example, calculates the dispersion of an optical fiber (PCF) composed of a single material, and reports the dispersion compensation effect of the PCF.

Thus, the inventors of the present invention have concentrated all their energies on the study, and found that the foregoing problems can be solved by providing tellurite glass optical fibers with a PCF or HF structure. More specifically, the inventors of the present invention confirmed that it was possible to implement broad band zero dispersion wavelength in the 1.55 μm band which was the optical telecommunication window, and to implement a highly nonlinear optical fiber 100 with high optical confinement effect by making the relative refractive-index difference ($\Delta$) between the refractive index of the core section 101 without the air holes 102a and the equivalent refractive index of the first cladding section 102 equal to or greater than 2%, and by approximately matching the equivalent refractive index of the first cladding section 102 with the refractive index of the second cladding section 103. In addition, the inventors of the present invention found that the zero dispersion wavelength and the optical confinement effect were controllable in a wide range by the size and spacing of the air holes 102a. Furthermore, the inventors of the present invention made it possible to implement the low refractive index by using, as the second cladding section 103, tellurite glass with the composition different from that of the tellurite glass used as the core section 101. In addition, the inventors of the present invention made it possible to fabricate the optical fiber at low cost without forming air holes in the second cladding section 103.

Figure 20:
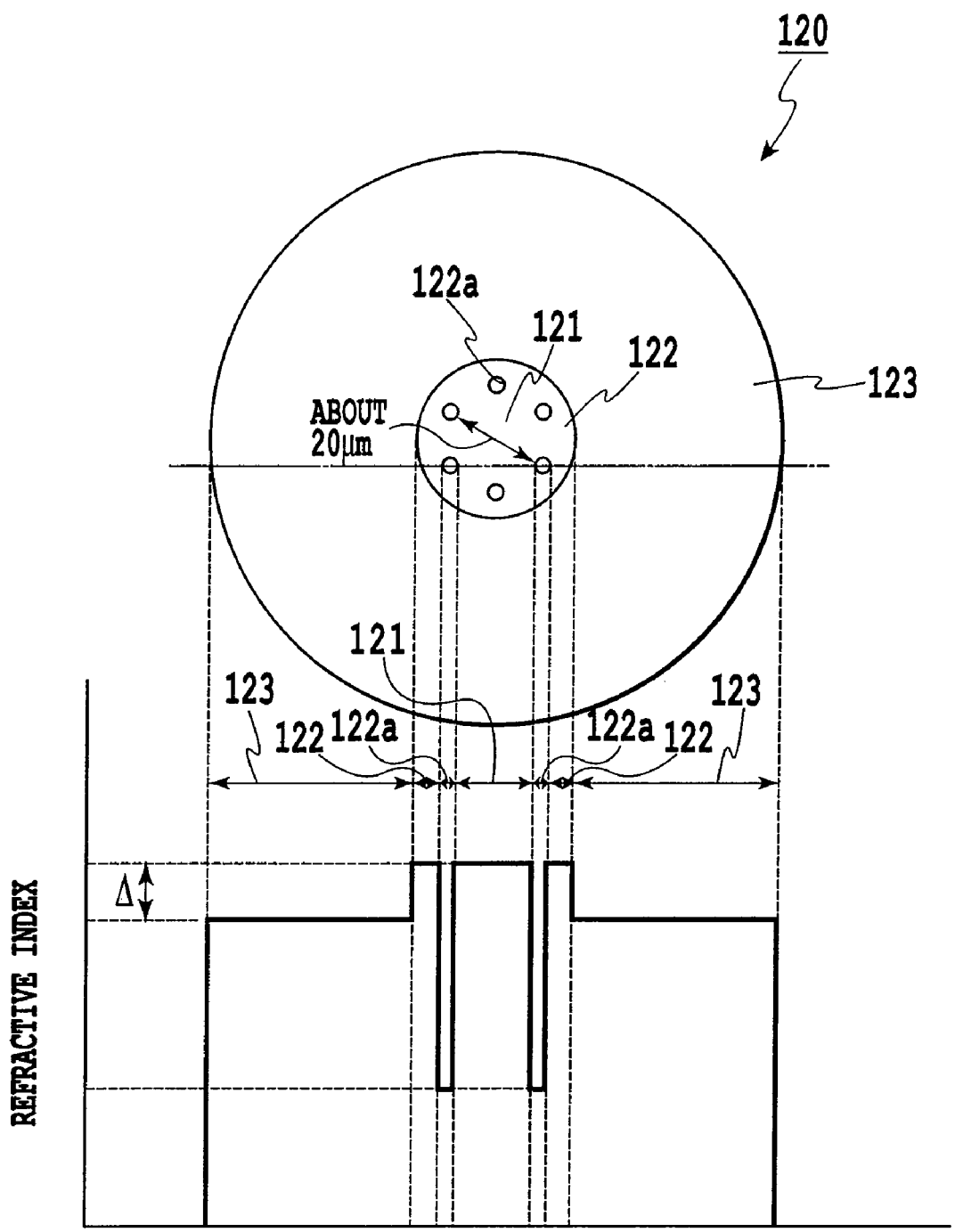
FIG. 20 is a graph illustrating another refractive-index profile of the conventional optical fiber.

Incidentally, the patent document 2 proposes a dispersion compensation type having the wavelength dispersion equal to or greater than +80 ps/nm/km at wavelengths from 1400 to 1800 nm by forming air holes 122a in a silica glass optical fiber 120 with a core section 121 and a cladding section 122 as shown in FIG. 20. The optical fiber 120 has the diameter of the core 121 increased to about 20 μm to reduce the optically nonlinear characteristics, and has a low A structure with the relative refractive-index difference ($\Delta$) between the core 121 and cladding 122 equal to or less than 1%.

In contrast with this, the optical fiber 100 of the example 9 in accordance with the present invention aims to implement the high nonlinearity as described above, and has a small structure with the core section 101 having a diameter of about 1-2 μm by increasing the relative refractive-index difference Δ to about 2-4% as illustrated in FIG. 19. Thus, the structure and object of the optical fiber 100 differ greatly from those of the optical fiber 120 of the conventional example.

Figure 21:
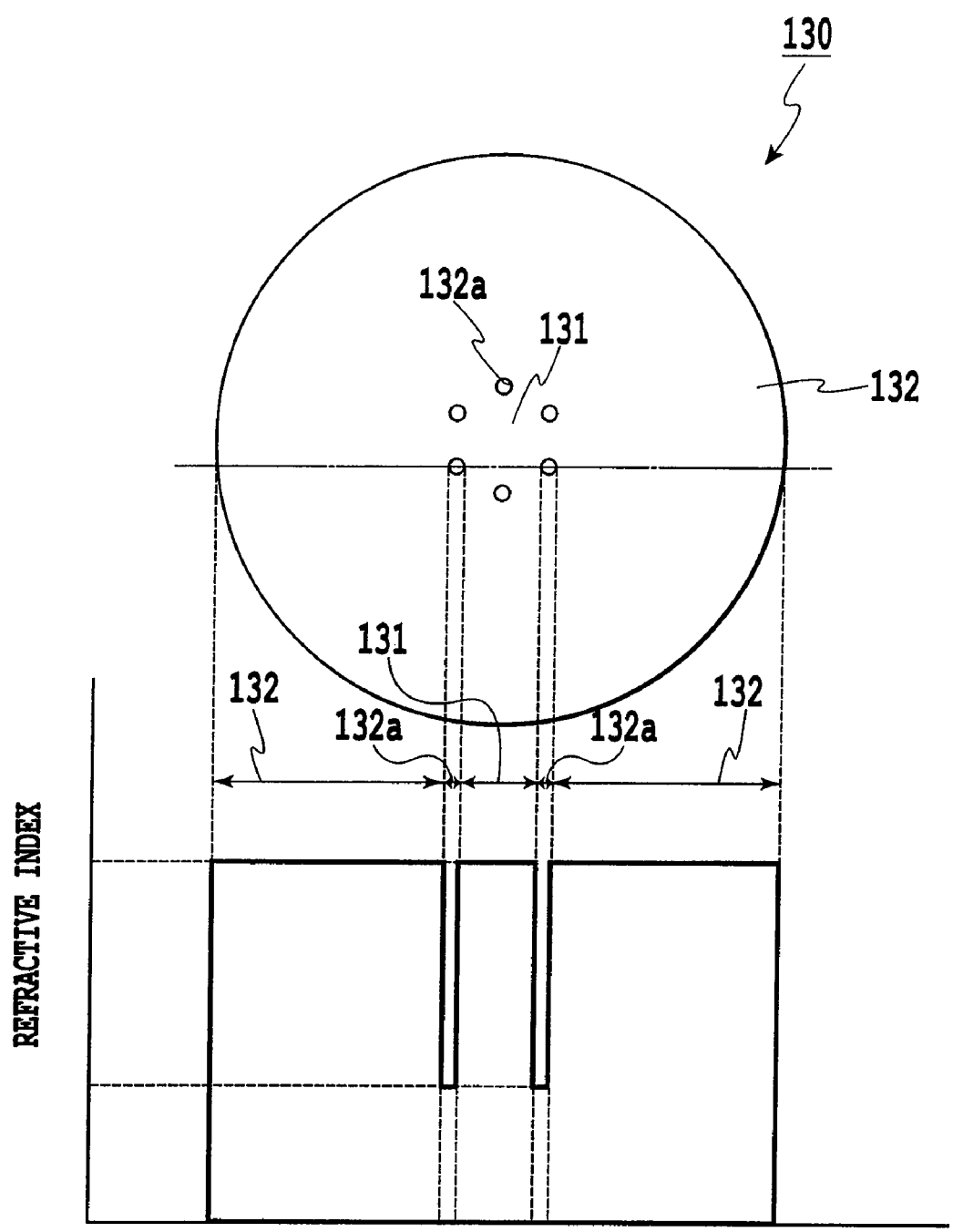
FIG. 21 is a graph illustrating another refractive-index profile of the conventional optical fiber.

The patent document 3 proposes optical fiber 130 as shown in FIG. 21 including three or six air holes 132a formed in such a manner that the effective refractive index difference between the core section 131 and the cladding section 132 becomes greater than 5%. Since the optical fiber 130 has both the core section 131 and cladding section 132 composed of the same glass material (single glass), the core section 131 at the center and the cladding section 132 outside the air holes 132a have the same refractive index, which is usually called a W-type structure. However, the optical fiber 100 of the example 9 in accordance with the present invention has the structure different from that of the optical fiber 130 of the conventional example in the same manner as described above.

Example 10

Figure 22:
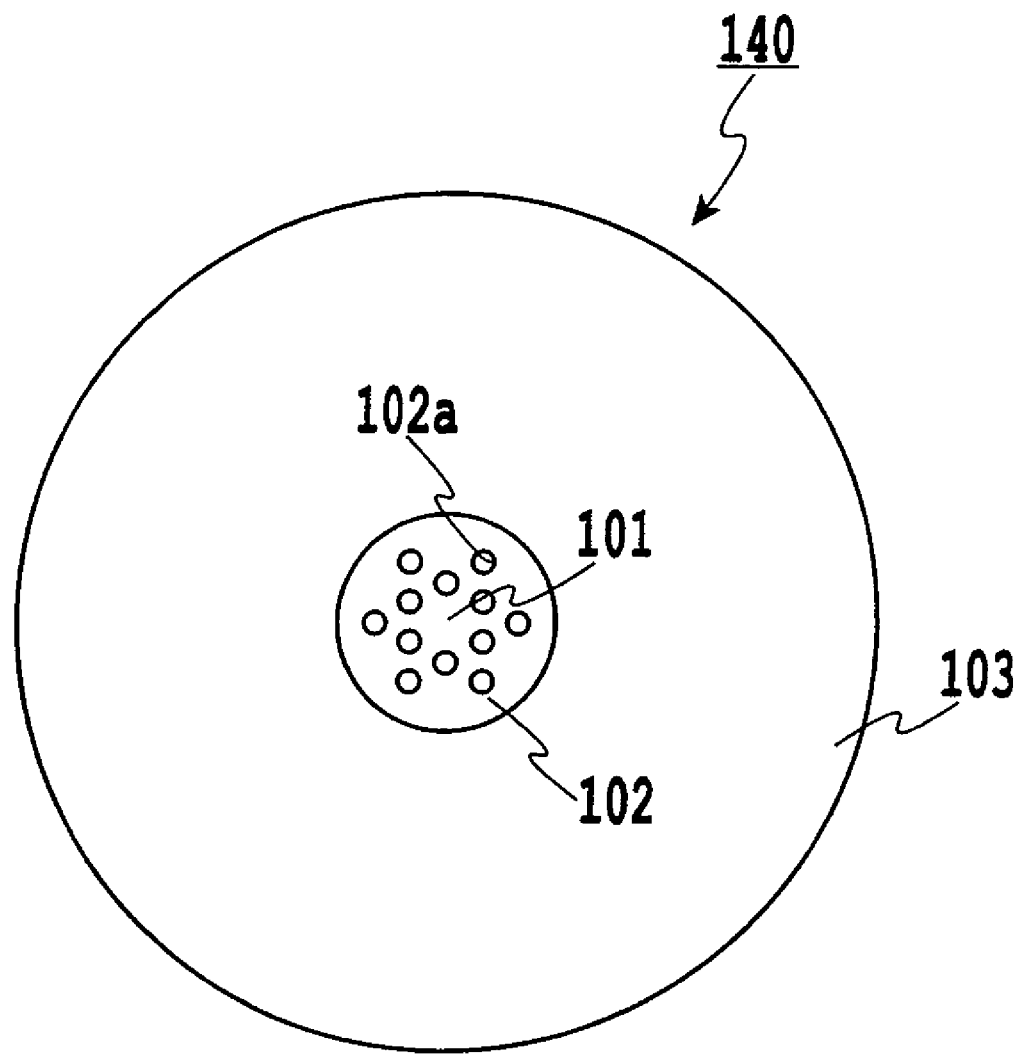
FIG. 22 is a cross-sectional view in a radial direction showing a schematic structure of an optical fiber of an example 10 in accordance with the present invention.
Figure 23:
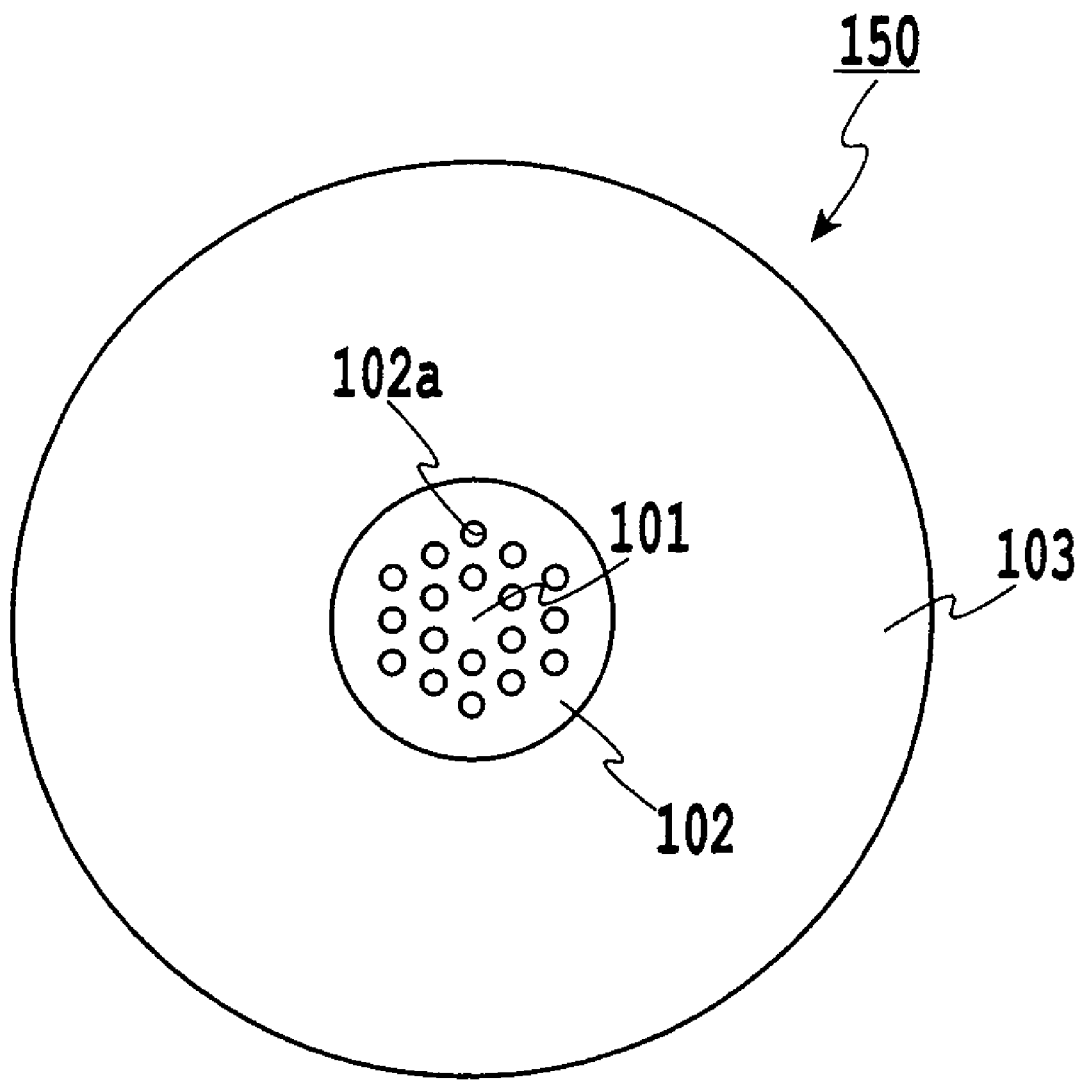
FIG. 23 is a cross-sectional view in a radial direction showing another schematic structure of the optical fiber of the example 10 in accordance with the present invention.

As an example 10 in accordance with the present invention, it is possible to form such optical fibers 140 and 150 as shown in FIGS. 22 and 23 that have the air holes 102a of the first cladding section 102 formed in a multilayer (double layer) fashion in the radial direction of the first cladding section 102.

As a variation of the example 10 in accordance with the present invention, it is also possible to make the cross section geometry in the radial direction of the air holes 102a in the first cladding section 102 an ellipse or polygon.

Example 11

Figure 24:
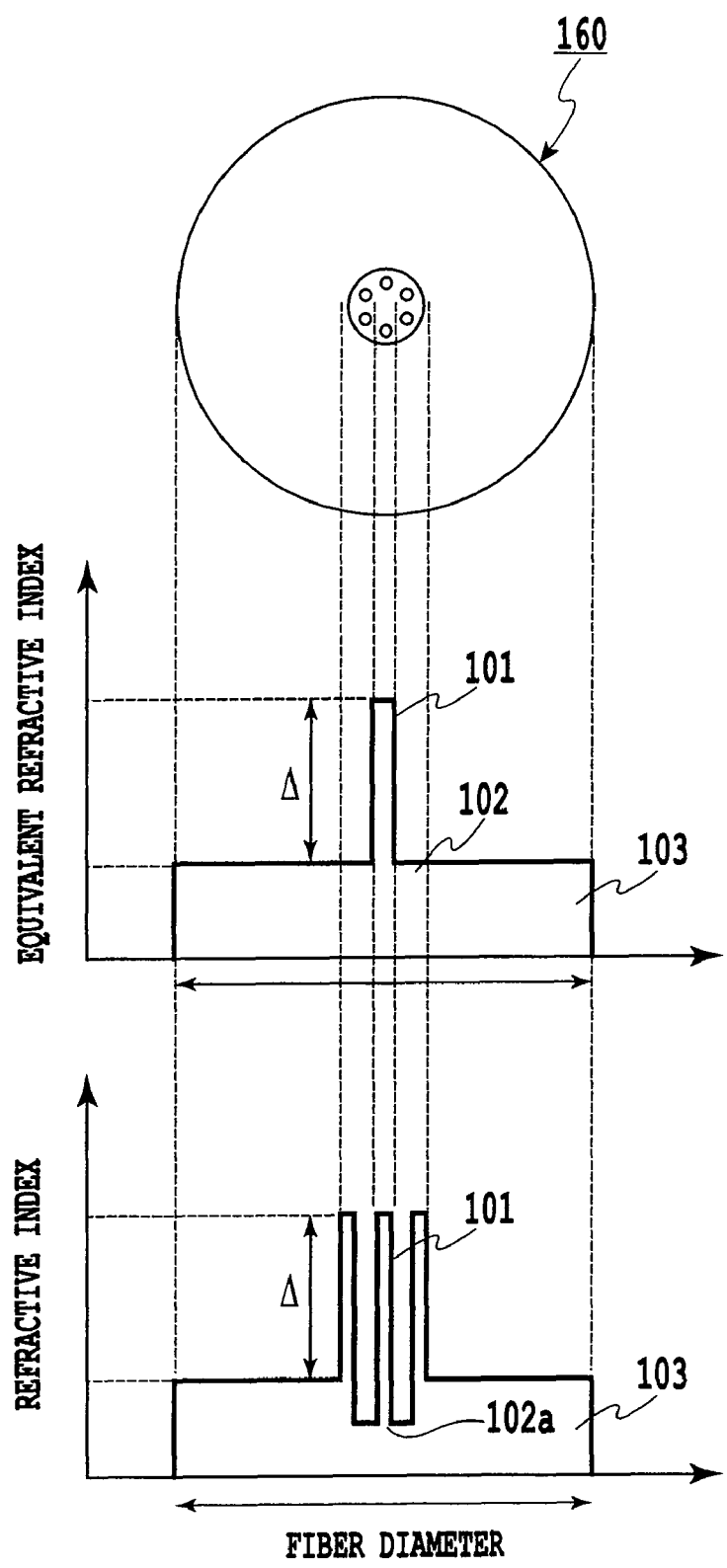
FIG. 24 is a graph illustrating an equivalent refractive-index profile and a refractive-index profile of an optical fiber of an example 11 in accordance with the present invention.

As an example 11 in accordance with the present invention, it is also possible to make the equivalent refractive index of the first cladding section 102 approximately equal to the refractive index of the second cladding section 103 by filling the air holes 102a in the first cladding section 102 with a glass material with a refractive index lower than the refractive index of the tellurite glass constituting the second cladding section 103 by Δn as shown in FIG. 24. In this case, as the tellurite glass, the glass as defined in claim 1 with the zero dispersion wavelength equal to or greater than 2 μm is used. In particular, among the glass composition ratios of the foregoing Table 1, using the composition ratios other than No. 1 or No. 6 are effective, and the glass doped with a rare-earth element as the glass material as defined in claim 3 is further effective.

The optical fiber 160, the air holes 102a of which are filled with the glass material rather than air, can improve the total mechanical strength as compared with the case where the air holes are filled air. At the same time, when fabricating the optical fiber by drawing from the preform, it is possible to facilitate keeping a constant geometry of the air holes 102a, and to reduce the scattering loss.

Example 12

Figure 25:
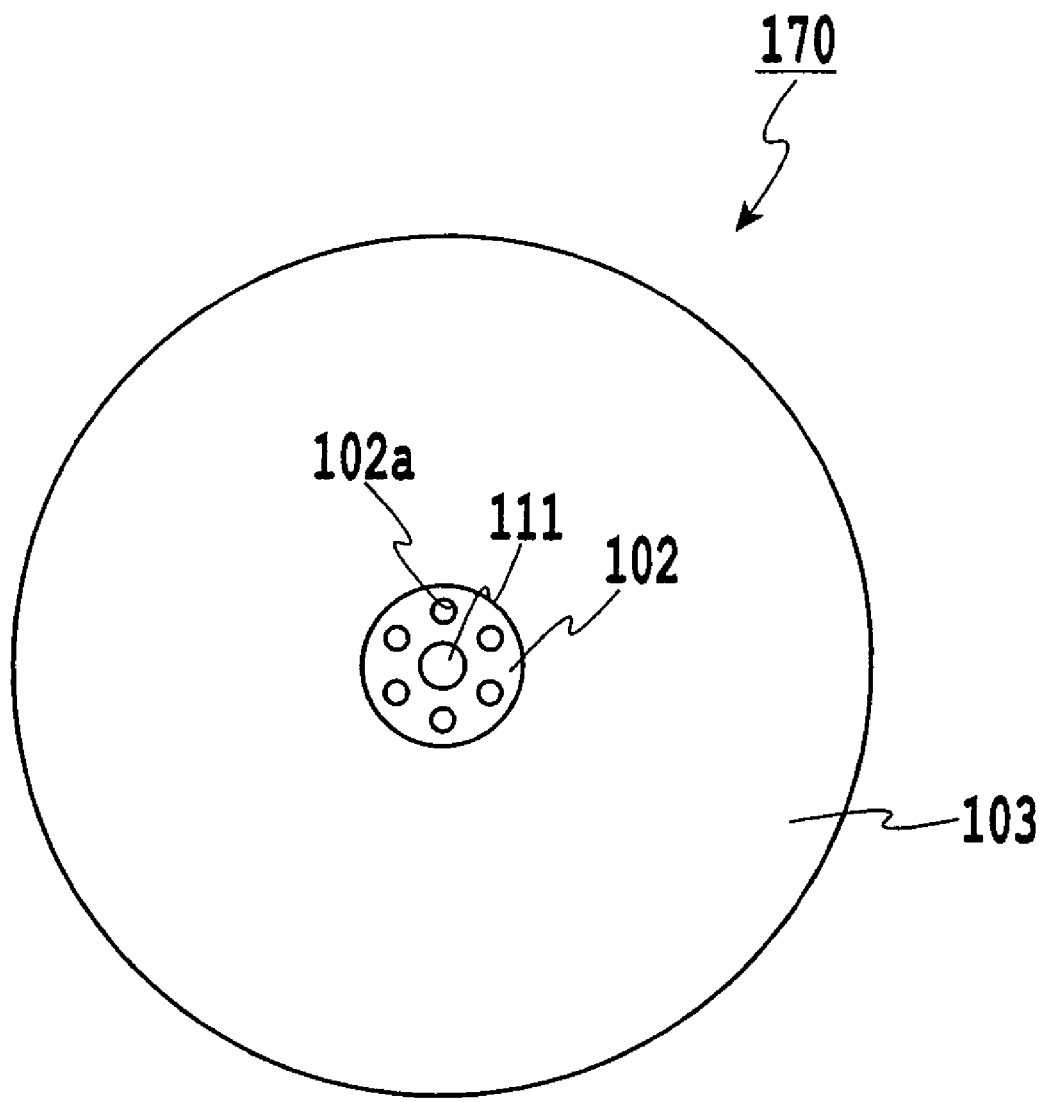
FIG. 25 is a cross-sectional view in a radial direction showing a schematic structure of an optical fiber of an example 12 in accordance with the present invention.

As an example of an example 12 in accordance with the present invention, it is also possible to achieve stronger optical confinement effect by forming an optical fiber 170 with the refractive index of the core section 111 higher than the refractive index of the material of the first cladding section 102 as shown in FIG. 25, that is, by forming the axial center without the air holes 102a as a core section (center core) 111 with a refractive index higher by an amount Δn. In this case, as the tellurite glass, the glass as defined in claim 1 with the zero dispersion wavelength equal to or greater than 2 μm is used. In particular, among the glass composition ratios of the foregoing Table 1, using the composition ratios other than No. 1 or No. 6 are effective, and the glass doped with a rare-earth element as the glass material as defined in claim 3 is further effective.

As for the number and geometry of the air holes 102a, they are appropriately determined so that the equivalent refractive index of the first cladding section 102 becomes approximately equal to the refractive index of the second cladding section 103.

In addition, it is not necessary for the optical fiber in accordance with the present invention to satisfy the strict photonic bandgap condition or the periodicity or uniformity condition as long as the it has the total reflection structure based on the effective refractive index difference between the foregoing core section and cladding section.

Example 13

In the following examples 13-19 in accordance with the present invention, a fabrication method will be described of a glass preform when fabricating a fiber structure with the air holes by using the tellurite glass.

The example 13 in accordance with the present invention employs a mold having a plurality of portions convex on the inner wall as a mold to be used for casting the glass melt. The glass preform molded with the mold is inserted into a jacket tube composed of a hollow cylindrical tellurite glass to form an air hole section in a gap between the glass preform and the jacket tube.

FIGS. 26A-26E show a fabrication method of the photonic crystal fiber of the example 13 in accordance with the present invention. Among the glass composition ratios in Table 1 with the thermal stability index Tx-Tg equal to or greater than 300° C., a glass melt 202 formed by melting the glass material of No. 19 composition is injected into a mold 201 preheated to 300-400° C. (FIG. 26A). The mold 201 has four portions convex on the inner wall formed in such a manner that the injected glass preform has a cross-shaped section. After injecting the glass melt, annealing at a temperature close to 300° C. is carried out for 10 hours or more to fabricate the glass preform 203 (FIG. 26B). In this case, since the mold 201 is divided into four subdivisions to facilitate taking out of the glass preform 203, it can prevent chipping or cracks of the glass preform 203. The hollow cylindrical jacket tube 204 is fabricated (FIG. 26C) by melting the glass materials in the same manner as described above, and by pouring the melt into a hollow cylindrical mold (not shown) which is preheated to 300-400° C., followed by a rotational casting method that rotates the mold at a high speed with keeping the mold in a horizontal position.

The glass preform 203 is inserted into the jacket tube 204, followed by being elongated (FIG. 26D). The elongated preform 205 has a precisely symmetric cross section. A portion 206 of the elongated preform 205, which has a constant wire diameter, is cut therefrom, and is inserted into another jacket tube (not shown) to be elongated again. The air holes are formed in the gap between the glass preform 203 and the jacket tube. The portion 208 in which the holes are formed is pressed during elongating and fiber drawing to carry out the fiber drawing under pressure in such a manner as to maintain or enlarge the air holes, thereby forming the air holes. Regulating the fiber drawing tension at 50 g or greater in terms of the value before passing through a dice for covering with resin, the fiber drawing process is performed to make the outside diameter 110 μm (FIG. 26E), thereby fabricating the photonic crystal fiber 207.

In the elongating process of the present example, the preform of 10-20 mmφ is heated so that its viscosity becomes $10^9$-$10^{10}$ P (poise) that enables the elongating to 3-6 mmφ at the elongating weight of about 200 g. On the other hand, to form the preform with a hole structure from bulk glass by the conventional extrusion process, it is necessary to soften the bulk glass to the viscosity of about $10^6$ P (poise). Consequently, according to the method of the present example, the heating temperature is lower than that of the extrusion process. Thus, it can suppress the growing of the crystal nuclei, and is suitable for fabricating a low loss fiber.

Figure 27B:
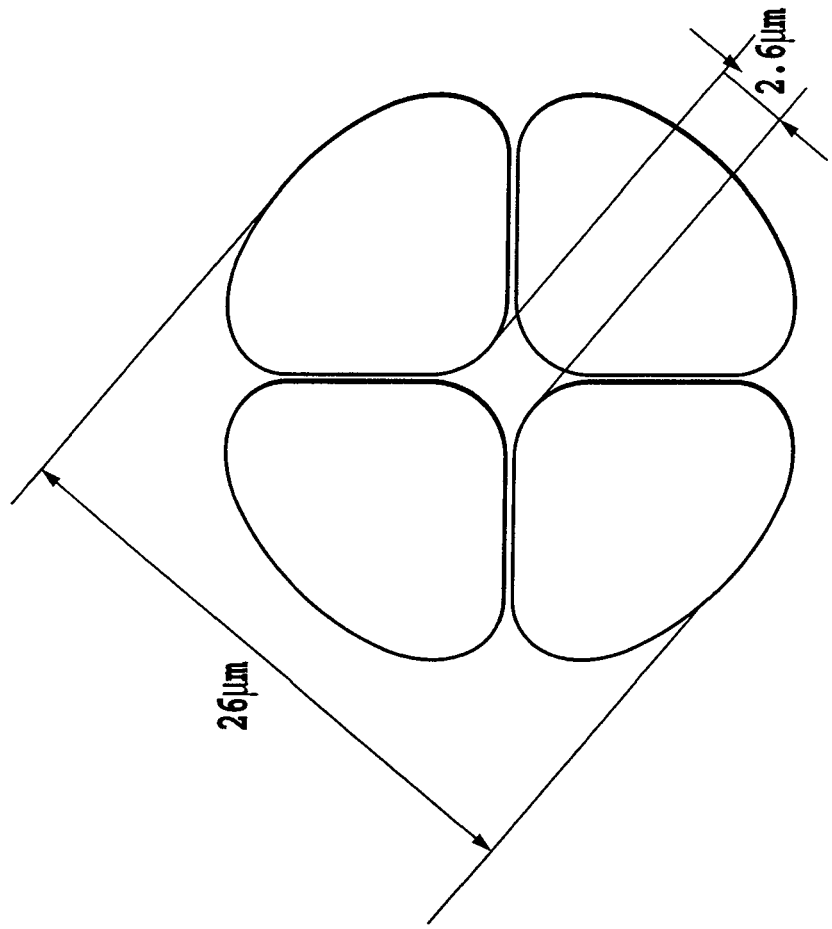
FIG. 27B is an enlarged view showing a major portion of FIG. 27A.
Figure 27A:
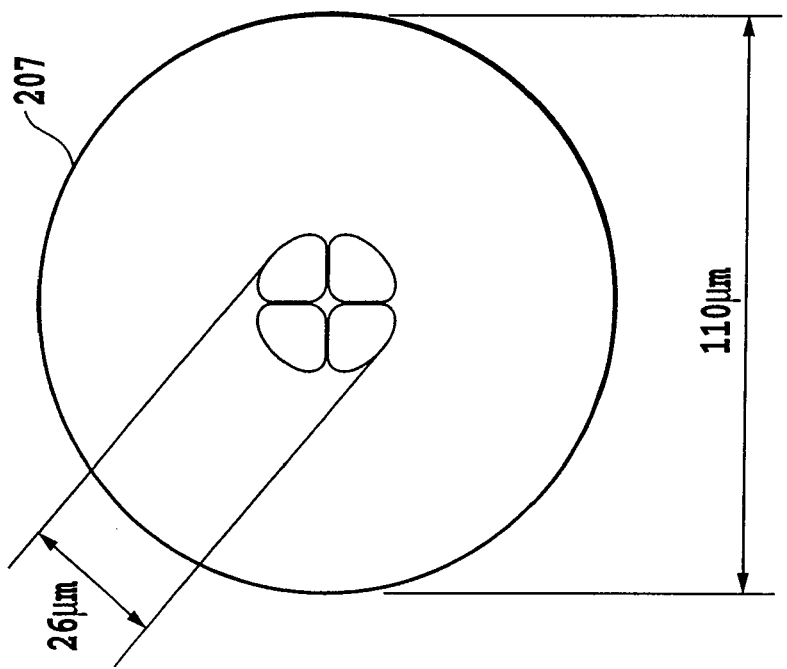
FIG. 27A is a cross-sectional view showing the photonic crystal fiber of the example 13 in accordance with the present invention.

FIG. 27A is a cross-sectional view showing the fabricated photonic crystal fiber. The outside diameter of the photonic crystal fiber 207 is 110 μm, and the inside diameter of the air holes is 26 μm. FIG. 27B is an enlarged view of the portion corresponding to the core for transmitting light, and the core diameter is 2.6 μm. The cross sectional area $A_{eff}$ at which the optical output becomes $1/e^2$ of the peak, is 3.54 μm$^2$, and the γ value (representing the nonlinearity and equal to $2\pi n_2/\lambda A_{eff}$ is 675 W$^{-1}$ km$^{-1}$.

Figure 28:
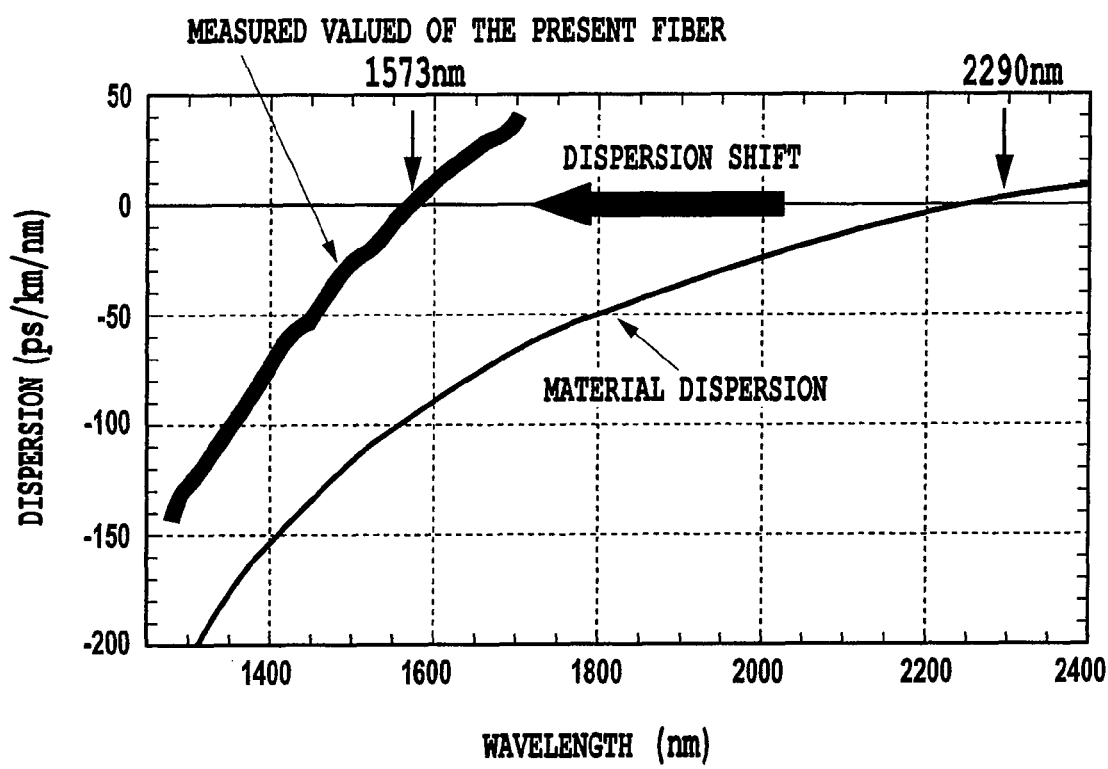
FIG. 28 is a graph illustrating the dispersion of the photonic crystal fiber of the example 13 in accordance with the present invention.

The control of the core diameter and the inside diameter of the air holes is possible by varying the wall thickness of the jacket tube 204 or increasing the number of elongating steps. The photonic crystal fiber of the present example has a loss of 60 dB/km at 1.55 μm, and the zero dispersion wavelength shifts from the material dispersion value 2.29 μm to 1.57 μm (see FIG. 28). Since the air holes are formed symmetrically, no polarization dependence occurs.

Figure 29:
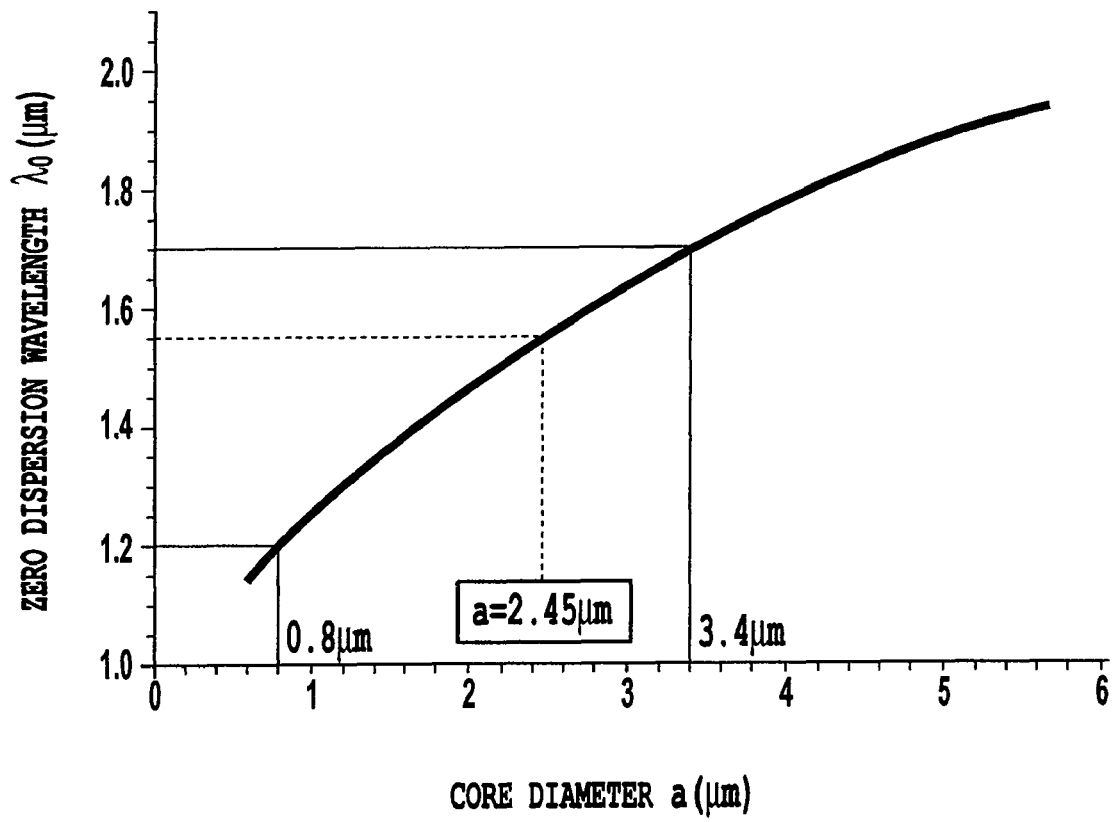
FIG. 29 is a graph illustrating relationships between the core diameter and the zero dispersion wavelength of the photonic crystal fiber of the example 13 in accordance with the present invention.

FIG. 29 illustrates the relationships between the core diameter and the zero dispersion wavelength of the photonic crystal fiber of the example 13. Referring to FIG. 29, it is seen that the core diameter must be controlled at 0.8-3.4 μm in order to control the zero dispersion wavelength at 1.2-1.7 μm. In addition, to make the zero dispersion wavelength 1.55 μm, the core diameter must be set at 2.45 μm.

Figure 30:
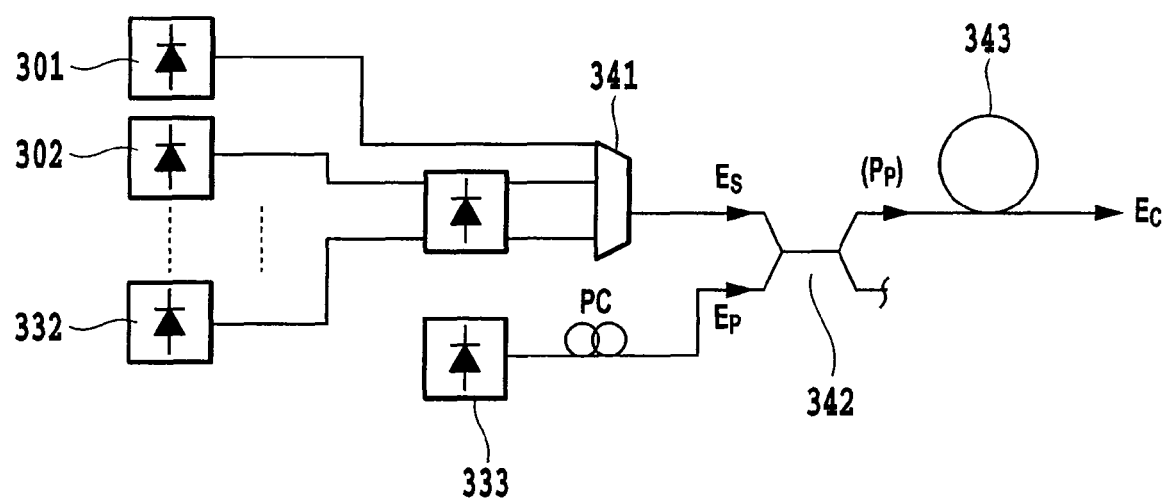
FIG. 30 is a diagram showing a configuration of the wavelength converter of the example 13 in accordance with the present invention.

FIG. 30 shows a configuration of the wavelength converter using the photonic crystal fiber of the example 13. The wavelength converter has light sources 301-332 for outputting 32 WDM signals at 100 GHz intervals in the 1530-1560 nm wavelength band, and a light source 333 for outputting 1565 nm pumping light. In addition, it has an AWG (Arrayed Waveguide Grating) 341 for multiplexing the outputs of the light sources 301-332; an optical coupler 342 for coupling the multiplexed WDM signal light Es and the pumping light Ep; and a photonic crystal fiber 343 of the example 13 with the length of 50 m. With such a configuration, the wavelength converter collectively converts the wavelengths of the 32 WDM signals, and outputs converted light Ec.

Figure 31:
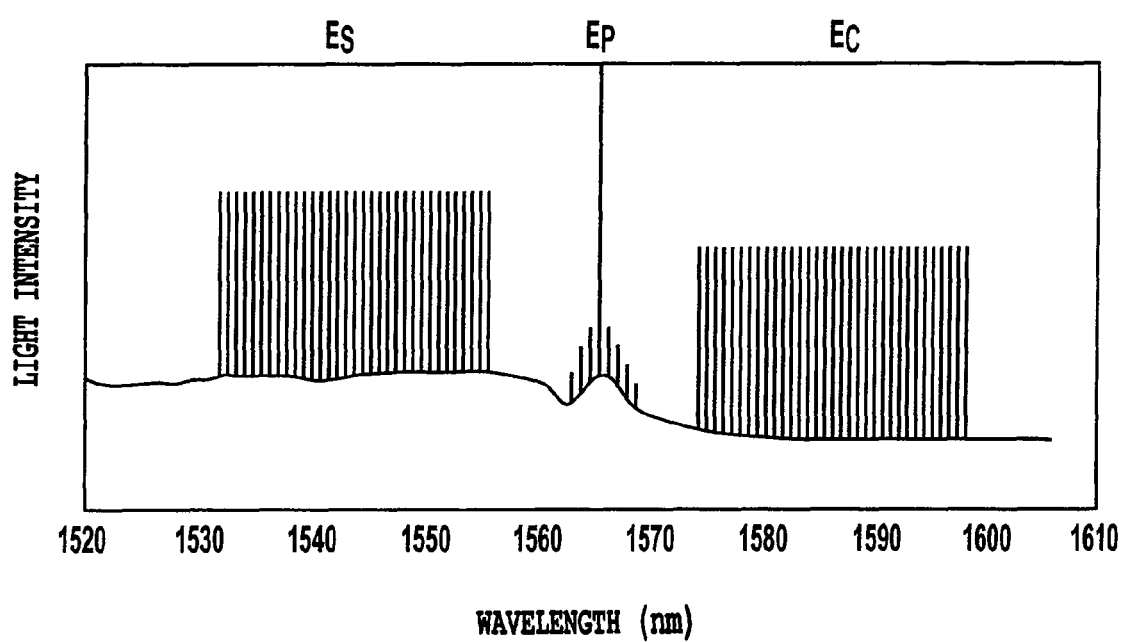
FIG. 31 is a characteristic diagram illustrating an output spectrum of the wavelength converter of FIG. 30.

FIG. 31 shows an output spectrum of the wavelength converter. For the pumping light Ep with the power of 40 mW, the conversion efficiency is −15 dB, and the wavelength batch conversion of the bandwidth of 70 nm can be carried out.

Example 14

In the example 14 in accordance with the present invention, a fiber was constructed which had the same structure as the example 13 except for doping Er by 5000 ppm by using the No. 14 sample as a glass composition.

A wavelength converter with the same configuration as that of FIG. 30 is fabricated using the photonic crystal fiber. The wavelength converter employs light sources 301-332 for outputting 32 WDM signals at 100 GHz intervals in the 1530-1560 nm wavelength band, and a light source 333 for outputting 1480 nm pumping light and 1565 nm pumping light. Using a photonic crystal fiber 343 of the example 14 with a length of 15 m, the wavelength converter amplifies the signals and collectively converts the wavelengths at the same time. For the 1480 nm pumping light with power of 50 mW, and the 1565 nm pumping light with power of 50 mW, it can carry out the wavelength batch conversion whose conversion efficiency is 5 dB and bandwidth is 70 nm.

Incidentally, applying the photonic crystal fiber of the present example 14 with a length of 15 m to a nonlinear fiber loop mirror which will be described later with reference to FIG. 44 makes it possible to carry out switching of the signal light which undergoes high-speed modulation and has a repetition frequency of 80 GHz and pulse width of 8 ps by gate light with power of 10 mW.

Figure 37:
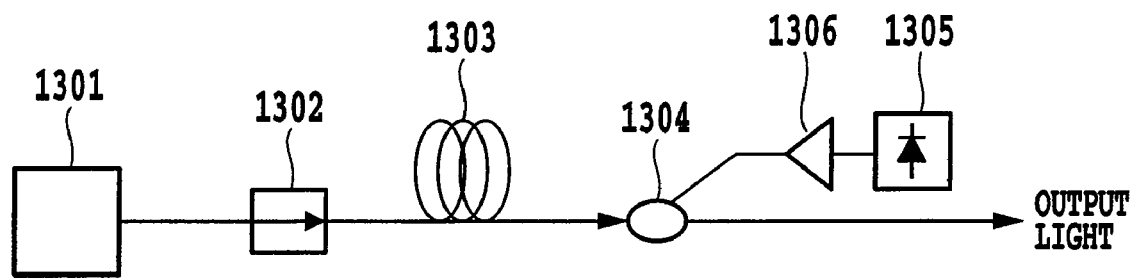
FIG. 37 is a diagram showing a configuration of a parametric optical amplifier of the example 16 in accordance with the present invention.

FIG. 37 shows a parametric optical amplifier using a photonic crystal fiber of the present example 14. The parametric optical amplifier includes a wavelength variable light source 1301, an isolator 1302, the photonic crystal fiber 1303 of the present example 14 with a length of 150 m, and an optical coupler 1304 which are connected in cascade. The optical coupler 1304 receives at its rear end the output of a light source 1305 with a wavelength of 1560 nm and pumping light power of 1.5 W via an EDFA amplifier 1306.

Figure 38:
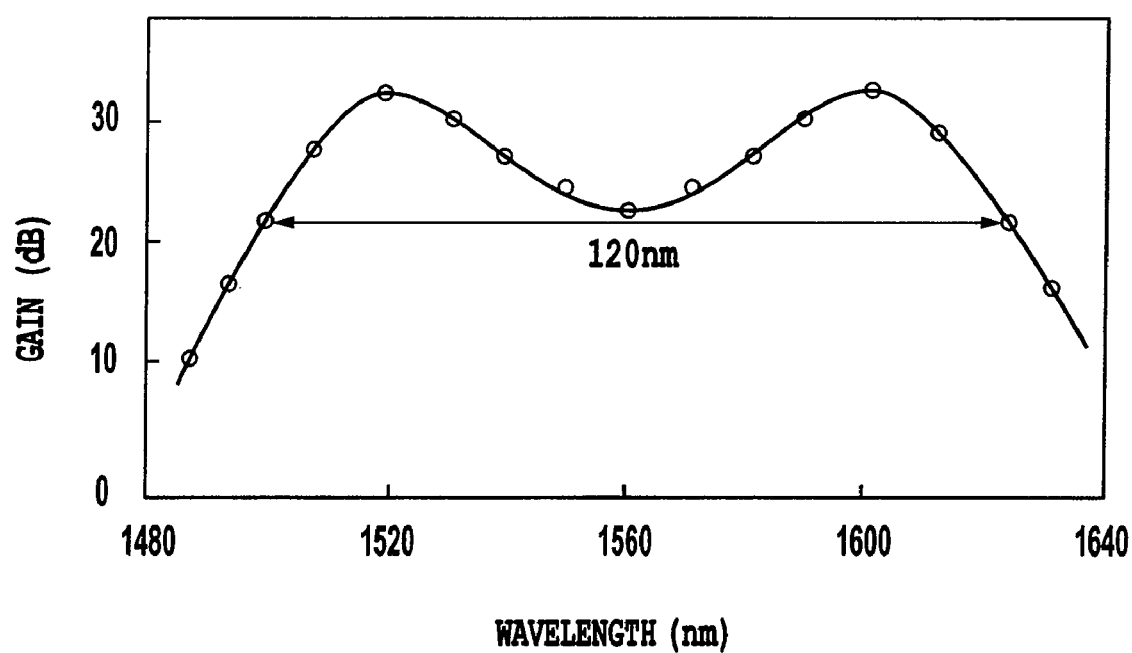
FIG. 38 is a graph illustrating an output spectrum of the parametric optical amplifier of FIG. 37.

FIG. 38 illustrates an output spectrum of the parametric optical amplifier. The output spectrum, which is obtained as a result of wavelength scanning measurement using signal light of −30 dBm, shows that a gain equal to or greater than 20 dB is obtained over a 120 nm wavelength band from 1500 to 1620 nm.

Example 15

The method of the example 15 in accordance with the present invention fabricates a solid cylindrical glass block composed of tellurite glass, and then fabricates a glass preform including an air hole section by drilling holes in the longitudinal direction of the glass block. In this method, the glass preform is inserted into a jacket tube composed of hollow cylindrical tellurite glass, followed by fiber drawing.

Figure 32C:
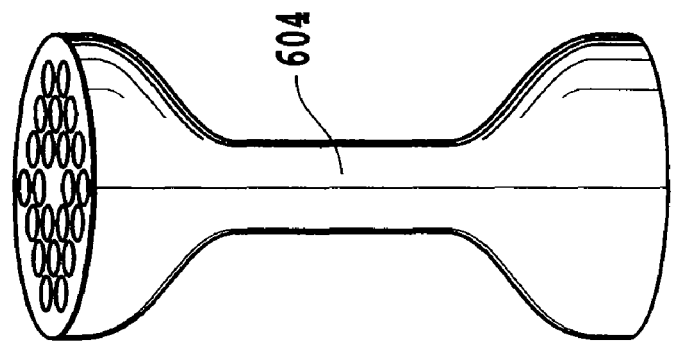
FIG. 32C is a process diagram showing a third step of the fabrication method of the photonic crystal fiber of the example 15 in accordance with the present invention.
Figure 32B:
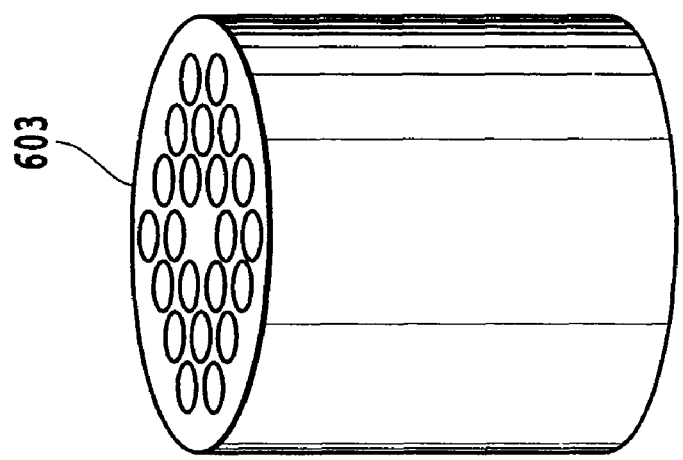
FIG. 32B is a process diagram showing a second step of the fabrication method of the photonic crystal fiber of the example 15 in accordance with the present invention.
Figure 32A:
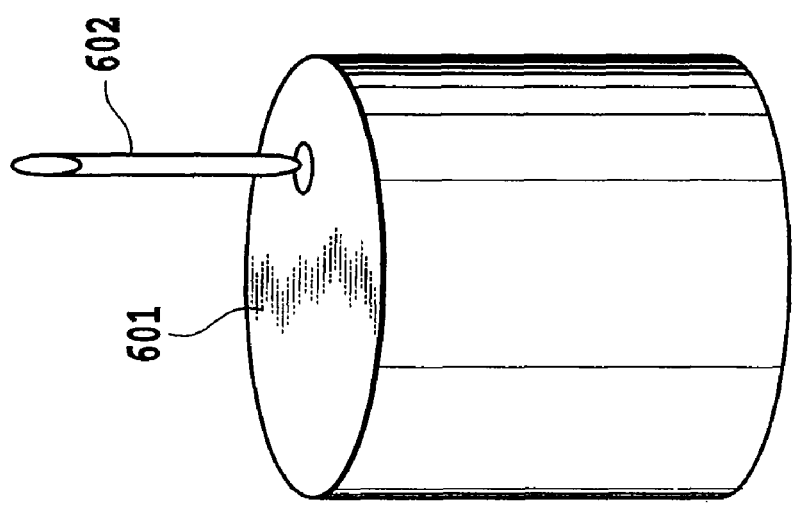
FIG. 32A is a process diagram showing a first step of a fabrication method of a photonic crystal fiber of an example 15 in accordance with the present invention.

FIGS. 32A-32C shows a fabrication method of the photonic crystal fiber of the example 15 in accordance with the present invention. Referring to the foregoing Table 1, a glass melt formed by melting the glass material of No. 15 composition with the thermal stability index Tx−Tg equal to or greater than 300° C. is injected into a mold preheated to 300-400° C. After injecting the glass melt, annealing at a temperature close to 300° C. is carried out for 10 hours or more to fabricate the solid cylindrical glass block 601 (FIG. 32A). A plurality of holes are bored through the glass block 601 in its longitudinal direction with a 3 mmφ drill 602, thereby forming a glass preform 603 (FIG. 32B). The glass preform 603 is elongated to 3 mmφ, and a portion 604 of the elongated preform at which wire diameter is constant is cut to fabricate the photonic crystal fiber (FIG. 32C).

Figure 33:
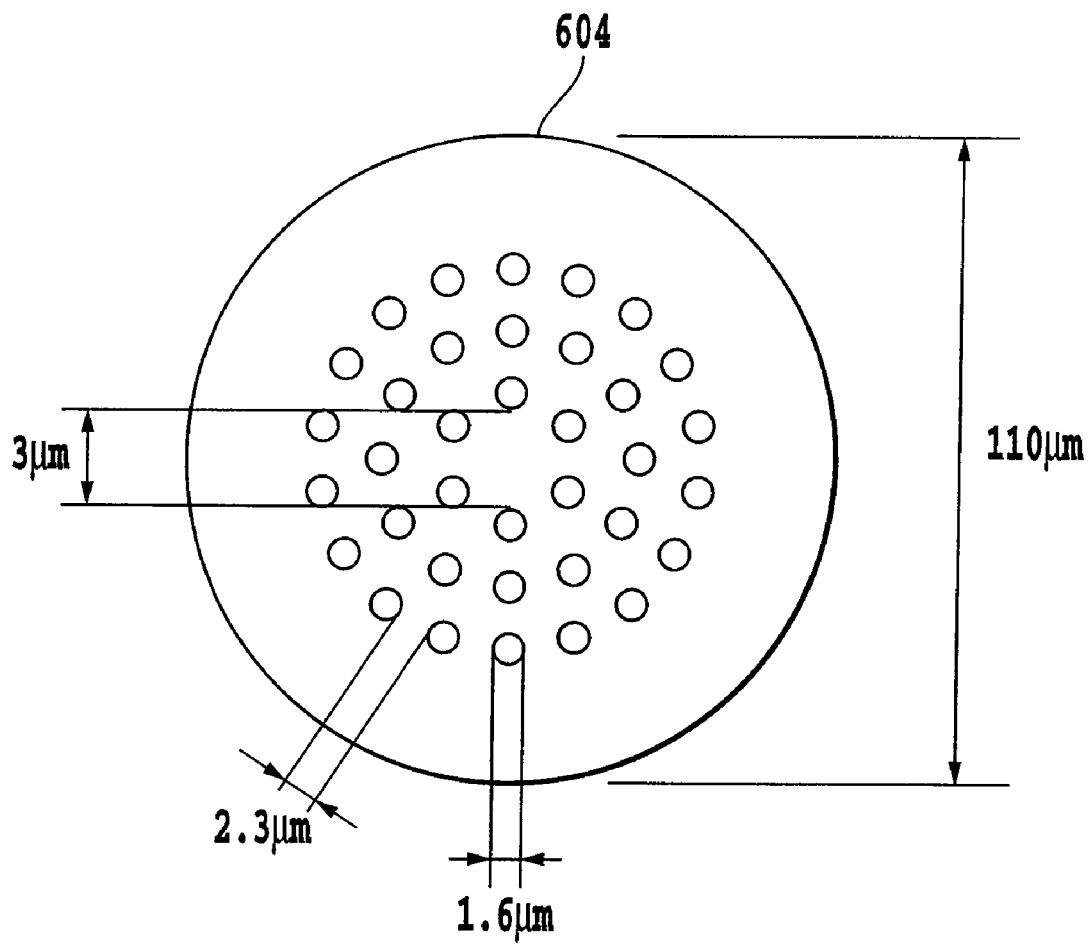
FIG. 33 is a cross-sectional view showing the photonic crystal fiber of the example 15 in accordance with the present invention.

FIG. 33 is a cross-sectional view showing the photonic crystal fiber fabricated. The outside diameter of the photonic crystal fiber is 110 μm, the air hole diameter d is 1.6 μm, the pitch Δ between the air holes is 2.3 μm and hence d/Δ=0.7. The MFD (Mode Field Diameter) is 3 μm, the loss of the fiber is 40 dB/km at 1.55 μm, and the zero dispersion wavelength is 1.55 μm.

Figure 34:
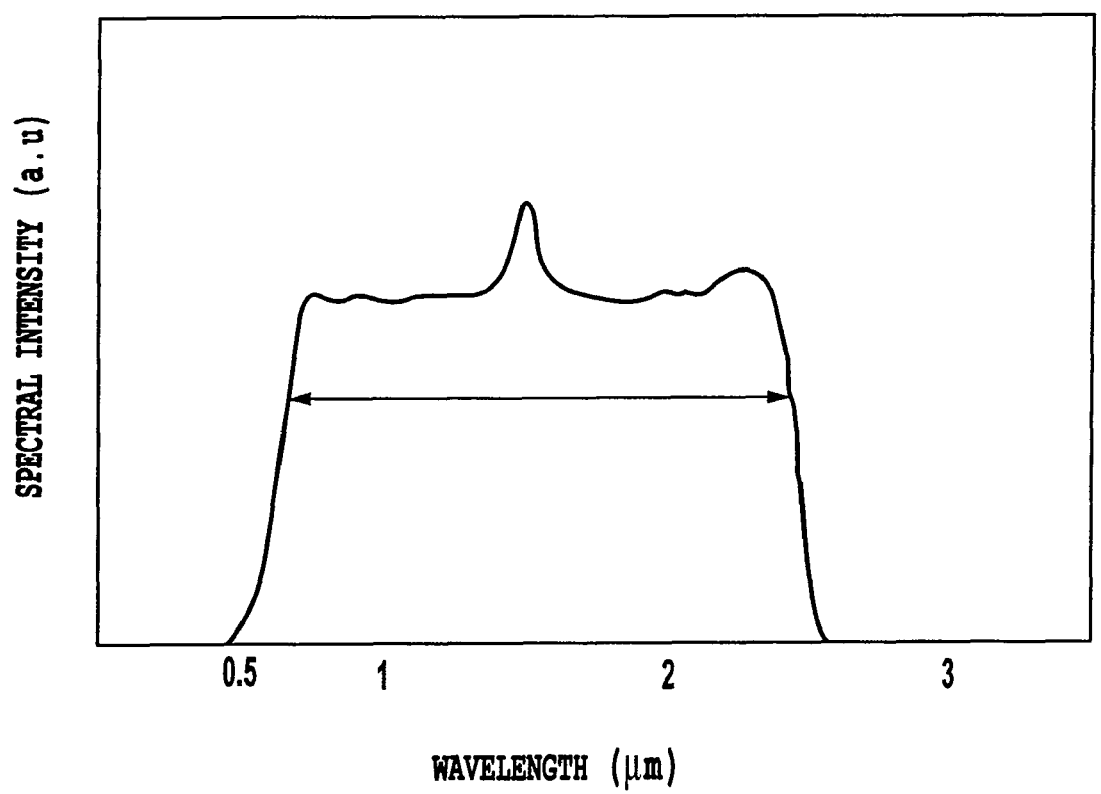
FIG. 34 is a graph illustrating a spectrum of supercontinuum light generated in the photonic crystal fiber of the example 15 in accordance with the present invention.

Into the photonic crystal fiber with a length of 150 m, pulse pumping light is launched whose wavelength is 1.55 μm, pulse width is 0.5 ps, and peak power is 30 W. In this case, the photonic crystal fiber outputs supercontinuum light over a 1.7 μm bandwidth (0.7-2.4 μm) as illustrated in FIG. 34.

Example 16

In the example 16 in accordance with the present invention, a mold which is used for cast molding glass melt has a plurality of cylindrical rodlike pins disposed inside the mold from its bottom. Following the cast molding, the preheated pins are extracted quickly to form an air hole section.

FIGS. 35A-35B shows the fabrication method of the photonic crystal fiber of the example 16 in accordance with the present invention. Referring to the foregoing Table 1, a glass melt 802 formed by melting the glass material of No. 9 composition with the thermal stability index Tx−Tg equal to 180° C. is injected into molds 801a and 801b (a combination of which is designated by a reference numeral 801 from now on) preheated to 300-400° C. (FIG. 35A). The mold 801 has a jig including a plurality of cylindrical rodlike pins 805 arranged on its internal base 804. After casting the glass melt 802 in the mold 801, the pins 805 are extracted quickly, thereby fabricating the glass preform 803 having the air holes formed (FIG. 35B).

The photonic crystal fiber is fabricated by carrying out elongating and fiber drawing using the glass preform 803 in the same manner as the foregoing example 15. The photonic crystal fiber fabricated has the same cross section as that of FIG. 33: its outside diameter is 120 µm, air hole diameter d is 1.5 µm, pitch $\Delta$ between the air holes is 2.3 µm, and hence $d/\Delta=0.65$. The MFD is 2.5 µm, the loss of the fiber is 65 dB/km at 1.55 µm, and the zero dispersion wavelength is 1.55 µm.

Into the photonic crystal fiber with a length of 50 m, pulse pumping light is launched whose wavelength is 1.55 µm, pulse width is 0.5 ps, and peak power is 30 W. In this case, the pulses undergo soliton effect, and "soliton self phase shift" is observed which shifts the pulse spectrum toward the longer wavelength side as the pulses travel through the fiber.

Figure 36:
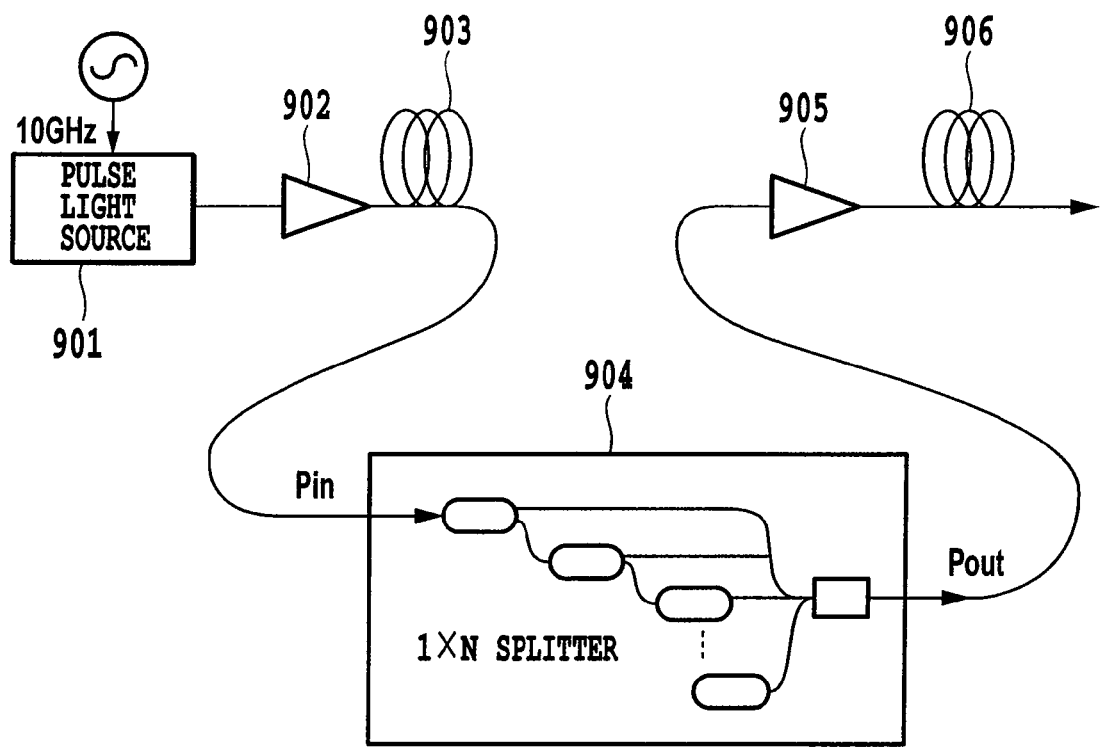
FIG. 36 is a diagram showing a configuration of a wavelength variable pulse light source of the example 16 in accordance with the present invention.

FIG. 36 shows a wavelength variable pulse light source using the photonic crystal fiber of the present example 16. The light source is a wavelength variable pulse light source that utilizes the effect that varies the spectrum shift amount by varying the peak power of the incident pulse. The wavelength variable pulse light source includes a pulse light source 901 modulated at 10 GHz, an optical amplifier 902, a photonic crystal fiber 903 of the present example 16 with a length of 50 m, and a programmable PLC (planer lightwave circuit) multi-demultiplexer 904, which are connected in cascade.

In addition, an optical amplifier 905, and a photonic crystal fiber 906 of the present example 16 with a length of 50 m are connected in cascade to the output of the programmable PLC multi-demultiplexer 904. With such a configuration, the wavelength variable pulse light source outputs optical pulses with a wavelength variable range of 150 nm (1550-1700 nm) at a channel rate of 10-100 Gbit/s.

A wavelength converter with the same configuration as that of FIG. 30 is fabricated using the photonic crystal fiber. The wavelength converter employs light sources 301-332 for outputting 32 WDM signals at 100 GHz intervals in the 1530-1560 nm wavelength band, and a light source 333 for outputting 1480 nm pumping light and 1565 nm pumping light. Using a photonic crystal fiber 343 of the example 16 with a length of 15 m, the wavelength converter amplifies the signals and collectively converts the wavelengths at the same time. For the 1480 nm pumping light with power of 50 mW, and the 1565 nm pumping light with power of 50 mW, it can carry out the wavelength batch conversion whose conversion efficiency is 5 dB and bandwidth is 70 nm.

Incidentally, applying the photonic crystal fiber of the present example 16 with a length of 15 m to the nonlinear fiber loop mirror which will be described later with reference to FIG. 44 makes it possible to carry out switching of the signal light which undergoes high-speed modulation and has a repetition frequency of 80 GHz and pulse width of 8 ps by gate light with power of 10 mW.

FIG. 37 shows a parametric optical amplifier using a photonic crystal fiber of the present example 16. The parametric optical amplifier includes a wavelength variable light source 1301, an isolator 1302, a photonic crystal fiber 1303 of the present example 16 with a length of 150 m, and an optical coupler 1304 which are connected in cascade. The optical coupler 1304 receives at its rear end the output of a light source 1305 with a wavelength of 1560 nm and pumping light power of 1.5 W via an EDFA amplifier 1306.

FIG. 38 illustrates an output spectrum of the parametric optical amplifier. The output spectrum, which is obtained as a result of wavelength scanning measurement using signal light of −30 dBm, shows that a gain equal to or greater than 20 dB is obtained over a 120 nm wavelength band from 1500 to 1620 nm.

Example 17

In the example 17 in accordance with the present invention, the photonic crystal fiber has a core/cladding structure with a composition of different refractive indices rather than with a single composition of tellurite glass.

In addition, in the example 17 in accordance with the present invention, the mold used for casting the glass melt is processed in such a manner that its lower portion is conically enlarged. Using the mold, the cladding and core are injected sequentially, and a preform is used which is formed by conically suction molding the core glass by the volume contraction of the cladding glass. In this case, the upper portion of the mold has an inner wall with convex toward the inside, and the areas into which the core glass is suctioned are small. Accordingly, to suction the core effectively, optimization of the injection temperature and the like is required.

FIGS. 39A-39B and FIGS. 40A-40B show a fabrication method of the photonic crystal fiber of the example 17 in accordance with the present invention. As the core glass, the No. 18 composition of the foregoing Table 1 is used, and Tm is doped by 4000 ppm. As the cladding glass, the No. 17 composition of the foregoing Table 1 is used. As for the mold 1501, a plurality of portions are formed on the inner wall as in the mold of FIG. 26A, and its lower portion is conically enlarged toward its bottom (FIG. 39A). The mold 1501 is preheated at 300-400° C., the glass melt 1502 of the cladding and the glass melt 1503 of the core are sequentially injected, and the glass preform 1504 is fabricated whose core glass is conically suction molded by the volume contraction of the cladding glass (FIG. 39B). The suction length of the core glass is 15 mm.

Figure 40A:
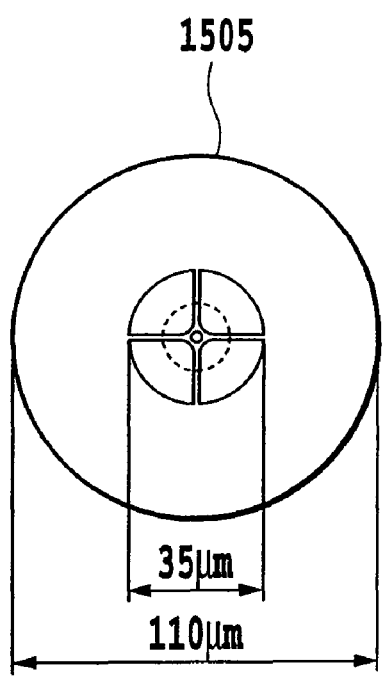
FIG. 40A is a cross-sectional view showing the photonic crystal fiber of the example 17 in accordance with the present invention.
Figure 40B:
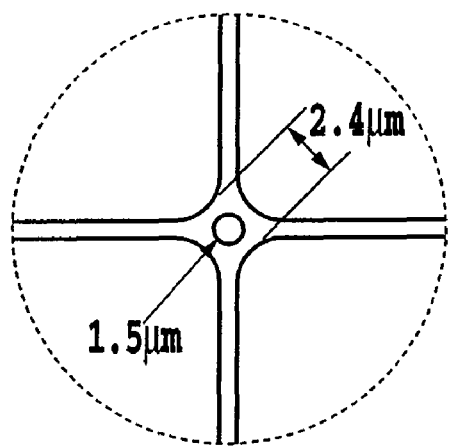
FIG. 40B is an enlarged view of a major portion of FIG. 40A.

The photonic crystal fiber 1505 is fabricated by carrying out the same elongating and fiber drawing process as that of the foregoing example 13 using the glass preform 1504. FIG. 40A is a cross-sectional view showing the photonic crystal fiber 1505. As for the photonic crystal fiber 1505, the outside diameter is 110 µm, the inside diameter of the air holes is 35 µm, the cross-shaped central section is 2.4 µm and the core diameter doped with Tm is 1.5 µm. The MFD is 2.9 µm, and the loss of the fiber is 30 dB/km at 1.55 µm. Thus, introducing, as the core, glass components different from those of the cladding, makes it possible to reduce the loss as compared with the case without having the above core/cladding structure. The zero dispersion wavelength is 1.52 µm.

Splicing the photonic crystal fiber of the present example 17 to a silica fiber (with a relative refractive index difference of 4%, and MFD of 3 µm) using a commercially available fusion splicer enables the splicing at a loss of 0.2 dB and a return loss equal to or less than −50 dB. For the purpose of comparison, splicing the photonic crystal fiber with the single composition of the foregoing example 13 and the silica fiber has a loss of 2 dB and a return loss of −19 dB because of the collapse of the core geometry.

Consider the case where the photonic crystal fiber of the present example 17 with a length of 20 m is applied to the wavelength converter of FIG. 30. The WDM signal light Es multiplexed by the AWG 341 of the wavelength converter is a signal formed by multiplexing 32 WDM signals in the wavelength band of 1480-1510 nm at 100 GHz intervals. The pumping light Ep consists of the 1410 nm pumping light used for exciting Tm, and the 1520 nm pumping light used for both the wavelength conversion and Tm excitation. The wavelength converter amplifies the signals and collectively converts the wavelengths of the 32 WDM signals at the same time, and outputs as the converted light Ec. In addition, the wavelength converter can carry out the wavelength batch conversion with the conversion efficiency of 5 dB and the bandwidth of 70 nm for the 1480 nm pumping light with power of 50 mW, and for the 1565 nm pumping light with power of 50 mW.

Example 18

To facilitate the core suction as compared with the foregoing example 17, the example 18 in accordance with the present invention has a structure that enables opening of a hole after injecting glass to the bottom of the conical section of the lower portion of the mold. Leakage of the glass from the hole brings about the synergistic effect with the contraction of the glass. Drawing a vacuum in order to leak the glass out of the hole causes the synergistic effect with the contraction of glass.

Figure 41C:
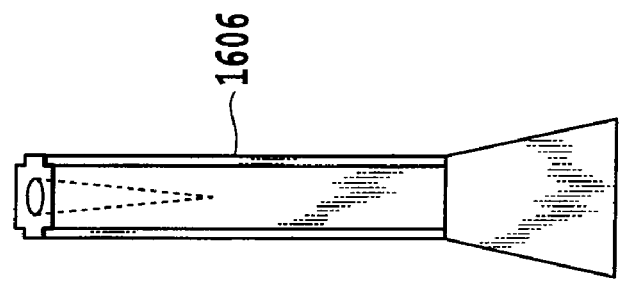
FIG. 41C is a view showing the photonic crystal fiber fabricated by the process of FIG. 41A.
Figure 41B:
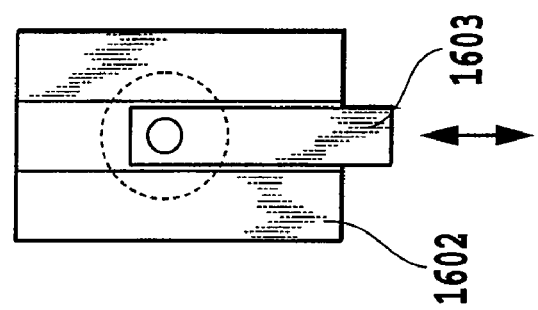
FIG. 41B is a view showing a structure of a major portion of a fabrication apparatus of FIG. 41A.
Figure 41A:
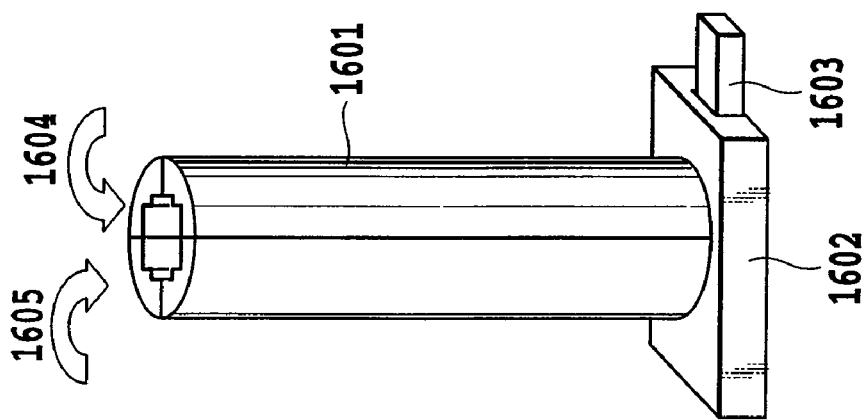
FIG. 41A is a process diagram showing a fabrication method of a photonic crystal fiber of an example 18 in accordance with the present invention.

FIGS. 41A-41C show a fabrication method of the photonic crystal fiber of the example 18 in accordance with the present invention. As the core glass, the No. 20 composition of the foregoing Table 1 is used, and as the cladding glass, the No. 21 composition of the foregoing Table 1 is used. A mold 1601 has a plurality of portions convex on the inner wall, and is processed in such a manner that its lower portion is conically enlarged toward its bottom just as the mold shown in FIG. 39A (FIG. 41A). In addition, the mold has such a geometry that includes a base 1602 mounted on the bottom of the mold 1601, and that sliding a movable member 1603 at the center of the base 1602 can form a through hole at the bottom of the mold 1601 (FIG. 41B).

The mold 1601 is preheated at 300-400° C., and the base 1602 is preheated at 350-450° C. independently. Then, the glass melt 1604 of the cladding and the glass melt 1605 of the core are injected successively (FIG. 41A). Because of the volume contraction of the cladding glass and the hole opened at the bottom (FIG. 41B), the main portion of the cladding glass flows out so that a glass preform 1606 is obtained which is formed by sucking the core glass (FIG. 41C). The suction length of the core is 25 mm.

The photonic crystal fiber 1505 is fabricated by carrying out the same elongating and fiber drawing process as that of the foregoing example 13 using the glass preform 1606 thus formed. The structure of the photonic crystal fiber is the same as that of the foregoing FIG. 40A: the outside diameter is 115 µm, the inside diameter of the air holes is 20 µm, the cross-shaped central section is 2.8 µm and the core diameter is 1.2 µm. The MFD is 2.5 µm, the loss of the fiber is 25 dB/km at 1.55 µm, and the zero dispersion wavelength is 1.55 µm.

Figure 42:
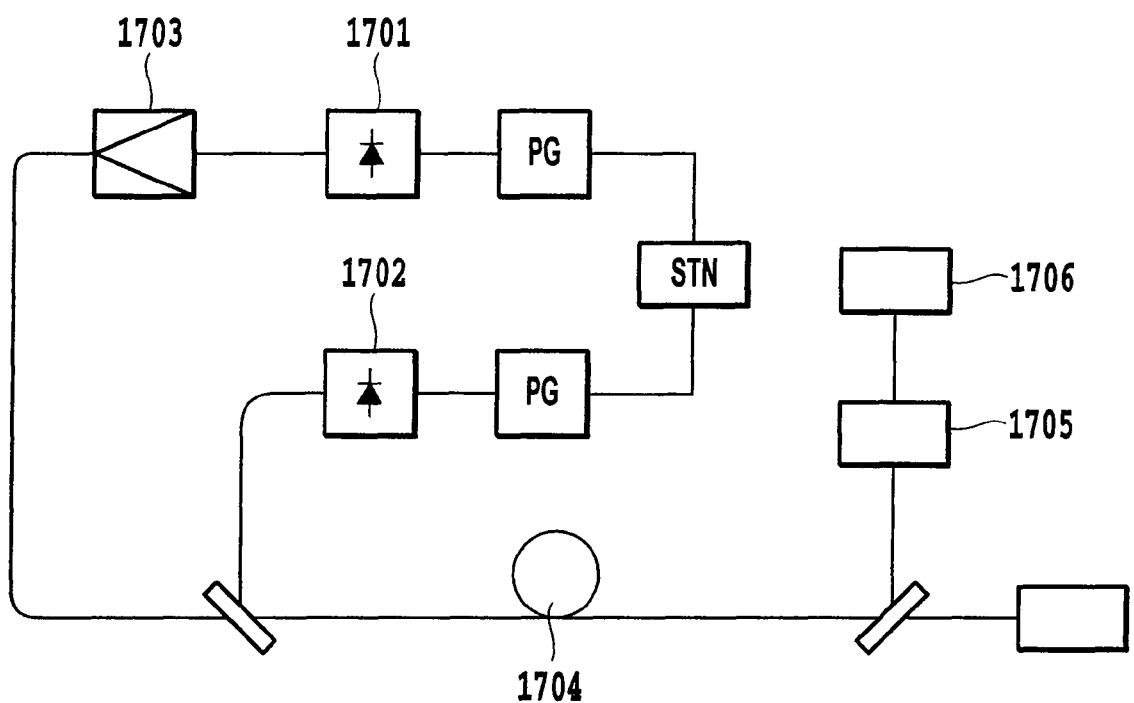
FIG. 42 is a diagram showing a configuration of an optical Kerr shutter experimental system of an example 18 in accordance with the present invention.

FIG. 42 shows an optical Kerr shutter experimental system using the photonic crystal fiber of the present example 18. The optical Kerr shutter experimental system includes a DFB-LD (distributed feedback-laser diode) 1701 for outputting control light with a wavelength of 1552 nm, a DFB-LD 1702 for outputting signal light with a wavelength of 1535 nm, and an Er-doped fiber amplifier 1703 for amplifying the control light, and the control light and signal light are launched into a photonic crystal fiber 1704 of the present example 18 with a length of 10 m in such a manner that their polarization directions make 45 degrees with each other. The signal light is branched from the output of the photonic crystal fiber 1704, and is input to a streak camera 1706 via a polarizer 1705.

With such a configuration, when the control light is not launched into, the polarized wave of the signal light travels through the photonic crystal fiber 1704 with a certain fixed direction, and is intercepted by the polarizer 1705. On the other hand, when the control light is launched into, because of the nonlinear refractive index effect of the photonic crystal fiber 1704, the polarized components of the signal light change and transmit through the polarizer 1705. In this way, the optical Kerr shutter experimental system can switch the signal light pulse with a width of 8 ps.

Example 19

To facilitate the suction of the core, the example 19 in accordance with the present invention has a structure that opens the hole after injecting glass to the bottom of the conical section of the lower portion of the mold, and draws to a vacuum in order to leak the glass out of the hole, thereby bringing about the synergistic effect with the contraction of the glass.

In addition, during the fiber drawing under pressure carried out in such a manner as to keep or enlarge the air holes formed in the preform, the example 19 in accordance with the present invention facilitates the control of the hole formation and hole diameter by making the tension in the fiber drawing equal to or greater than 50 g.

FIG. 43A-FIG. 43C show a fabrication method of the photonic crystal fiber of the example 19 in accordance with the present invention. As the core glass, the No. 13 composition of the foregoing Table 1 is used, and as the cladding glass, the No. 16 composition of the foregoing Table 1 is used. A mold 1801 has a plurality of portions convex on the inner wall, and is processed in such a manner that its lower portion is conically enlarged toward its bottom just as the mold shown in FIG. 39A (FIG. 43A). In addition, the mold 1801 has such a geometry that includes a base 1802 mounted on the bottom of the mold 1801, and that sliding a movable member 1803 at the center of the base 1802 can form a hole at the bottom of the mold 1801 (FIG. 43B). Using the hole enables vacuum degassing from the bottom of the mold 1801.

The mold 1801 is preheated at 300-400° C., and the base 1802 is preheated at 350-450° C. independently. Then, the glass melt 1804 of the cladding and the glass melt 1805 of the core are injected successively (FIG. 43A). Because of the volume contraction of the cladding glass and the vacuum degassing from hole at the bottom (FIG. 43B), the main portion of the cladding glass flows out so that a glass preform 1806 is obtained which is formed by sucking the core glass (FIG. 43C). The suction length of the core is 50 mm.

The photonic crystal fiber is fabricated by carrying out the same elongating and fiber drawing process as that of the foregoing example 13 using the glass preform 1806 thus formed. The structure of the photonic crystal fiber is the same as that of the foregoing FIGS. 40A and 40B: the outside diameter of the fiber is 120 μm, the inside diameter of the air holes is 28 μm, the cross-shaped central section is 2.6 μm and the core diameter is 1.3 μm. The MFD is 2.3 μm, the loss of the fiber is 28 dB/km at 1.55 μm, and the zero dispersion wavelength is 1.56 μm.

Figure 44:
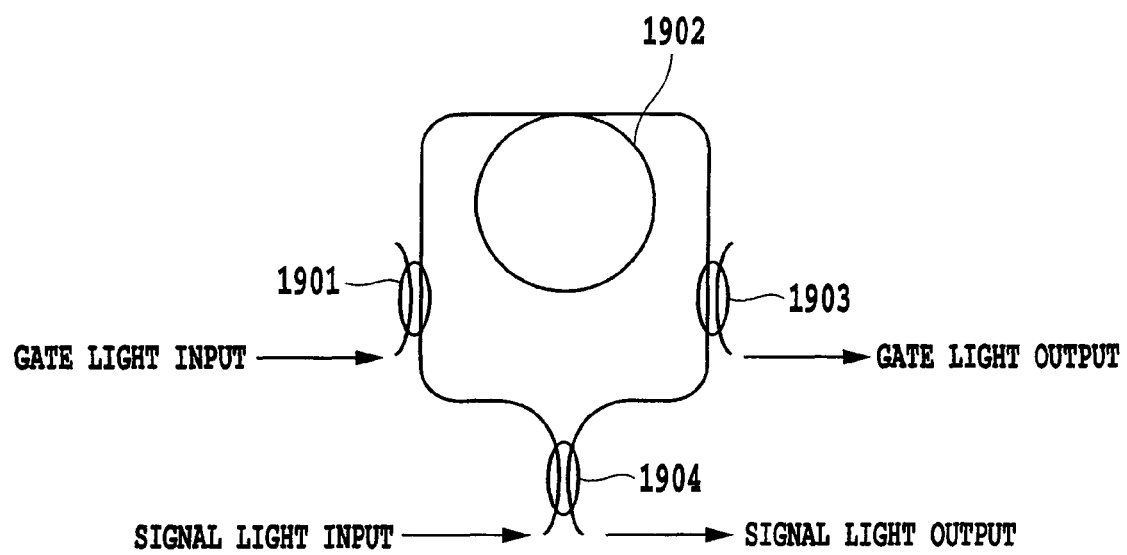
FIG. 44 is a diagram showing a configuration of a nonlinear fiber loop mirror of an example 19 in accordance with the present invention.

FIG. 44 shows the nonlinear fiber loop mirror using a photonic crystal fiber of the present example 19. The nonlinear fiber loop mirror includes an optical coupler 1901 into which gate light is launched, a photonic crystal fiber 1902 of the present example 19 with a length of 15 m, an optical coupler 1903 for outputting the gate light, and an optical coupler 1904 for inputting and outputting signal light, which are connected in cascade to form a loop.

The signal light is bifurcated by the optical coupler 1904, and the two signal lights travel through the photonic crystal fiber 1902 in forward and reverse directions. The signal lights are input to the optical coupler 1904 again, interfere with each other, and are output. In this case, switching is carried out by controlling the phase changes of the signal light in the photonic crystal fiber 1902 in response to the gate light input to the optical coupler 1901. The gate light with power of 200 mW enables the switching of the signal light which undergoes high-speed modulation, and has the repetition frequency of 80 GHz and pulse width of 8 ps.

Using the same fabrication method of the example 13 shown in FIGS. 26A-26E, up to the elongating process is carried out after inserting the No. 11 composition of the foregoing Table 1 into the jacket tube. In the present example 19, maintaining the pressure to the air holes at a fixed value, the fiber drawing tension is adjusted at 50 g or greater in terms of the value before passing through a dice for covering with resin. As illustrated in FIGS. 27A-27B, the outside diameter of the photonic crystal fiber is 110 μm. As for a fiber #1 (1000 m) fabricated by the present method and a fiber #2 (1000 m) processed at the fiber drawing tension of 30 g, the stability of the inside diameters of the air holes in the longitudinal direction is compared.

The fiber #1 has an error of ±5 μm for the design value of 26 μm of the inside diameter of the air holes. The actually usable portions within 26 μm±1 μm are 70% of the total length, and even the shortest portion has 50 m or more length. On the other hand, the fiber #2 has an error of ±20 μm for the design value of 26 μm of the inside diameter of the air holes. The actually usable portions within 26 μm±1 μm are 20% of the total length, and only a few portions have 50 m or more length.

It is found from the foregoing comparison that it is important to set the fiber drawing tension at 50 g or more in terms of the value before passing through the dice for covering with resin in the fiber drawing process carried out with matching the size of the air holes to the design value and maintaining it. The setting is also important for the fiber drawing process of other photonic crystal fibers. The cross-shaped center of the fiber #1 is 2.6 μm. The MFD is 2.4 μm, the loss of the fiber is 24 dB/km at 1.55 μm, and the zero dispersion wavelength is 1.56 μm.

Figure 45:
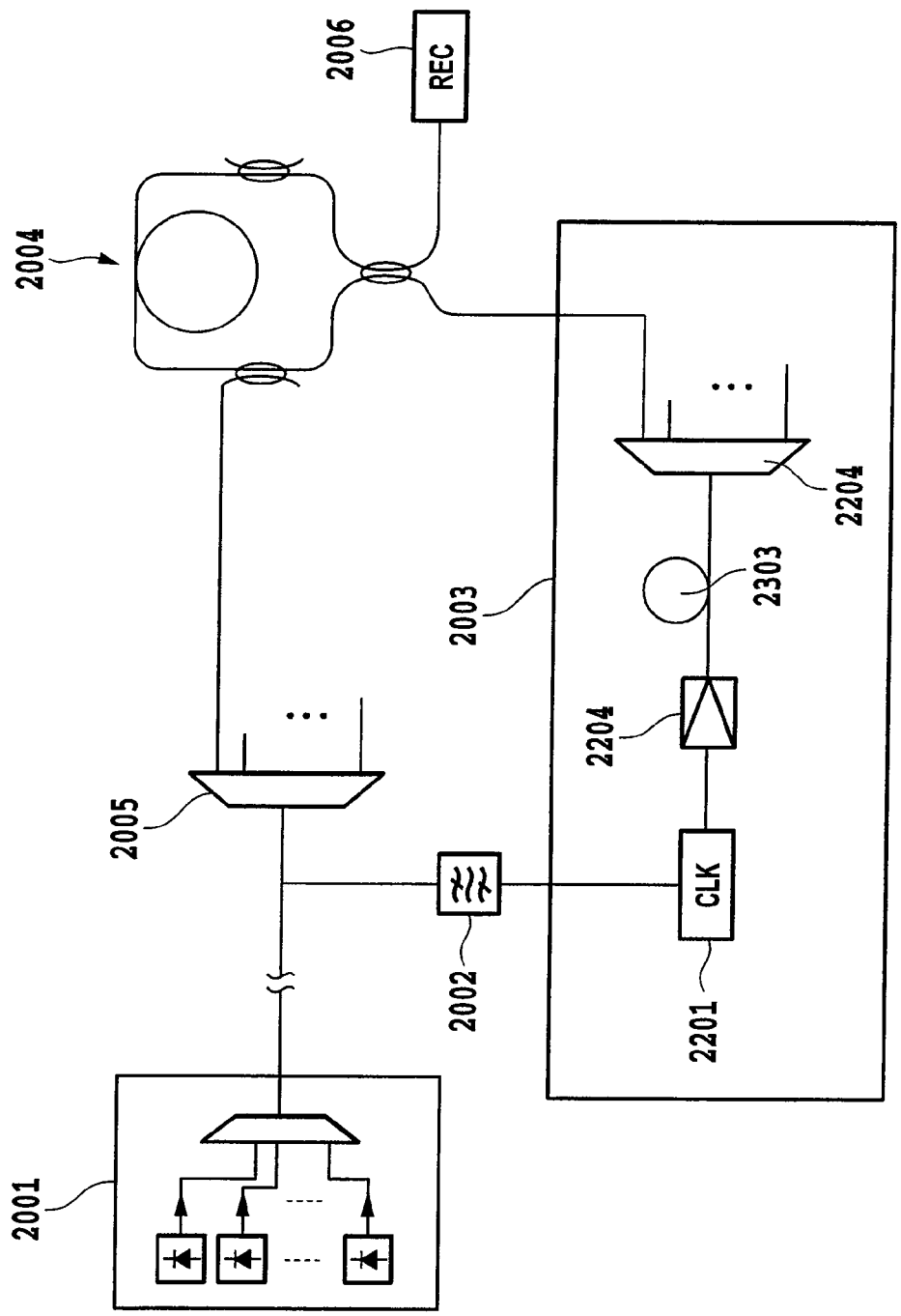
FIG. 45 is a diagram showing a configuration of a clock reproduction apparatus of the example 19 in accordance with the present invention.

FIG. 45 shows a clock reproduction apparatus using a photonic crystal fiber of an example 19 in accordance with the present invention. The clock reproduction apparatus 2003 of a WDM transmission system receives with a clock reproduction section 2201a single wavelength signal selected by a wavelength selective filter 2002, to which the WDM signal transmitted from a transmitter 2001 is input, and extracts an RF clock signal. A mode-locked fiber laser in the clock reproduction section 2201 reproduces an optical pulse from the extracted clock signal. An EDFA 2204 amplifies the optical pulse train, and supplies it to a photonic crystal fiber 2203 of the present example 19 with a length of 30 m. The photonic crystal fiber 2203 generates supercontinuum light over a 100 nm bandwidth from 1.5 to 1.6 μm, and supplies it to an AWG 2204. The AWG 2204 carries out filtering to restore the clock pulse signals for the channels passing through the wavelength division multiplexing from the single channel clock reproduction.

The clock pulse signal of any one of the channels is launched into a nonlinear loop mirror 2004 using a photonic crystal fiber of the present example 19 with a length of 50 m. Supplying the nonlinear loop mirror 2004 with the channel corresponding to the WDM signal transmitted from the transmitter 2001 as the gate light makes it possible to implement an optical 3R reproduction that restores degraded signal quality.

Although the foregoing examples 13-19 have a plurality of portions formed in such a manner that they are convex on the inner wall of the mold, and four air holes formed, the number of the air holes is not limited to that number. In addition, optical devices that use the present fiber are not limited to the foregoing examples 13-19, but are optical devices that employ the present fiber as a highly nonlinear fiber.

As described above, the fabrication method of the optical fibers of the examples 13-19 in accordance with the present invention forms the glass preform by the cast molding or compression molding. In either of these molding methods, since the duration of heating the glass preform is shorter than that of the conventional extrusion process, the crystallization in the glass can be suppressed, and low loss optical fibers can be fabricated.

Example 20

The following examples 20-31 in accordance with the present invention disclose a method that disposes a plurality of air holes near the center of a tellurite glass optical fiber, and controls the dispersion characteristics of the fiber by the size of the region surrounded by the air holes.

Figure 46:
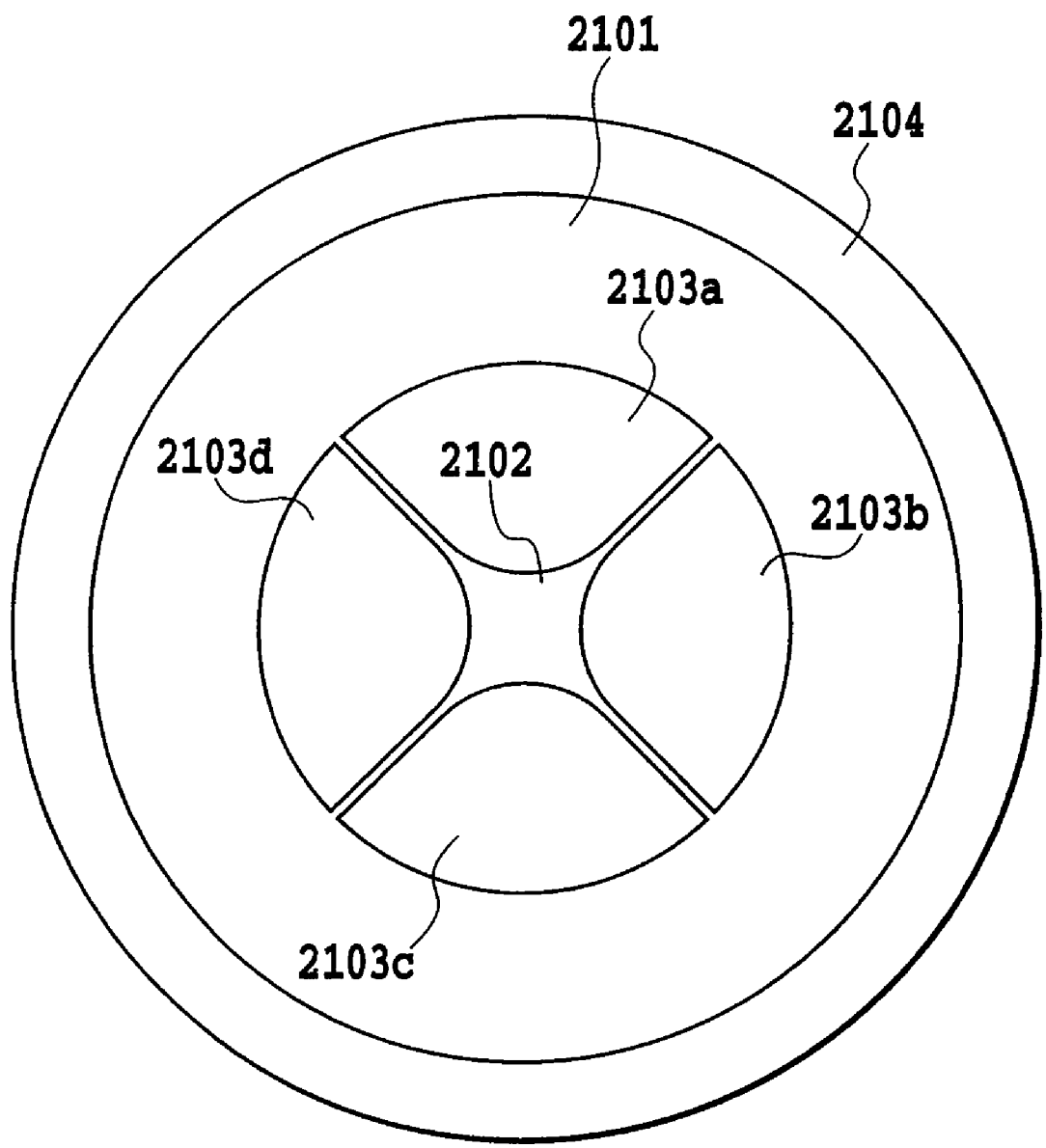
FIG. 46 is a cross-sectional view showing an optical fiber of an example 20 in accordance with the present invention.

FIG. 46 shows a cross sectional view of an optical fiber of the example 20 in accordance with the present invention. Tellurite glass 2101 which is inserted into a jacket tube 2104 and has a zero-material dispersion wavelength of 2.08 μm has four air holes 2103a-2103d (designated by a generic number 2103 from now on). The air holes 2103 are filled with air and their refractive index is approximately one. The portion surrounded by the four air holes 2103 is a region 2102 to become a core for transmitting light. The outside diameter of the tellurite glass 2101 is 100 μm, the inside diameter of the air holes 2103 is 40 μm, and the core diameter is 4.5 μm. The cross sectional area $A_{\mathit{eff}}$ at which the optical output becomes $1/e^2$ of the peak, is 4.1 μm$^2$, and the γ value is 590 W$^{-1}$ km$^{-1}$.

The fabrication process of the photonic crystal fiber of the present example 20 is the same as the fabrication process of FIGS. 26A-26E. Although it will be a duplicate description, a fabrication method of the photonic crystal fiber of the present example 20 will be described for confirmation with reference to FIGS. 26A-26E. The glass melt 202 formed by melting tellurite glass materials is injected into the mold 201 preheated at 300-400° C. (FIG. 26A). The mold 201 has four portions convex on the inner wall formed in such a manner that the injected glass preform has a cross-shaped section. After injecting the glass melt, annealing at a temperature close to 300° C. is carried out for 10 hours or more to fabricate the glass preform 203 (FIG. 26B). In this case, since the mold 201 is divided into four subdivisions to facilitate taking out of the glass preform 203, it can prevent chipping or cracks of the glass preform 203. The hollow cylindrical jacket tube 204 is fabricated (FIG. 26C) by melting the glass materials in the same manner as described above, and by pouring the melt into a hollow cylindrical mold (not shown) which is preheated to 300-400° C., followed by a rotational casting method that rotates the mold at high speed with keeping the mold in a horizontal position.

The glass preform 203 is inserted into the jacket tube 204, followed by being elongated (FIG. 26D). The elongated preform 205 has a precisely symmetric cross section. A portion 206 of the elongated preform 205, which has a constant wire diameter, is cut therefrom, and is inserted into another jacket tube (not shown) to be elongated again. The air holes are formed in the gap between the glass preform 203 and the jacket tube. The portion 208 in which the holes are formed is pressed during elongating and fiber drawing to carry out the fiber drawing under pressure in such a manner as to maintain or enlarge the air holes, thereby forming the air holes. Regulating the fiber drawing tension at 50 g or greater in terms of the value before passing through a dice for covering with resin, the fiber drawing process is performed to make the outside diameter 105 μm (FIG. 26E), thereby fabricating the photonic crystal fiber 207.

In the elongating process of the present example 20, the preform of 10-20 mmϕ is heated so that its viscosity becomes $10^9$-$10^{10}$ P (poise) that enables the elongating to 3-6 mmϕ at the elongating weight of about 200 g. On the other hand, to form the preform with a hole structure from bulk glass by the conventional extrusion process, it is necessary to soften the bulk glass to the viscosity of about $10^6$ P (poise). Consequently, according to the method of the present example, the heating temperature is lower than that of the conventional extrusion process. Thus, it can suppress the growing of the crystal nuclei, and is suitable for fabricating a low loss fiber.

Figure 47:
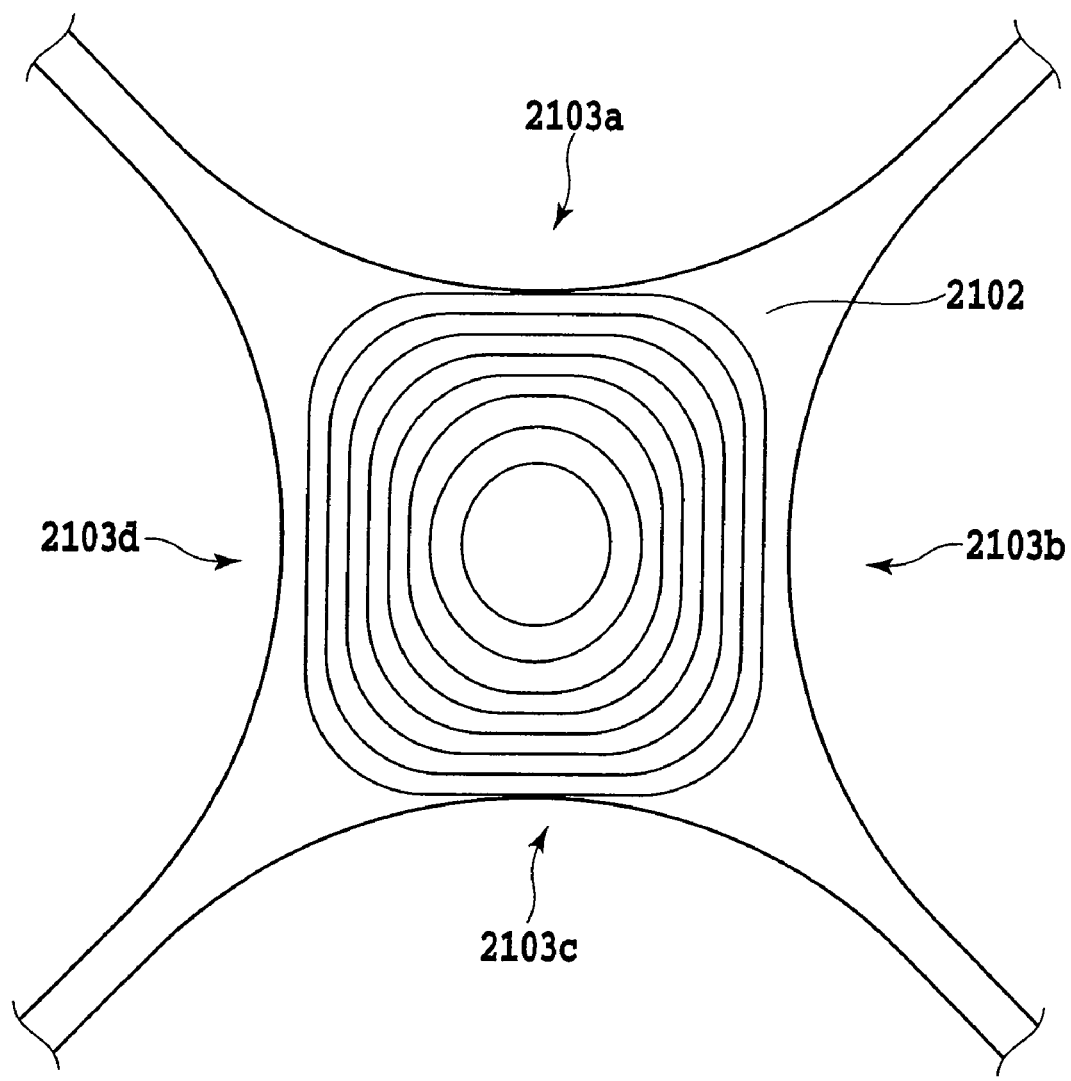
FIG. 47 is a diagram illustrating opto-electric field distribution of the optical fiber of the example 20 in accordance with the present invention.

FIG. 47 illustrates the opto-electric field distribution of the optical fiber of the present example 20. The opto-electric field distribution is obtained using the calculus of finite difference method, one of the numerical calculations. Each one of the contours shows every 10% difference in the electric field. It is found from the calculation results that the optical fiber of the example 20 confines light within the core region 2102 at the center, and that the light propagates through the core. Observing the near field pattern (NFP) and far field pattern (FFP) after cutting and polishing the optical fiber makes it possible to confirm that the light is confined in the fiber central section, and the single mode is achieved.

Figure 48:
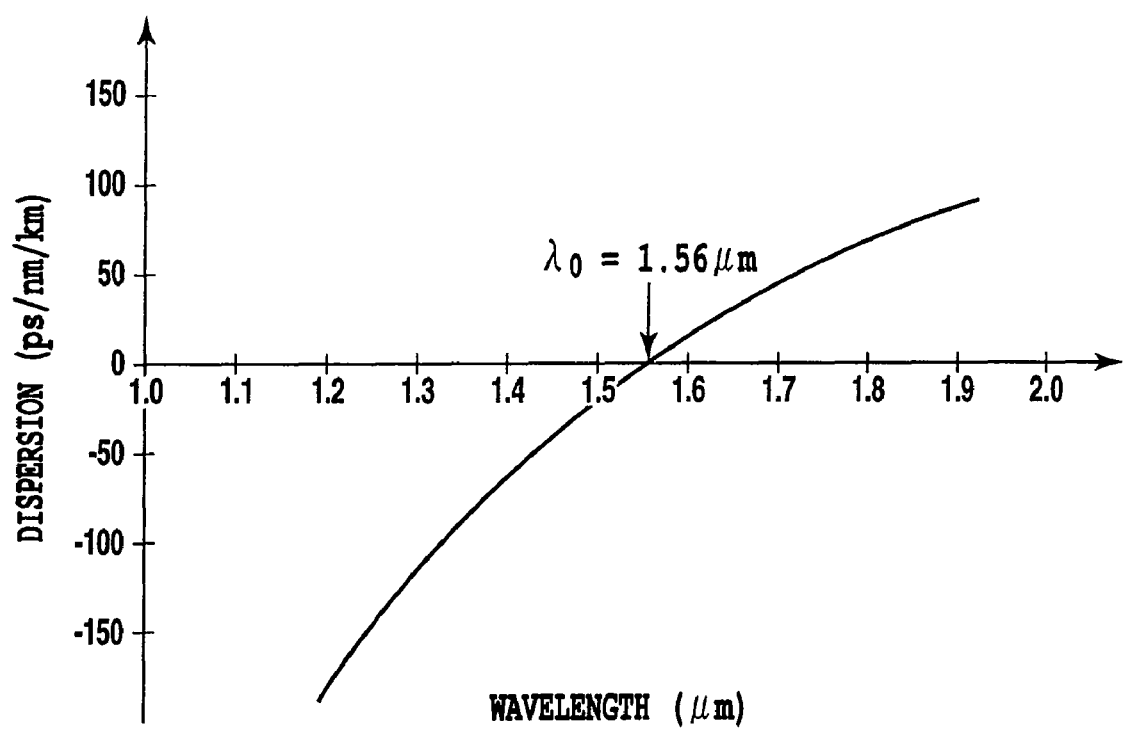
FIG. 48 is a graph illustrating wavelength dispersion of the optical fiber of the example 20 in accordance with the present invention.

FIG. 48 illustrates the wavelength dispersion of the optical fiber of the present example 20. The zero dispersion wavelength $\lambda_0$ of the optical fiber of the example 20 is 1.56 μm.

Example 21

Figure 49:
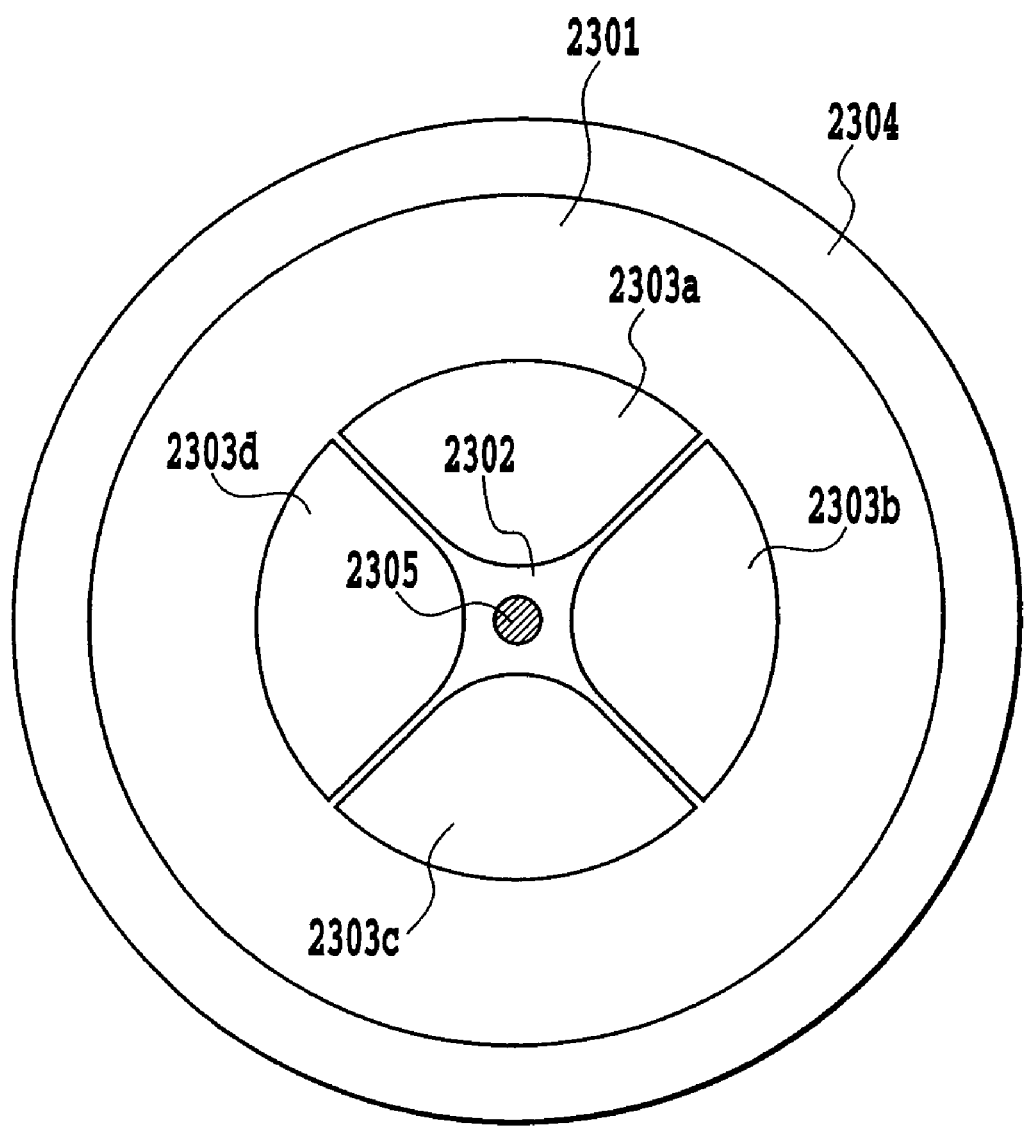
FIG. 49 is a cross-sectional view showing an optical fiber of an example 21 in accordance with the present invention.

FIG. 49 shows an optical fiber of the example 21 in accordance with the present invention. Tellurite glass 2301 with the No. 15 composition of the foregoing Table 1, which is inserted into a jacket tube 2304, has four air holes 2303a-2303d (designated by a generic number 2303) formed therein, and the air holes 2303 are filled with air so that the refractive index is approximately equal to one. The portion surrounded by the four air holes 2303 is a region 2302 to become a core for transmitting light. In the region 2302, tellurite glass 2305 is buried which is obtained by changing the composition of tellurite glass, and which has a zero-material dispersion wavelength of 2.1 μm and a refractive index higher than that of the tellurite glass 2301 by 1.1% in terms of a relative refractive-index difference. In the present example 21, the optical fiber was fabricated by a capillary method. The outside diameter of the tellurite glass 2301 is 110 μm, the inside diameter of the air holes 2303 is 35 μm, and the core diameter is 3.0 μm. The cross sectional area $A_{eff}$ at which the optical output becomes $1/e^2$ of the peak, is 2.6 μm$^2$, and the γ value is 940 W$^{-1}$ km$^{-1}$.

Figure 50:
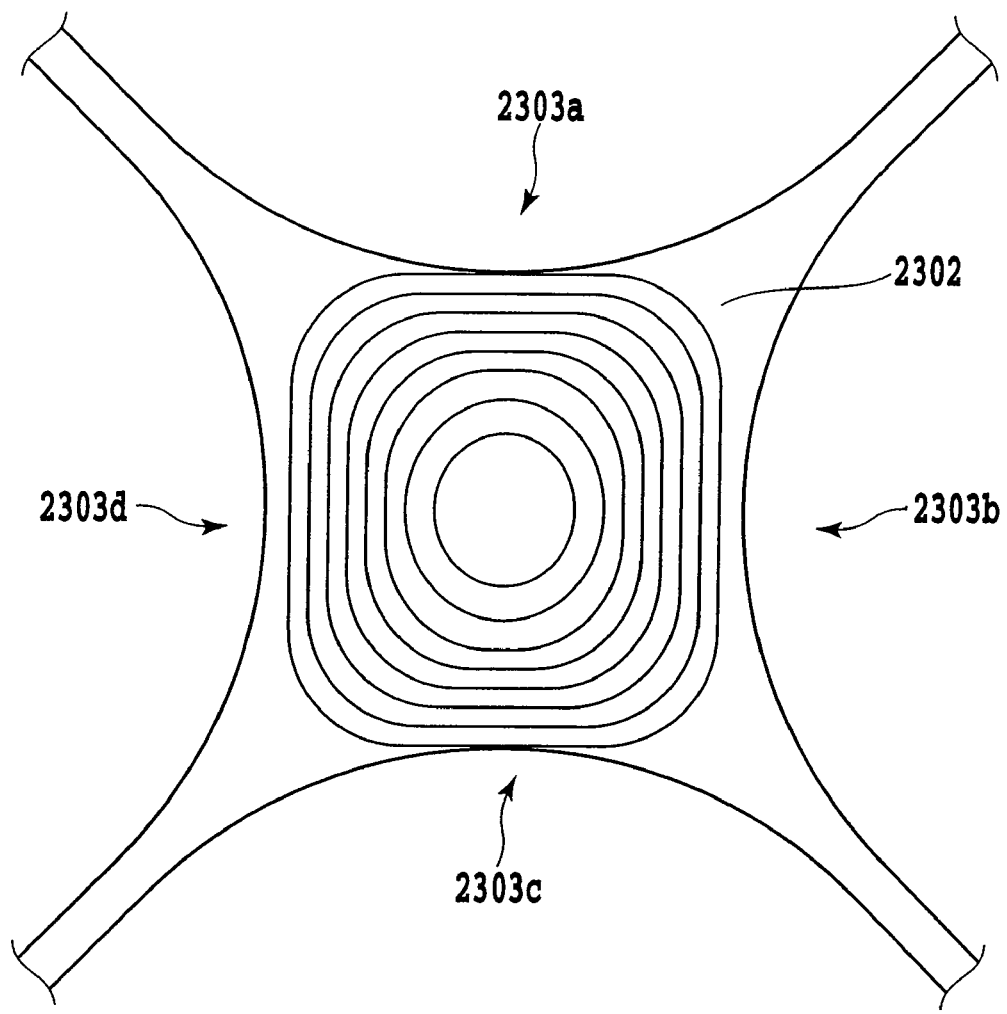
FIG. 50 is a diagram illustrating the opto-electric field distribution of the optical fiber of the example 21 in accordance with the present invention.

FIG. 50 illustrates the opto-electric field distribution of the optical fiber of the present example 21. The opto-electric field distribution is obtained using the calculus of finite difference method, one of the numerical calculations. Each one of the contours shows every 10% difference in the electric field. It is found from the calculation results that the optical fiber of the example 21 confines light within the core region 2302 at the center, and that the light propagates through the core. Observing the near field pattern (NFP) and far field pattern (FFP) after cutting and polishing the optical fiber makes it possible to confirm that the light is confined in the fiber central section, and the single mode is achieved.

Figure 51:
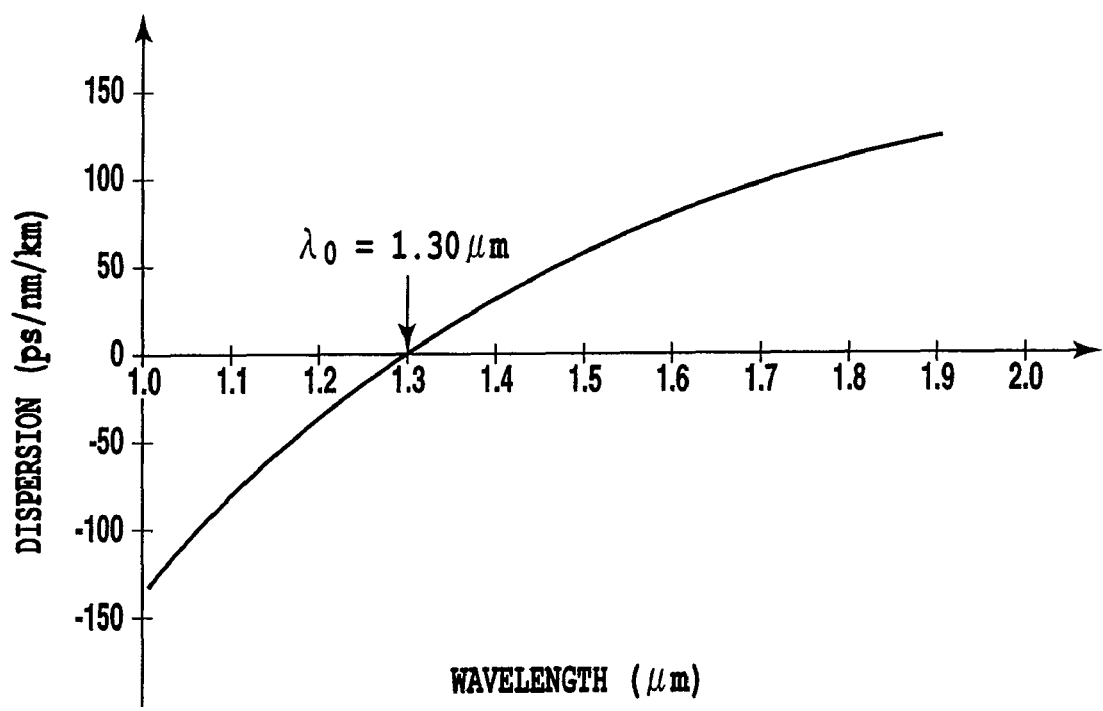
FIG. 51 is a graph illustrating the wavelength dispersion of the optical fiber of the example 21 in accordance with the present invention.

FIG. 51 illustrates the wavelength dispersion of the optical fiber of the present example 21. The zero dispersion wavelength $\lambda_0$ of the optical fiber of the example 21 is 1.30 μm.

Example 22

Figure 52:
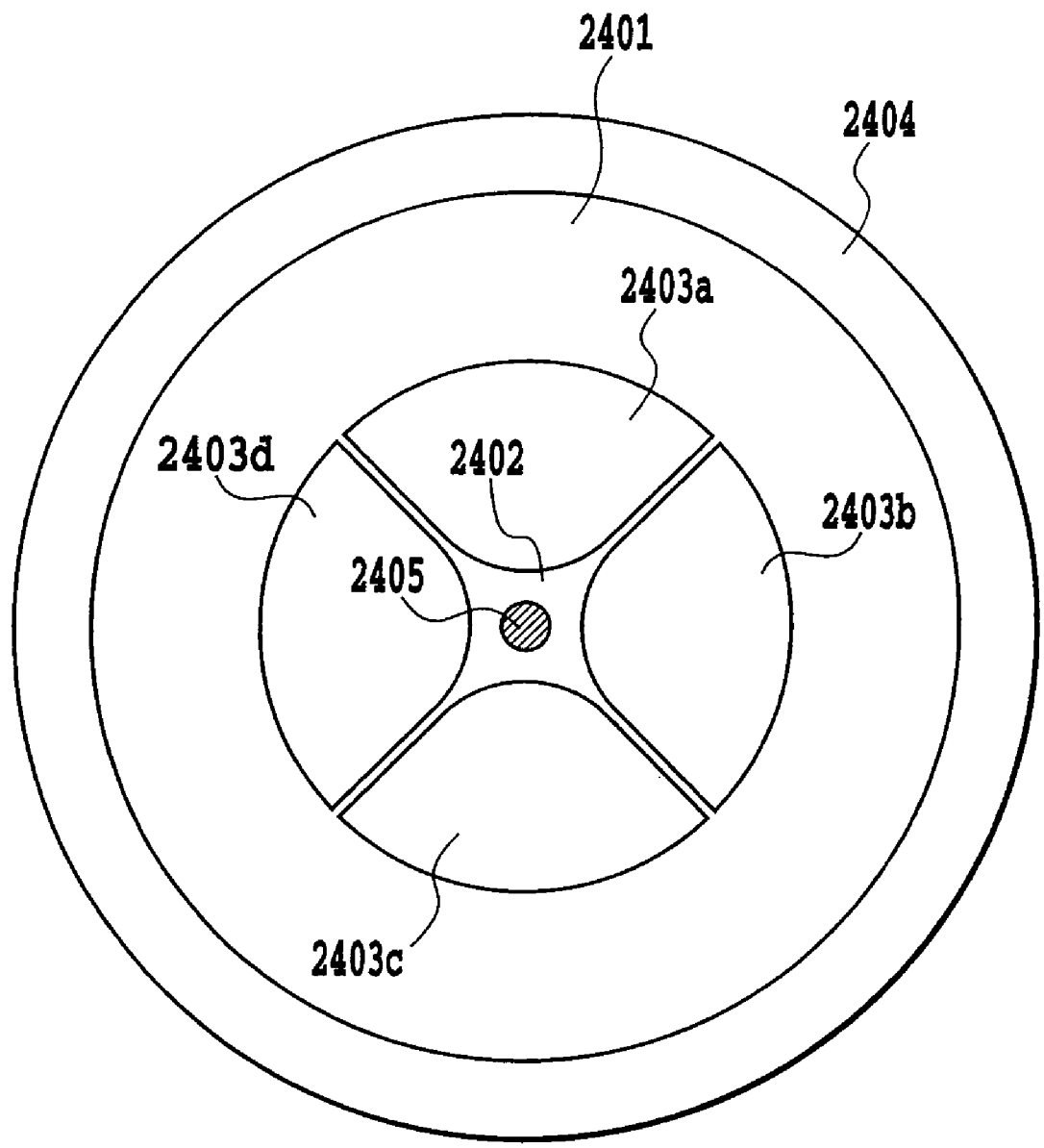
FIG. 52 is a cross-sectional view showing an optical fiber of an example 22 in accordance with the present invention.

FIG. 52 shows an optical fiber of the example 22 in accordance with the present invention. Tellurite glass 2401 with the No. 18 composition of the foregoing Table 1, which is inserted into a jacket tube 2404, has four air holes 2403a-2403d (designated by a generic number 2403) formed therein, and the air holes 2403 are filled with air so that the refractive index is approximately equal to one. The portion surrounded by the four air holes 2403 is a region 2402 to become a core for transmitting light. In the region 2402, tellurite glass 2405 is buried which is obtained by changing the composition of tellurite glass, and which has a zero-material dispersion wavelength of 2.05 μm and a refractive index lower than that of the tellurite glass 2401 by 2.2% in terms of a relative refractive-index difference. In the present example 22, the optical fiber was fabricated by a capillary method. The outside diameter of the tellurite glass 2401 is 90 μm, the inside diameter of the air holes 2403 is 45 μm, and the core diameter is 2.7 μm. The cross sectional area $A_{eff}$ at which the optical output becomes $1/e^2$ of the peak, is 2.5 μm$^2$, and the γ value is 930 W$^{-1}$ km$^{-1}$.

Figure 53:
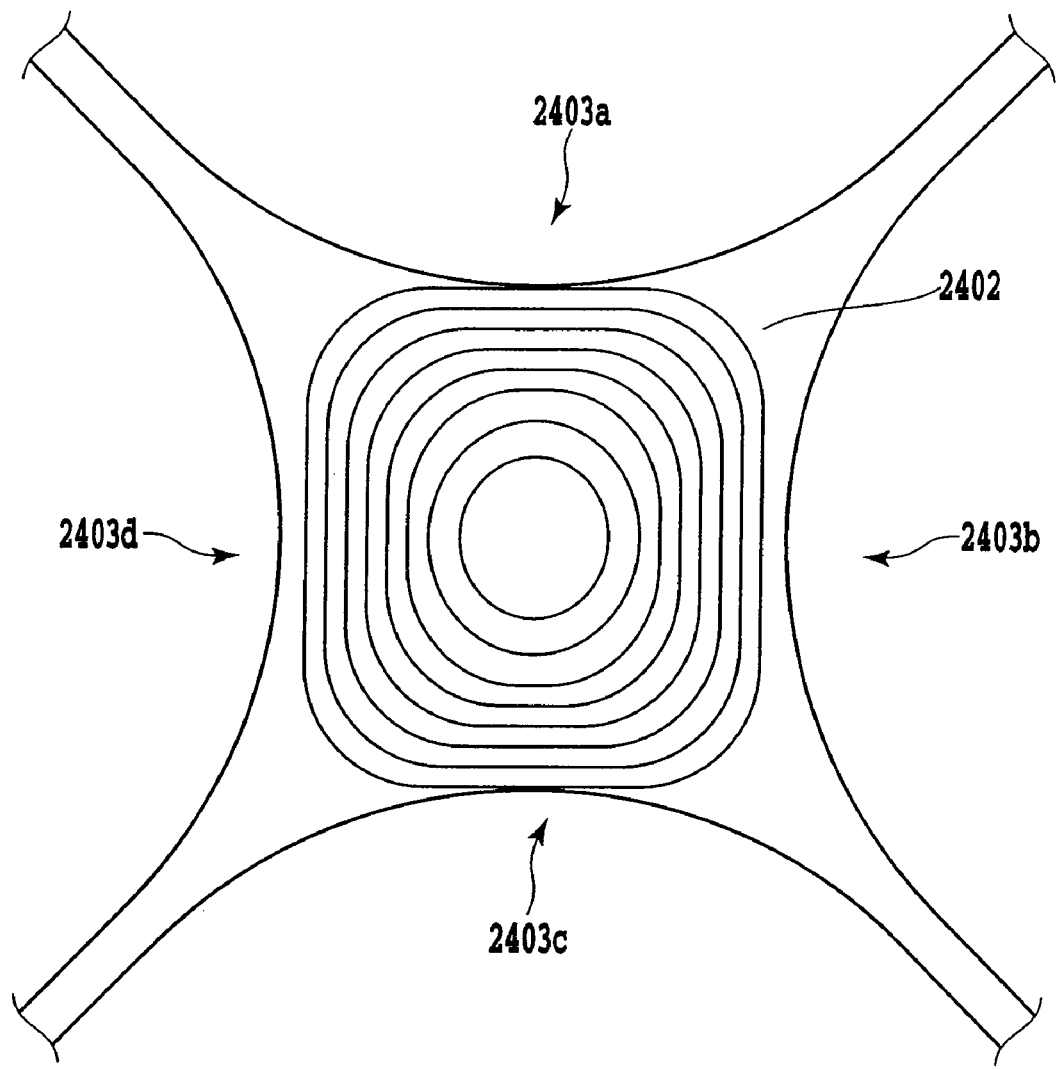
FIG. 53 is a diagram illustrating the opto-electric field distribution of the optical fiber of the example 22 in accordance with the present invention.

FIG. 53 illustrates the opto-electric field distribution of the optical fiber of the present example 22. The opto-electric field distribution is obtained using the calculus of finite difference method, one of the numerical calculations. Each one of the contours shows every 10% difference in the electric field. It is found from the calculation results that the optical fiber of the example 22 confines light within the core region 2402 at the center, and that the light propagates through the core. Observing the near field pattern (NFP) and far field pattern (FFP) after cutting and polishing the optical fiber makes it possible to confirm that the light is confined in the fiber central section, and the single mode is achieved.

Figure 54:
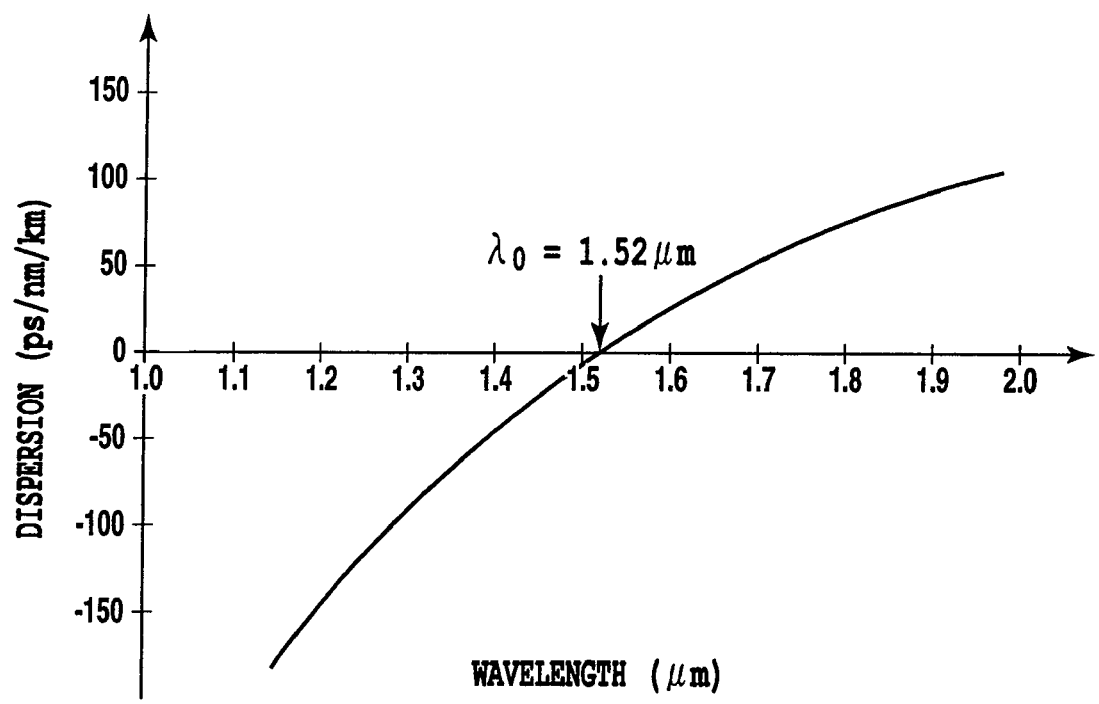
FIG. 54 is a graph illustrating the wavelength dispersion of the optical fiber of the example 22 in accordance with the present invention.

FIG. 54 illustrates the wavelength dispersion of the optical fiber of the present example 22. The zero dispersion wavelength $\lambda_0$ of the optical fiber of the example 22 is 1.52 μm.

Example 23

Figure 55:
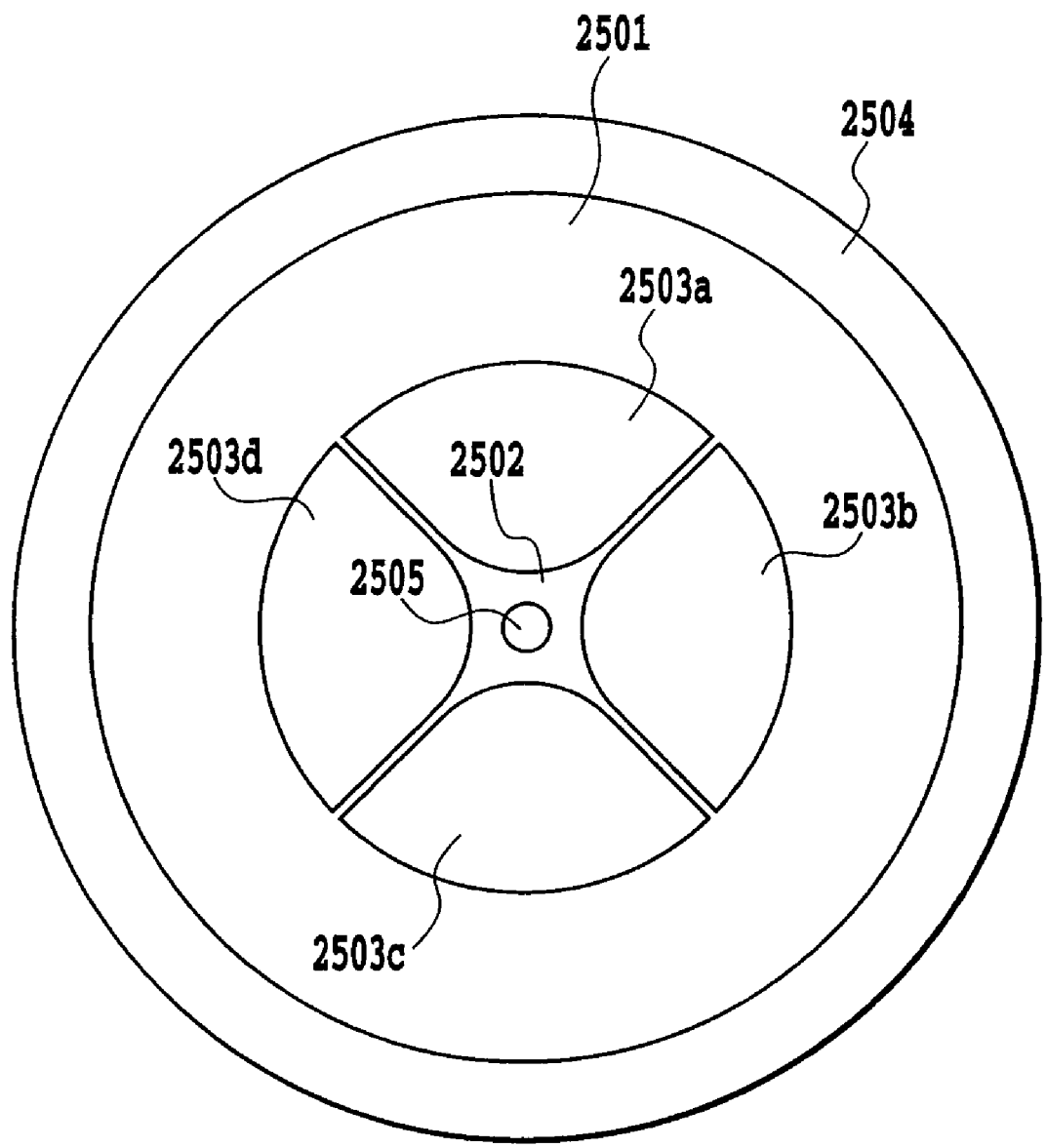
FIG. 55 is a cross-sectional view showing an optical fiber of an example 23 in accordance with the present invention.

FIG. 55 shows an optical fiber of the example 23 in accordance with the present invention. Tellurite glass 2501 with the No. 17 composition of the foregoing Table 1, which is inserted into a jacket tube 2504, has four air holes 2503a-2503d (designated by a generic number 2503) formed therein, and the air holes 2503 are filled with air so that the refractive index is approximately equal to one. The portion surrounded by the four air holes 2503 is a region 2502 to become a core for transmitting light. In the region 2502, a central air hole 2505 is formed. In the present example 23, the optical fiber was fabricated by a capillary method. The outside diameter of the tellurite glass 2501 is 105 µm, the inside diameter of the air holes 2503 is 40 µm, and the core diameter is 3.1 µm. The cross sectional area $A_{\it eff}$, at which the optical output becomes $1/e^2$ of the peak, is 2.8 µm$^2$, and the γ value is 810 W$^{-1}$ km$^{-1}$.

Figure 56:
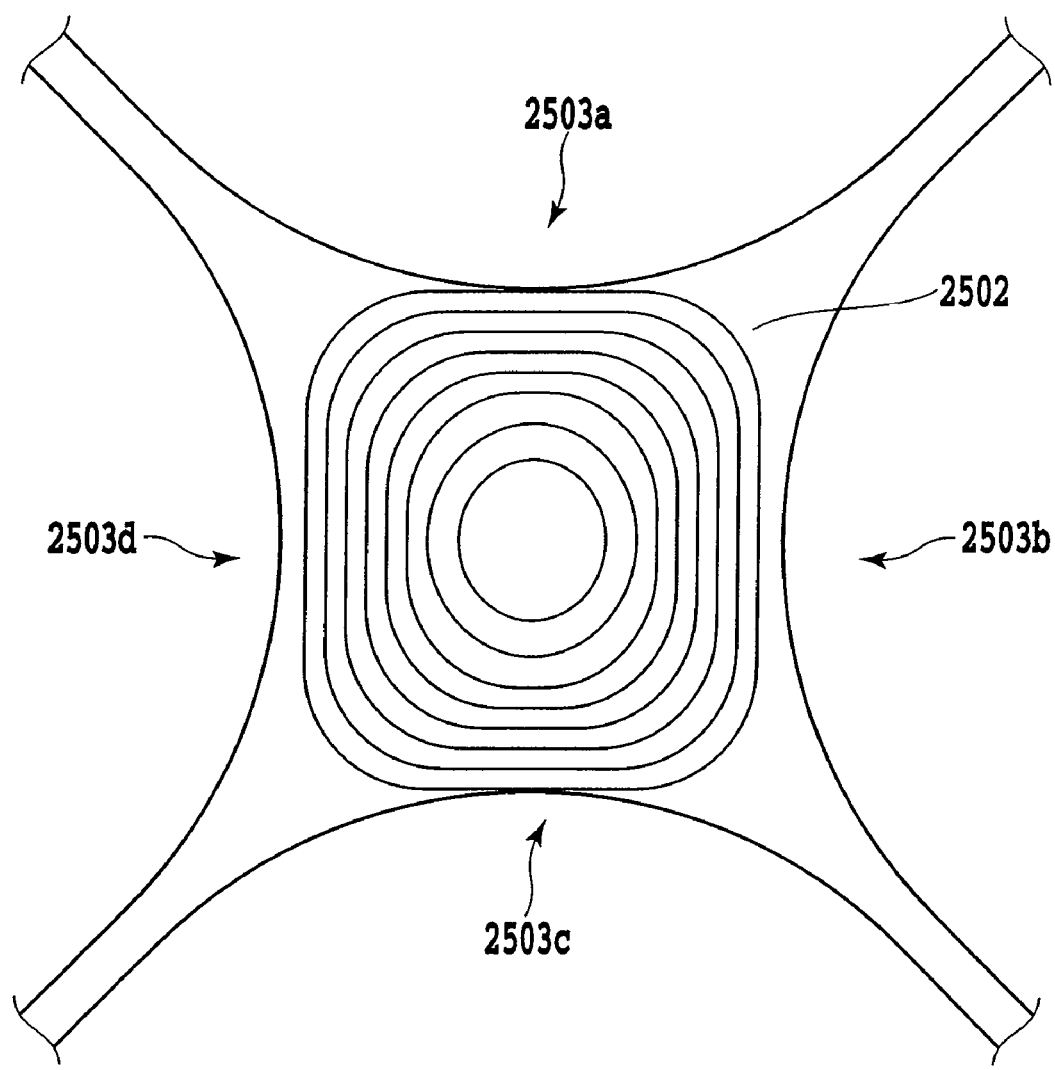
FIG. 56 is a diagram illustrating the opto-electric field distribution of the optical fiber of the example 23 in accordance with the present invention.

FIG. 56 illustrates the opto-electric field distribution of the optical fiber of the present example 23. The opto-electric field distribution is obtained using the calculus of finite difference method, one of the numerical calculations. Each one of the contours shows every 10% difference in the electric field. It is found from the calculation results that the optical fiber of the example 23 confines light within the core region 2502 at the center, and that the light propagates through the core. Observing the near field pattern (NFP) and far field pattern (FFP) after cutting and polishing the optical fiber makes it possible to confirm that the light is confined in the fiber central section, and the single mode is achieved.

Figure 57:
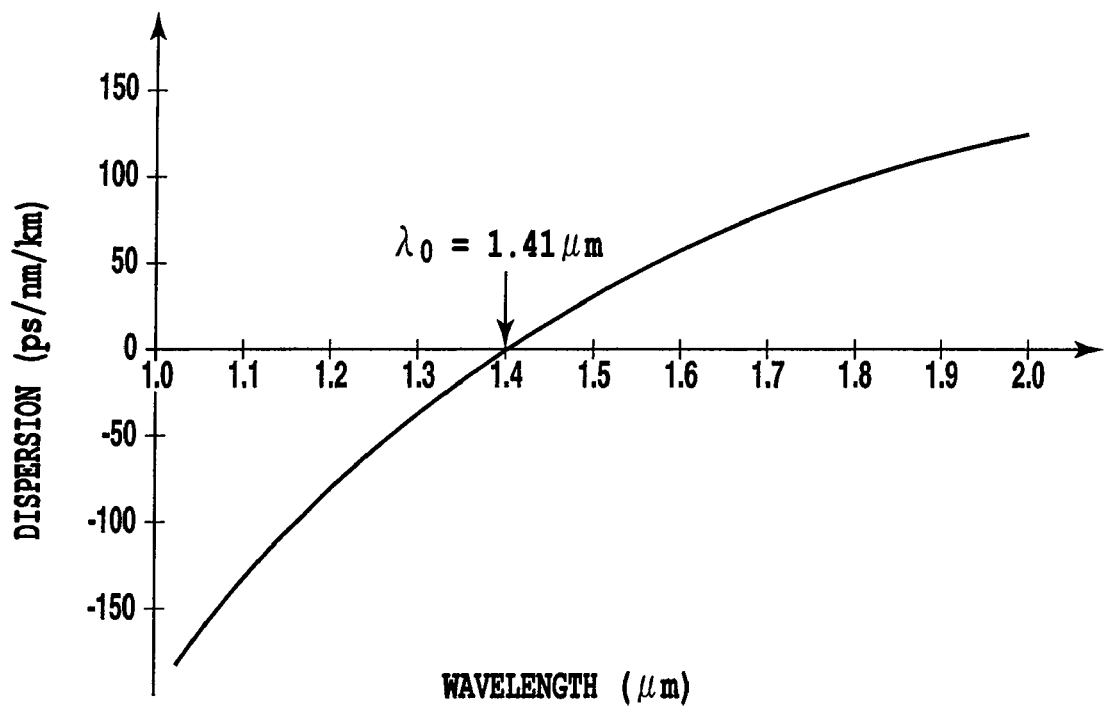
FIG. 57 is a graph illustrating the wavelength dispersion of the optical fiber of the example 23 in accordance with the present invention.

FIG. 57 illustrates the wavelength dispersion of the optical fiber of the present example 23. The zero dispersion wavelength $λ_0$ of the optical fiber of the example 23 is 1.41 µm.

Example 24

Figure 58:
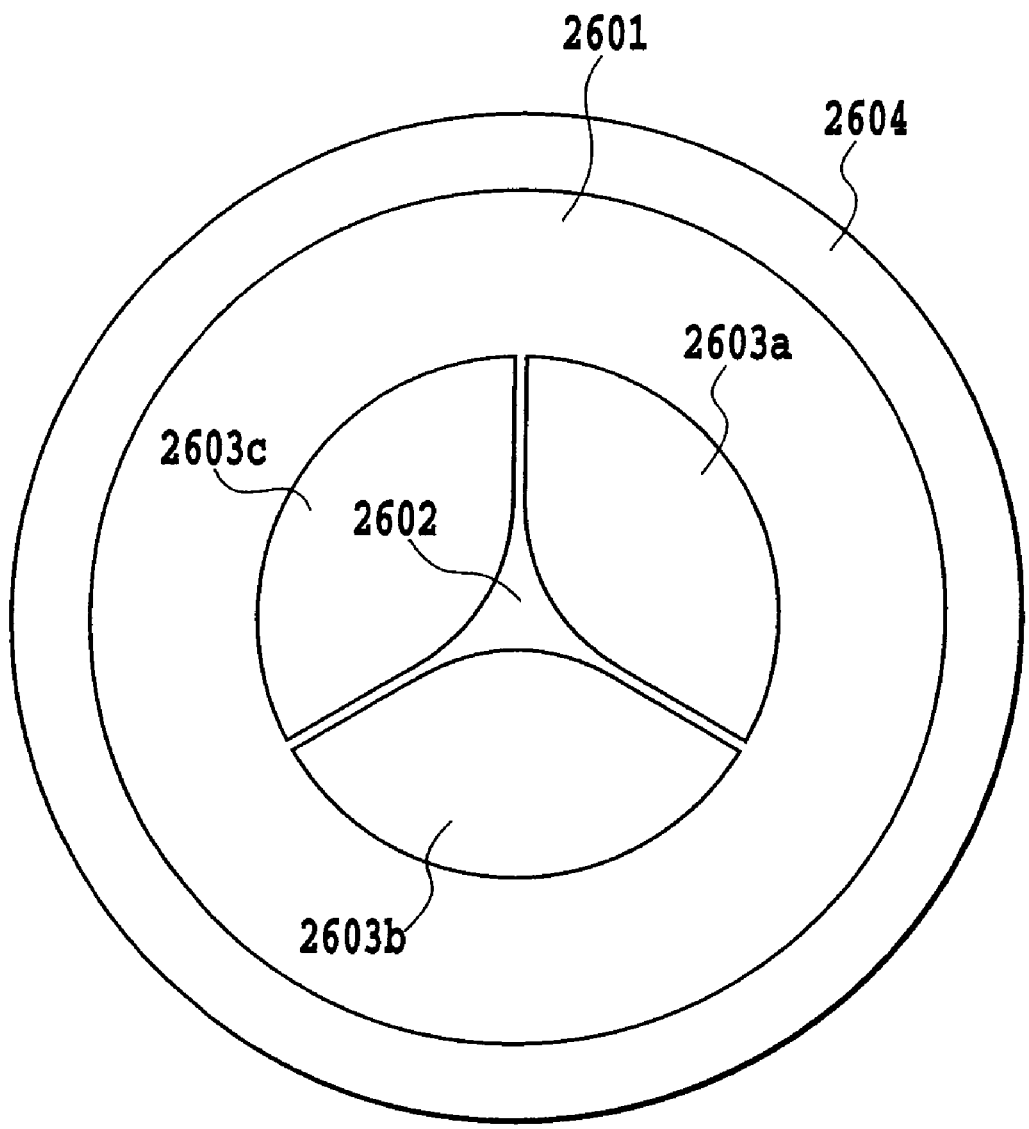
FIG. 58 is a cross-sectional view showing an optical fiber of an example 24 in accordance with the present invention.

FIG. 58 shows an optical fiber of the example 24 in accordance with the present invention. Tellurite glass 2601 with the No. 14 composition of the foregoing Table 1, which is inserted into a jacket tube 2604, has three air holes 2603a-2603c (designated by a generic number 2603) formed therein, and the air holes 2603 are filled with air so that the refractive index is approximately equal to one. The portion surrounded by the three air holes 2603 is a region 2602 to become a core for transmitting light. In the present example 24, the optical fiber was fabricated by the extrusion process. The outside diameter of the tellurite glass 2601 is 110 µm, the inside diameter of the air holes 2603 is 40 µm, and the core diameter is 5.5 µm. The cross sectional area $A_{\it eff}$, at which the optical output becomes $1/e^2$ of the peak, is 4.5 µm$^2$, and the γ value is 520 W$^{-1}$ km$^{-1}$.

Observing the near field pattern (NFP) and far field pattern (FFP) after cutting and polishing the optical fiber makes it possible to confirm that the light is confined in the fiber central section, and the single mode is achieved.

Figure 59:
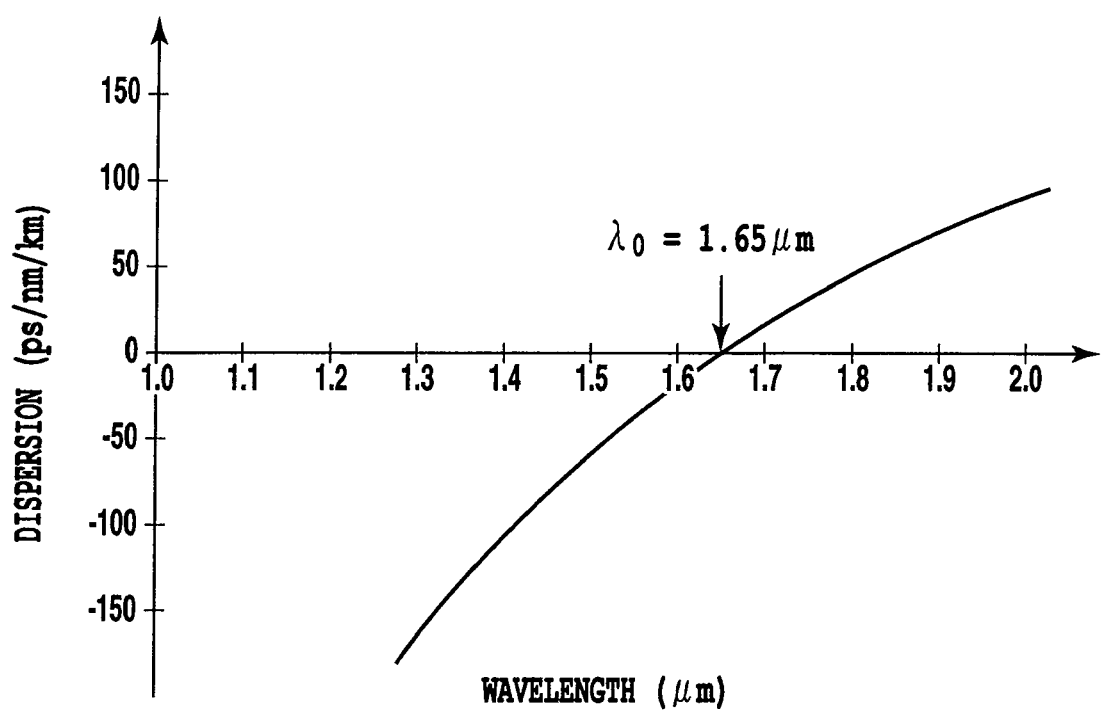
FIG. 59 is a graph illustrating the wavelength dispersion of the optical fiber of the example 24 in accordance with the present invention.

FIG. 59 illustrates the wavelength dispersion of the optical fiber of the present example 24. The zero dispersion wavelength $λ_0$ of the optical fiber of the example 24 is 1.65 µm.

Example 25

Figure 60:
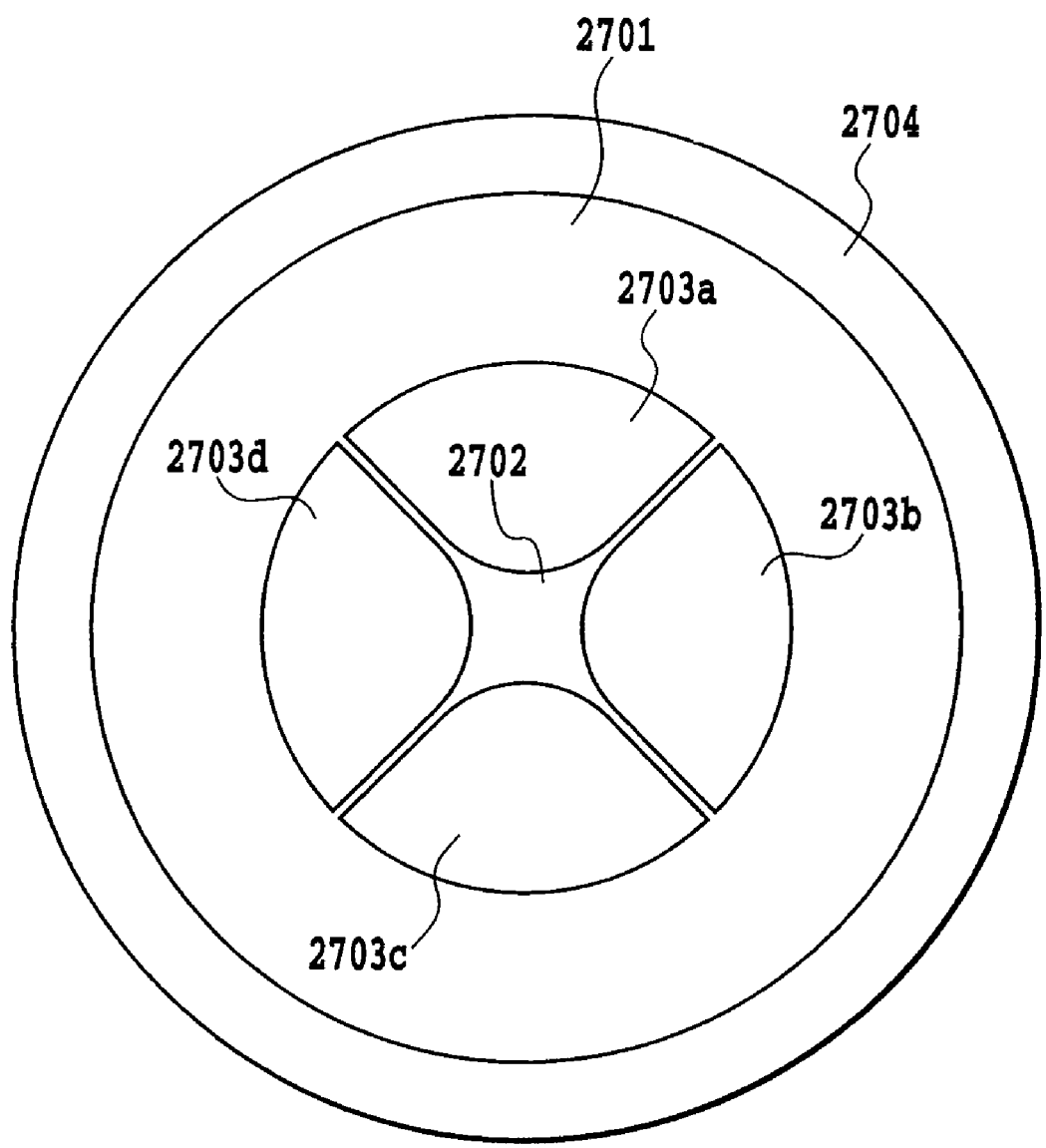
FIG. 60 is a cross-sectional view showing an optical fiber of an example 25 in accordance with the present invention.

FIG. 60 shows an optical fiber of the example 25 in accordance with the present invention. Tellurite glass 2701 with the No. 16 composition of the foregoing Table 1, which is inserted into a jacket tube 2704, has four air holes 2703a-2703d (designated by a generic number 2703) formed therein, and the air holes 2703 are filled with air so that the refractive index is approximately equal to one. The portion surrounded by the four air holes 2703 is a region 2702 to become a core for transmitting light. In the present example 25, the optical fiber was fabricated by the extrusion process. The outside diameter of the tellurite glass 2701 is 110 µm, the inside diameter of the air holes 2703 is 40 µm, and the core diameter is 2.2 µm. The cross sectional area $A_{\it eff}$, at which the optical output becomes $1/e^2$ of the peak, is 2.0 µm$^2$, and the γ value is 1200 W$^{-1}$ km$^{-1}$.

Observing the near field pattern (NFP) and far field pattern (FFP) after cutting and polishing the optical fiber makes it possible to confirm that the light is confined in the fiber central section, and the single mode is achieved.

Figure 61:
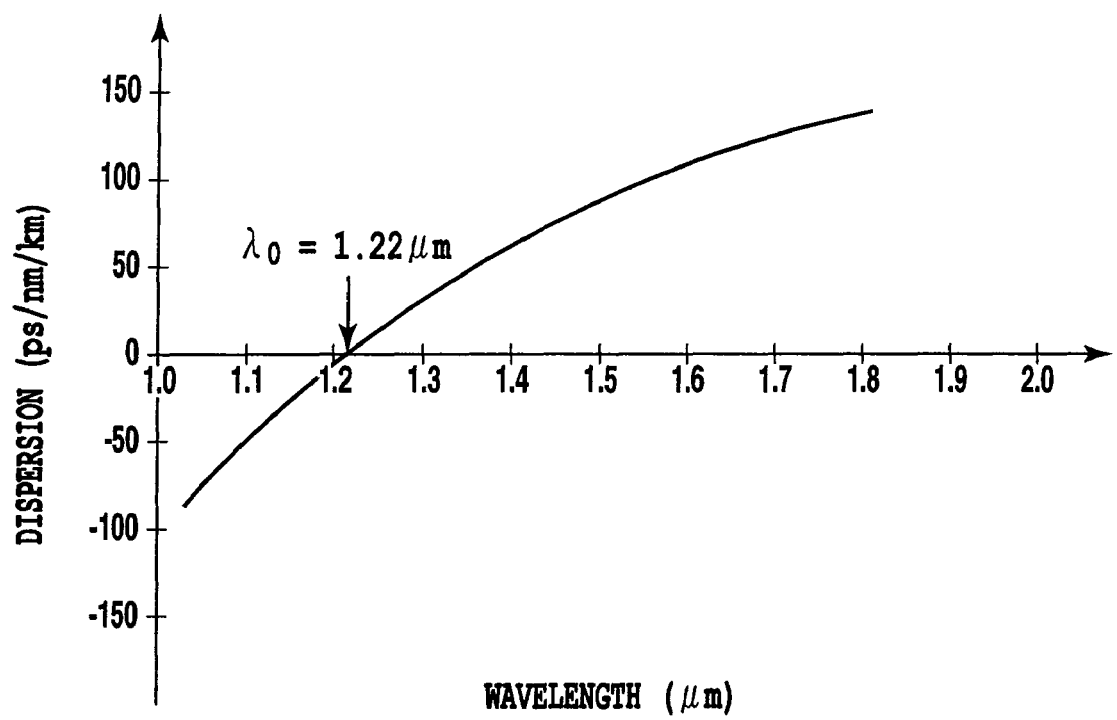
FIG. 61 is a graph illustrating the wavelength dispersion of the optical fiber of the example 25 in accordance with the present invention.

FIG. 61 illustrates the wavelength dispersion of the optical fiber of the present example 25. The zero dispersion wavelength $λ_0$ of the optical fiber of the example 25 is 1.22 µm.

Example 26

Figure 62:
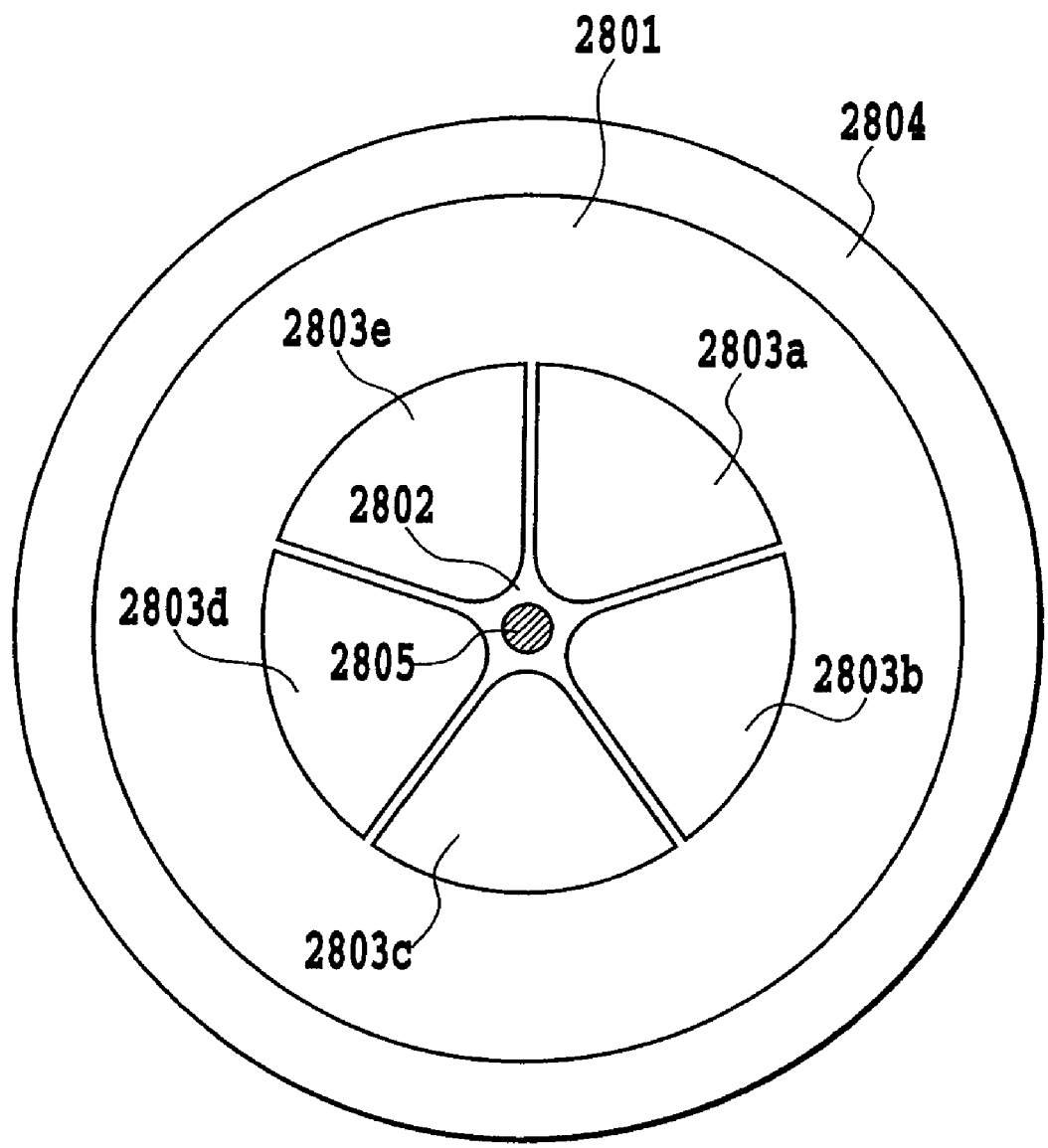
FIG. 62 is a cross-sectional view showing an optical fiber of an example 26 in accordance with the present invention.

FIG. 62 shows an optical fiber of the example 26 in accordance with the present invention. Tellurite glass 2801 with the No. 18 composition of the foregoing Table 1, which is inserted into a jacket tube 2804, has five air holes 2803a-2803e (designated by a generic number 2803) formed therein, and the air holes 2803 are filled with air so that the refractive index is approximately equal to one. The portion surrounded by the five air holes 2803 is a region 2802 to become a core for transmitting light. In the region 2802, tellurite glass 2805 is buried which is obtained by changing the composition of tellurite glass, and which has a zero-material dispersion wavelength of 2.1 µm and a refractive index higher than that of the tellurite glass 2801 by 1.1% in terms of a relative refractive-index difference. In the present example 26, the optical fiber was fabricated by the extrusion process. The outside diameter of the tellurite glass 2801 is 110 µm, the inside diameter of the air holes 2803 is 40 µm, and the core diameter is 4.1 µm. The cross sectional area $A_{\it eff}$, at which the optical output becomes $1/e^2$ of the peak, is 3.5 µm$^2$, and the γ value is 680 W$^{-1}$ km$^{-1}$.

Observing the near field pattern (NFP) and far field pattern (FFP) after cutting and polishing the optical fiber makes it possible to confirm that the light is confined in the fiber central section, and the single mode is achieved.

Figure 63:
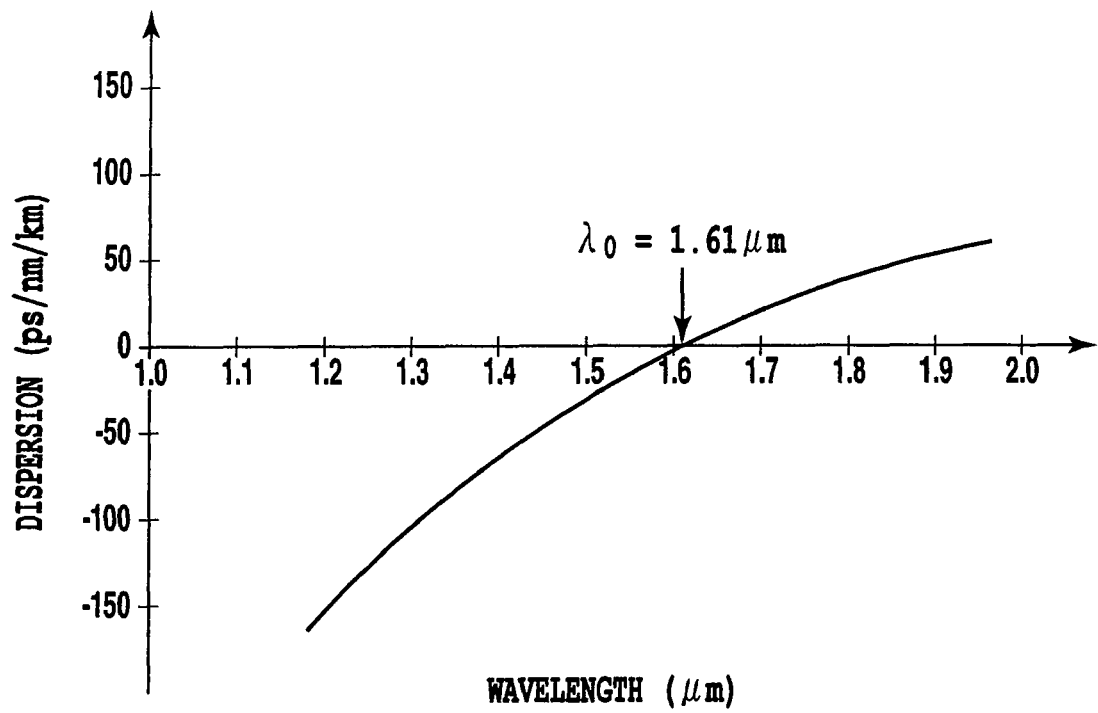
FIG. 63 is a graph illustrating the wavelength dispersion of the optical fiber of the example 26 in accordance with the present invention.

FIG. 63 illustrates the wavelength dispersion of the optical fiber of the present example 26. The zero dispersion wavelength $λ_0$ of the optical fiber of the example 26 is 1.61 µm.

Example 27

Figure 64:
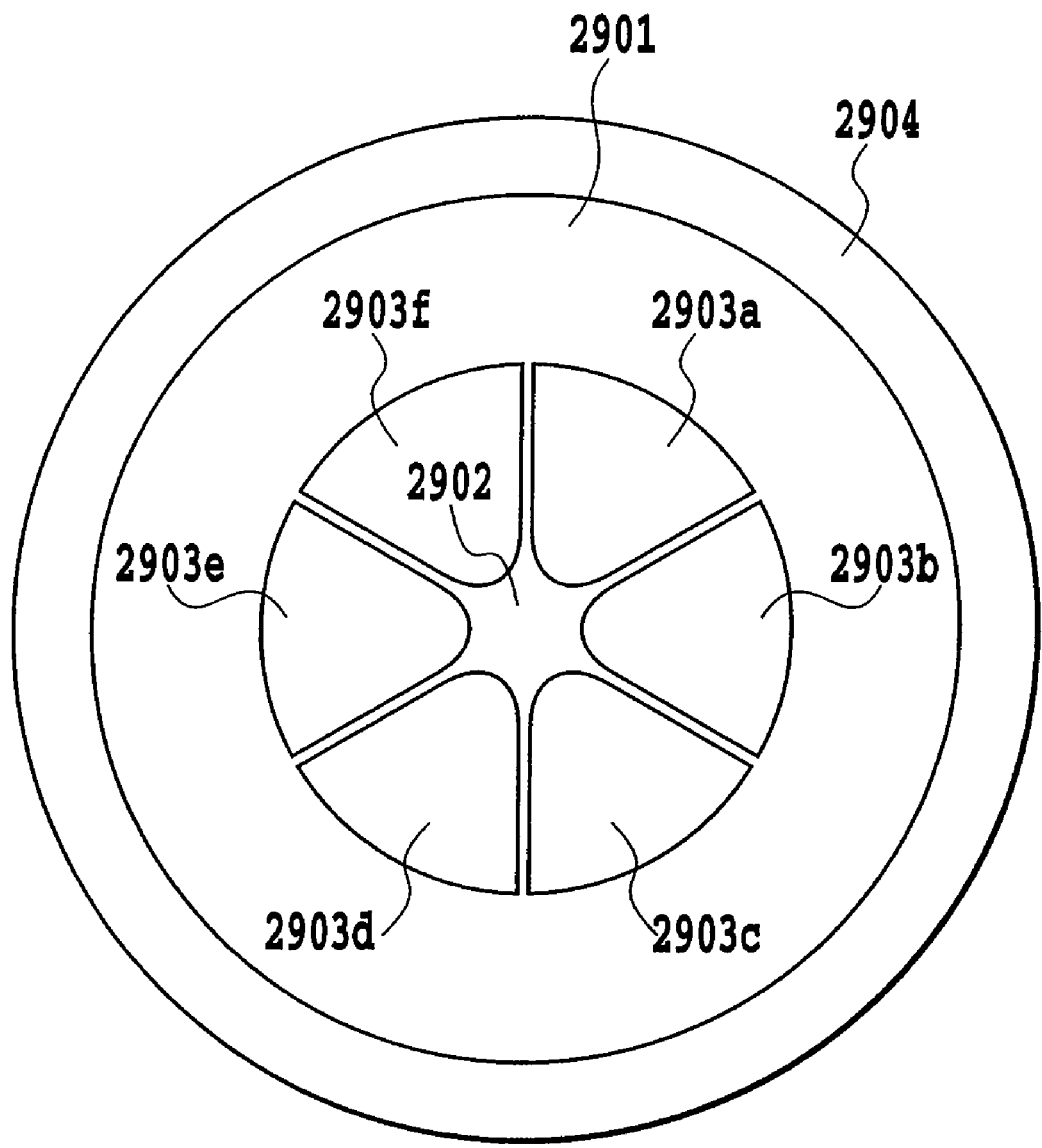
FIG. 64 is a cross-sectional view showing an optical fiber of an example 27 in accordance with the present invention.

FIG. 64 shows an optical fiber of the example 27 in accordance with the present invention. Tellurite glass 2901 with the No. 12 composition of the foregoing Table 1, which is inserted into a jacket tube 2904, has six air holes 2903a-2903f (designated by a generic number 2903) formed therein, and the air holes 2903 are filled with air so that the refractive index is approximately equal to one. The portion surrounded by the six air holes 2903 is a region 2902 to become a core for transmitting light. In the region 2902, tellurite glass 2905 is buried which is obtained by changing the composition of tellurite glass, and which has a zero-material dispersion wavelength of 2.15 µm and a refractive index lower than that of the tellurite glass 2901 by 1.1% in terms of a relative refractive-index difference. In the present example 27, the optical fiber was fabricated by the extrusion process. The outside diameter of the tellurite glass 2901 is 110 µm, the inside diameter of the air holes 2903 is 40 µm, and the core diameter is 3.5 µm. The diameter of the tellurite glass 2905 is 1.5 µm. The cross sectional area $A_{\it eff}$, at which the optical output becomes $1/e^2$ of the peak, is 3.4 µm$^2$, and the γ value is 670 W$^{-1}$ km$^{-1}$.

Observing the near field pattern (NFP) and far field pattern (FFP) after cutting and polishing the optical fiber makes it possible to confirm that the light is confined in the fiber central section, and the single mode is achieved.

Figure 65:
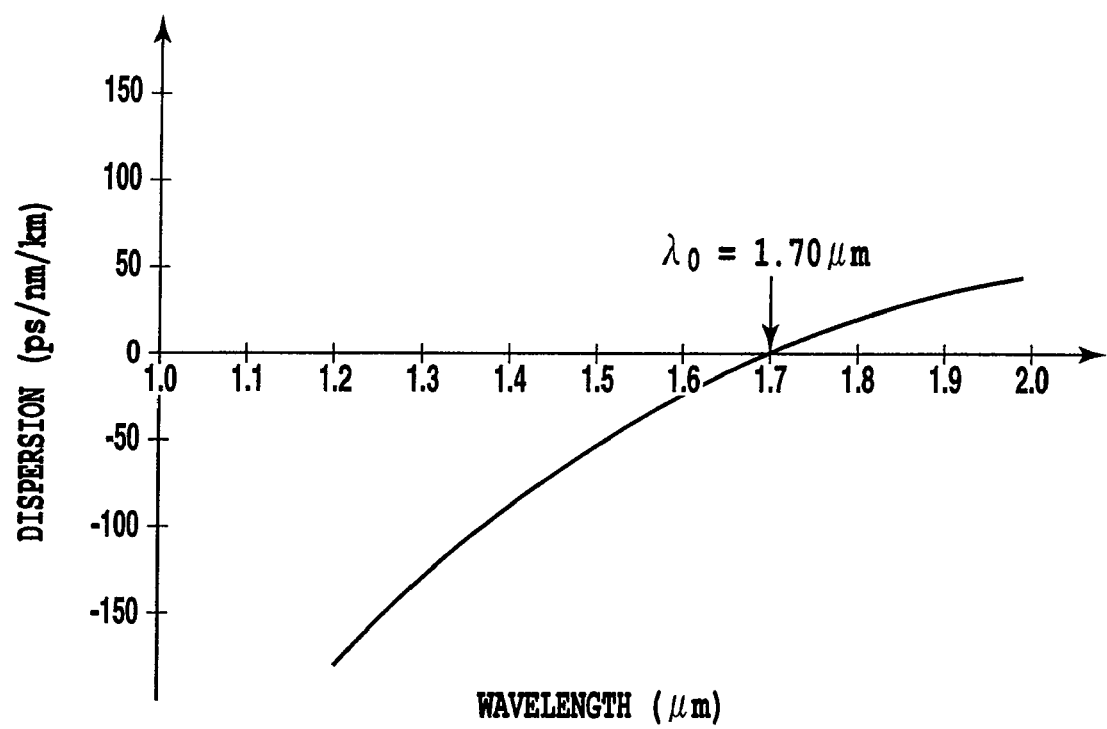
FIG. 65 is a graph illustrating the wavelength dispersion of the optical fiber of the example 27 in accordance with the present invention.

FIG. 65 illustrates the wavelength dispersion of the optical fiber of the present example 27. The zero dispersion wavelength $λ_0$ of the optical fiber of the example 27 is 1.70 µm.

Example 28

Figure 66:
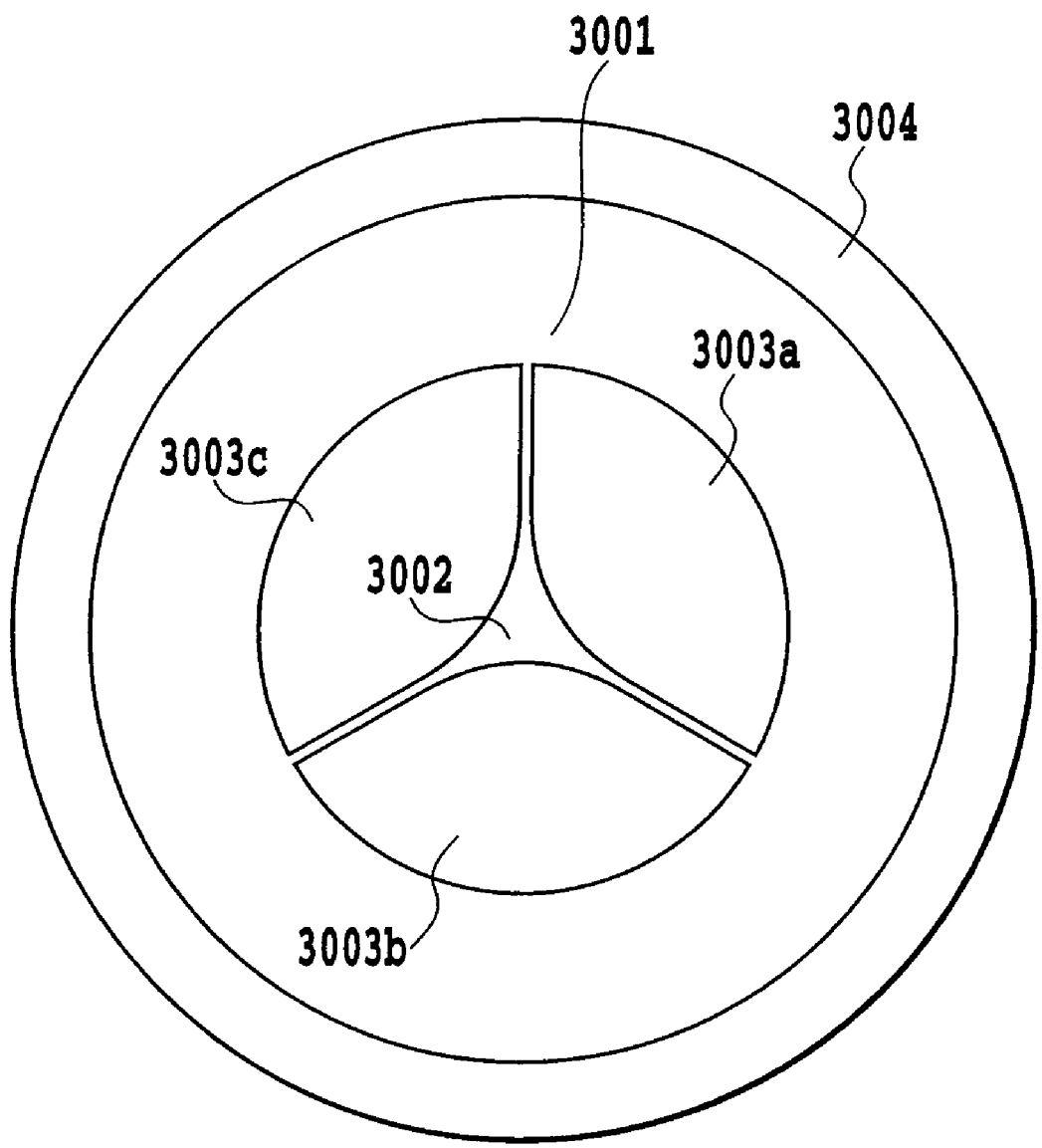
FIG. 66 is a cross-sectional view showing an optical fiber of an example 28 in accordance with the present invention.

FIG. 66 shows an optical fiber of the example 28 in accordance with the present invention. Tellurite glass 3001 with the No. 10 composition of the foregoing Table 1, which is inserted into a jacket tube 3004, has three air holes 3003a-3003c (designated by a generic number 3003) formed therein, and the air holes 3003 are filled with air so that the refractive index is approximately equal to one. The portion surrounded by the three air holes 3003 is a region 3002 to become a core for transmitting light.

Figure 67:
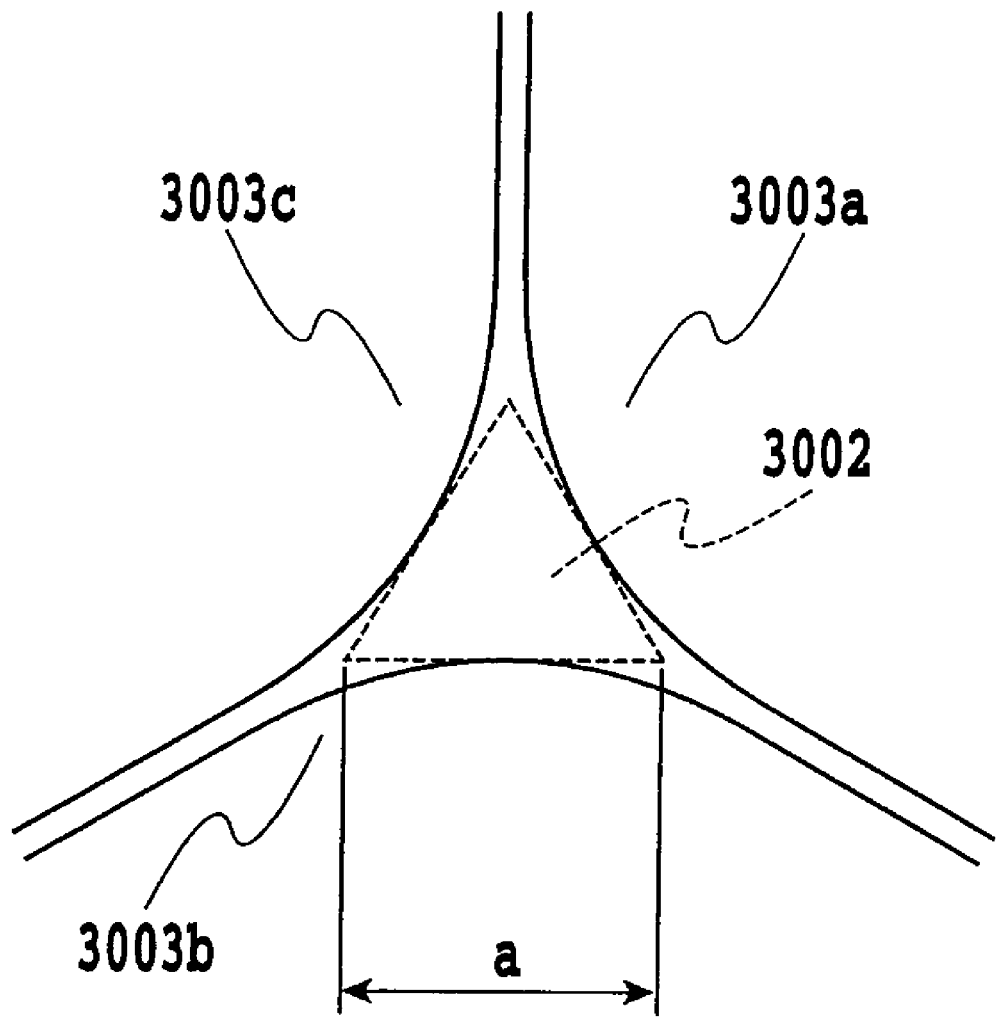
FIG. 67 is an enlarged view showing a region to become the core of the optical fiber of FIG. 66.

FIG. 67 is an enlarged view of the region to become the core of the optical fiber of FIG. 66. In the present example 28, the optical fiber was fabricated by ultrasonic drilling. The outside diameter of the tellurite glass 3001 is 100 μm, the inside diameter of the air holes 3003 is 35 μm, and the core diameter a is 5.5 μm. The cross sectional area $A_{eff}$, at which the optical output becomes $1/e^2$ of the peak, is 3.0 μm², and the γ value is 780 $W^{-1}$ $km^{-1}$.

Observing the near field pattern (NFP) and far field pattern (FFP) after cutting and polishing the optical fiber makes it possible to confirm that the light is confined in the fiber central section, and the single mode is achieved.

Figure 68:
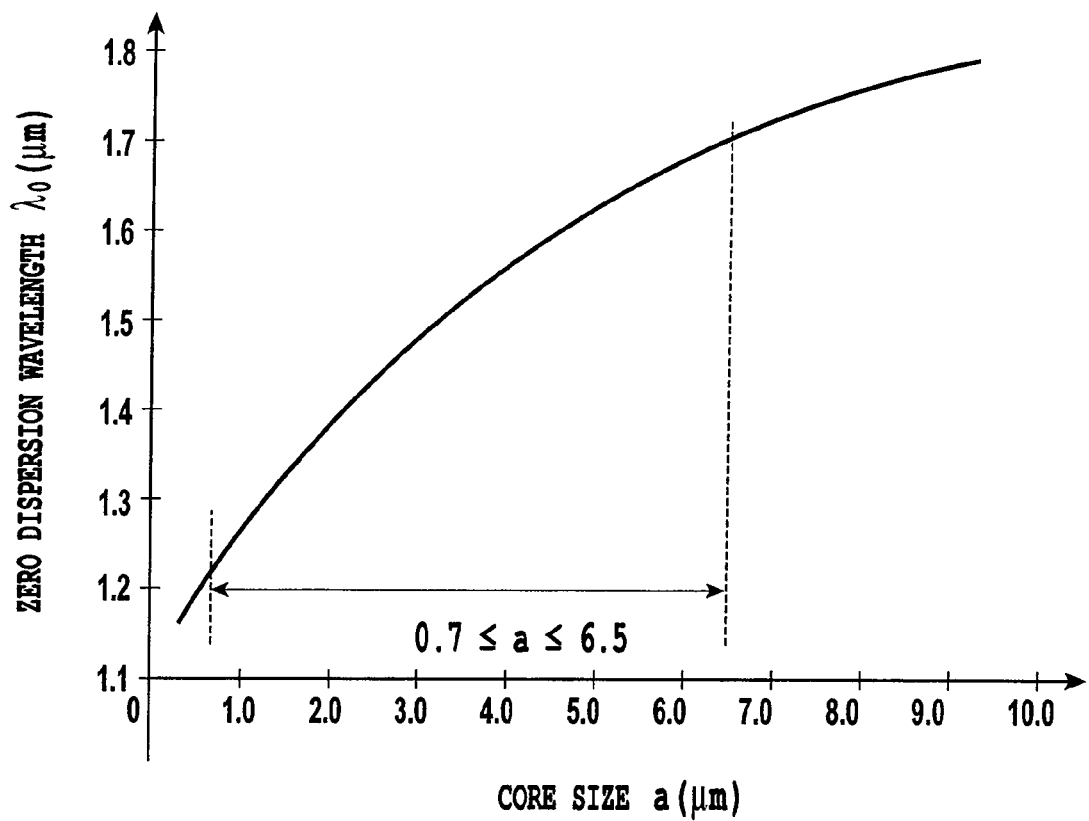
FIG. 68 is a graph illustrating relationships between the zero dispersion wavelength and core size of the optical fiber of the example 28 in accordance with the present invention.

FIG. 68 illustrates the relationships between the zero dispersion wavelength and core size of the optical fiber obtained in the present example 28. To set the zero dispersion wavelength in the 1.2 μm-1.7 μm band, it is found that the size of the region to become the core which is surrounded by the air holes and confines the light, that is, the core diameter a, must be controlled in a range of 0.6 μm-6.5 μm.

Example 29

Figure 69:
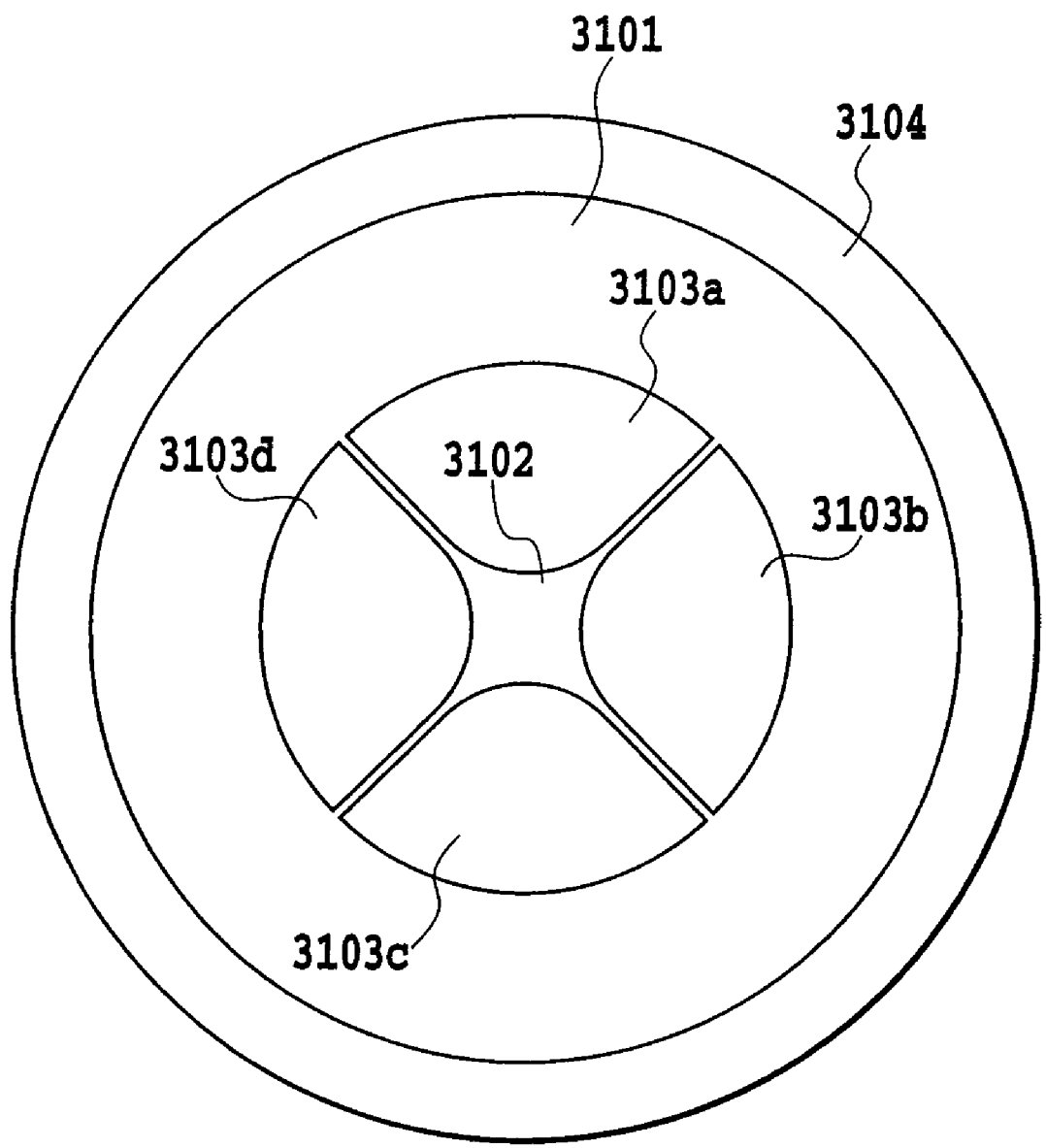
FIG. 69 is a cross-sectional view showing an optical fiber of an example 29 in accordance with the present invention.

FIG. 69 shows an optical fiber of the example 29 in accordance with the present invention. Tellurite glass 3101 with the No. 11 composition of the foregoing Table 1, which is inserted into a jacket tube 3104, has four air holes 3103a-3103d (designated by a generic number 3103) formed therein, and the air holes 3103 are filled with air so that the refractive index is approximately equal to one. The portion surrounded by the four air holes 3103 is a region 3102 to become a core for transmitting light.

Figure 70:
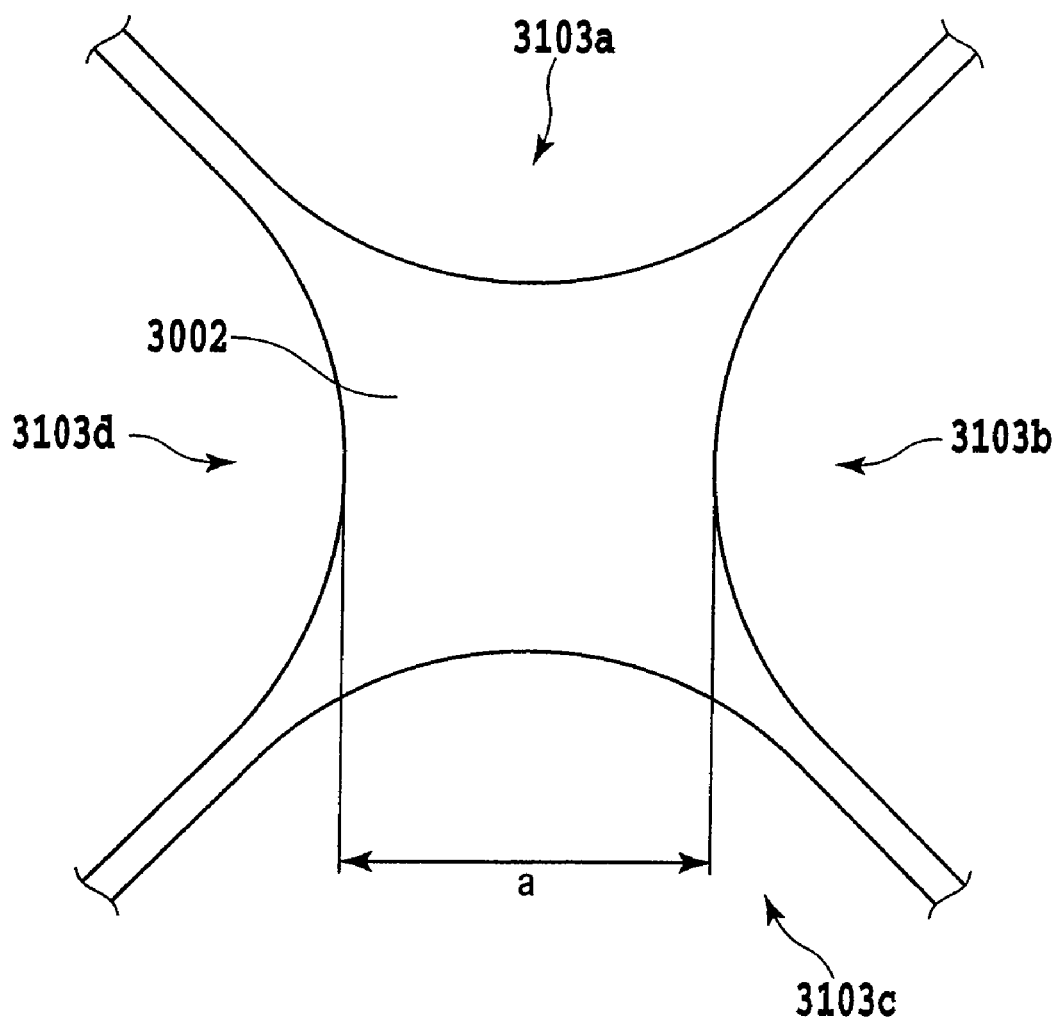
FIG. 70 is an enlarged view showing a region to become the core of the optical fiber of FIG. 69.

FIG. 70 is an enlarged view of the region to become the core of the optical fiber of FIG. 69. In the present example 29, the optical fiber was fabricated by ultrasonic drilling. The outside diameter of the tellurite glass 3101 is 125 μm, the inside diameter of the air holes 3103 is 50 μm, and the core diameter is 3.5 μm. The cross sectional area $A_{eff}$, at which the optical output becomes $1/e^2$ of the peak, is 3.2 μm², and the γ value is 770 $W^{-1}$ $km^{-1}$.

Observing the near field pattern (NFP) and far field pattern (FFP) after cutting and polishing the optical fiber makes it possible to confirm that the light is confined in the fiber central section, and the single mode is achieved.

Figure 71:
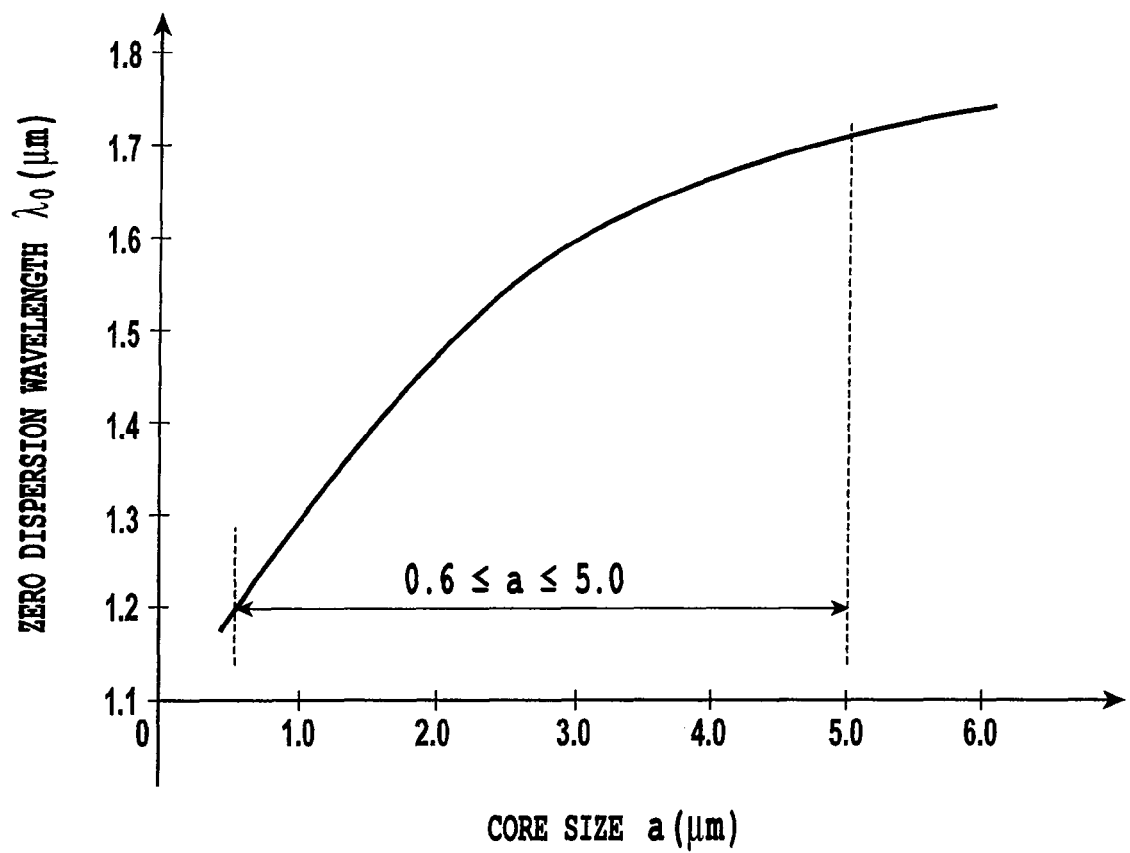
FIG. 71 is a graph illustrating relationships between the zero dispersion wavelength and core size of the optical fiber of the example 29 in accordance with the present invention.

FIG. 71 illustrates the relationships between the zero dispersion wavelength and core size obtained in the present example 29. To set the zero dispersion wavelength in the 1.2 μm-1.7 μm band, it is found that the size of the region to become the core which is surrounded by the air holes and confines the light, that is, the core diameter a, must be controlled in a range of 0.6 μm-5.0 μm.

Example 30

Figure 72:
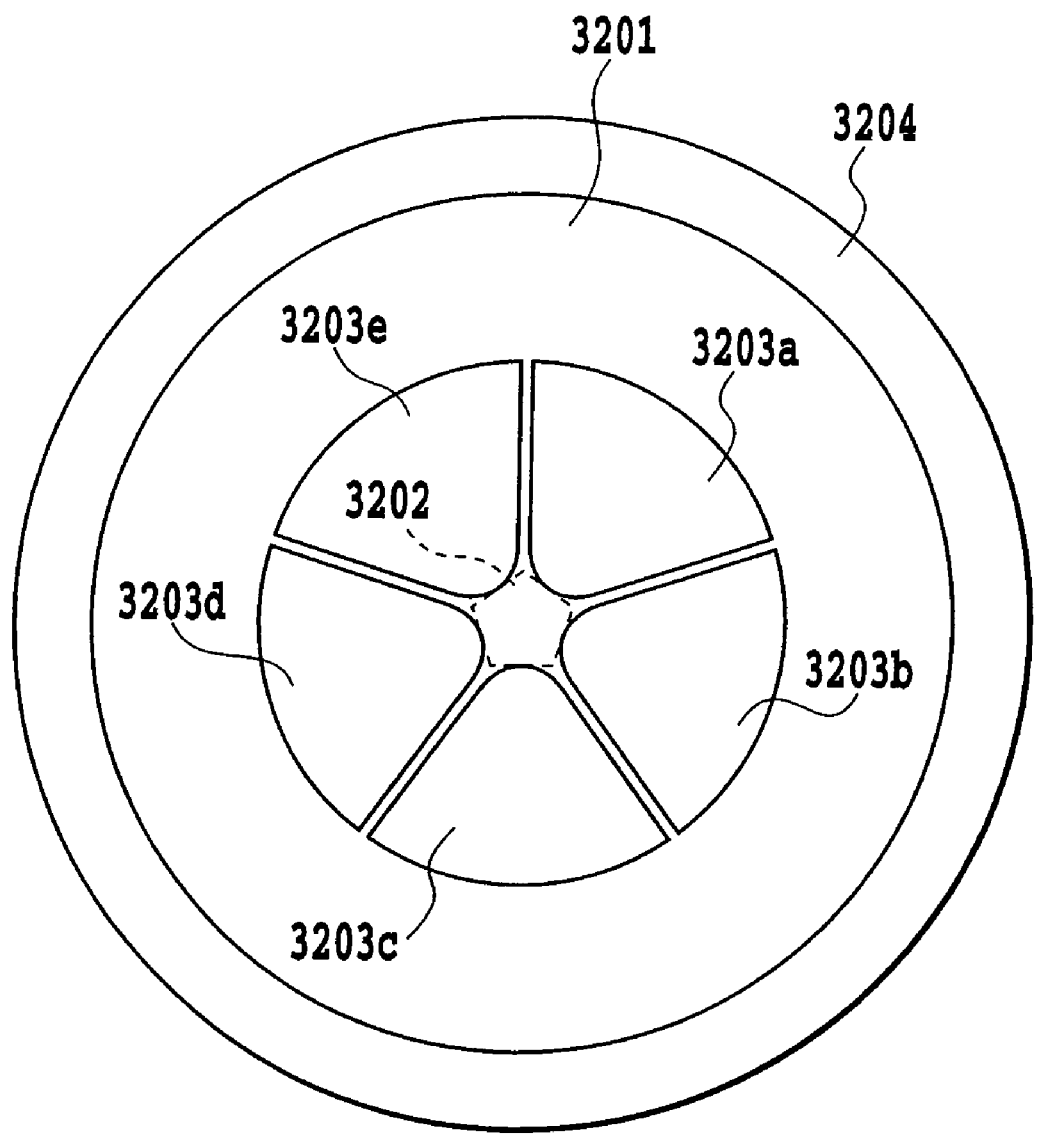
FIG. 72 is a cross-sectional view showing an optical fiber of an example 30 in accordance with the present invention.

FIG. 72 shows an optical fiber of the example 30 in accordance with the present invention. Tellurite glass 3201 with the No. 17 composition of the foregoing Table 1, which is inserted into a jacket tube 3204, has five air holes 3203a-3203e (designated by a generic number 3203) formed therein, and the air holes 3203 are filled with air so that the refractive index is approximately equal to one. The portion surrounded by the five air holes 3203 is a region 3202 to become a core for transmitting light.

Figure 73:
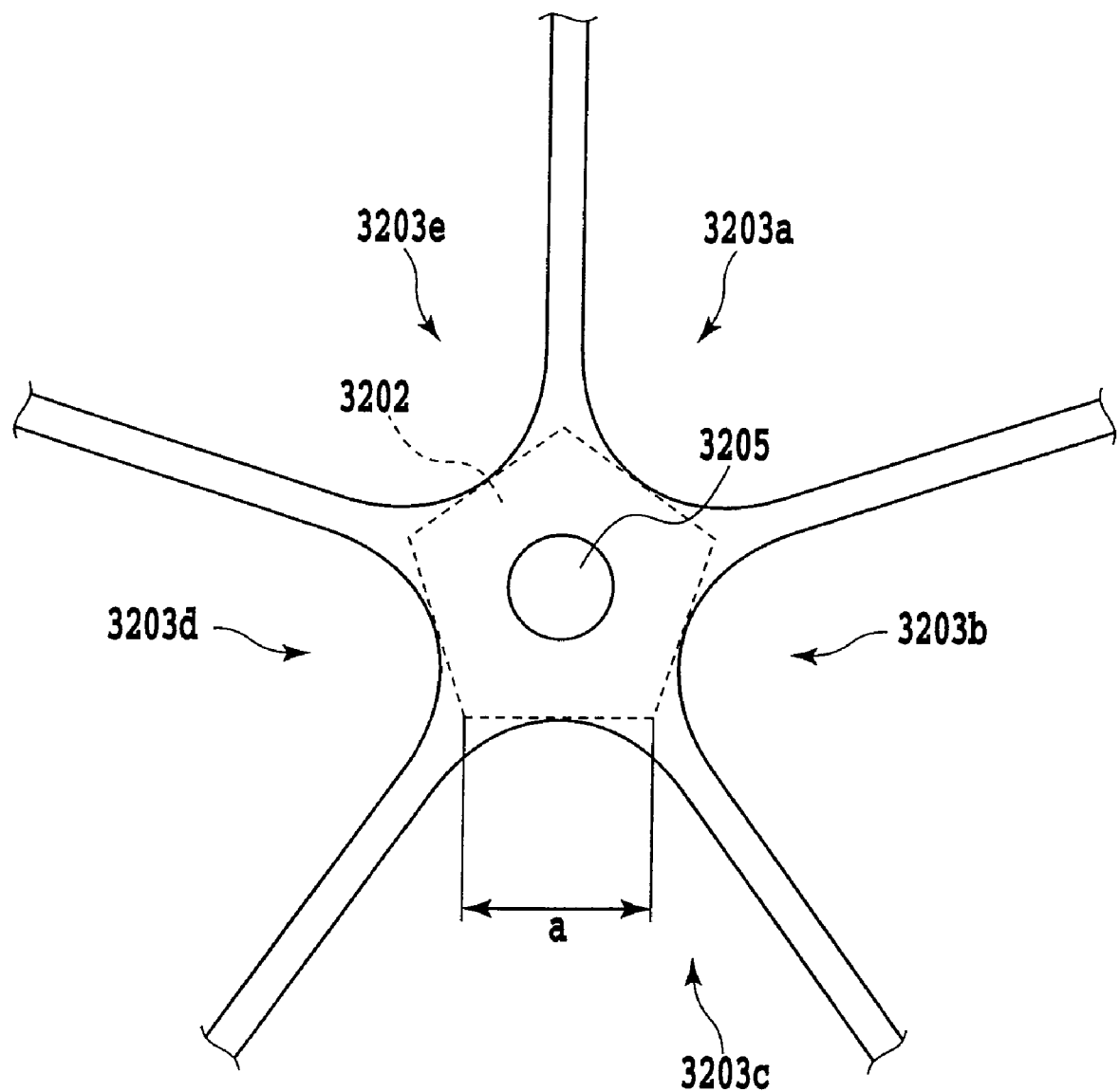
FIG. 73 is an enlarged view showing a region to become the core of the optical fiber of FIG. 72.

FIG. 73 is an enlarged view of the region to become the core of the optical fiber of FIG. 72. In the region 3202, tellurite glass 3205 is buried which is obtained by changing the composition of tellurite glass, and which has a zero-material dispersion wavelength of 2.2 μm and a refractive index higher than that of the tellurite glass 3201 by 1.1% in terms of a relative refractive-index difference. In the present example 30, the optical fiber was fabricated by the extrusion process. The outside diameter of the tellurite glass 3201 is 80 μm, the inside diameter of the air holes 3203 is 35 μm, and the core diameter is 3.9 μm. The diameter of the tellurite glass 3205 is 1.0 μm. The cross sectional area $A_{eff}$ at which the optical output becomes $1/e^2$ of the peak, is 3.4 μm², and the γ value is 690 $W^{-1}$ $km^{-1}$.

Observing the near field pattern (NFP) and far field pattern (FFP) after cutting and polishing the optical fiber makes it possible to confirm that the light is confined in the fiber central section, and the single mode is achieved.

Figure 74:
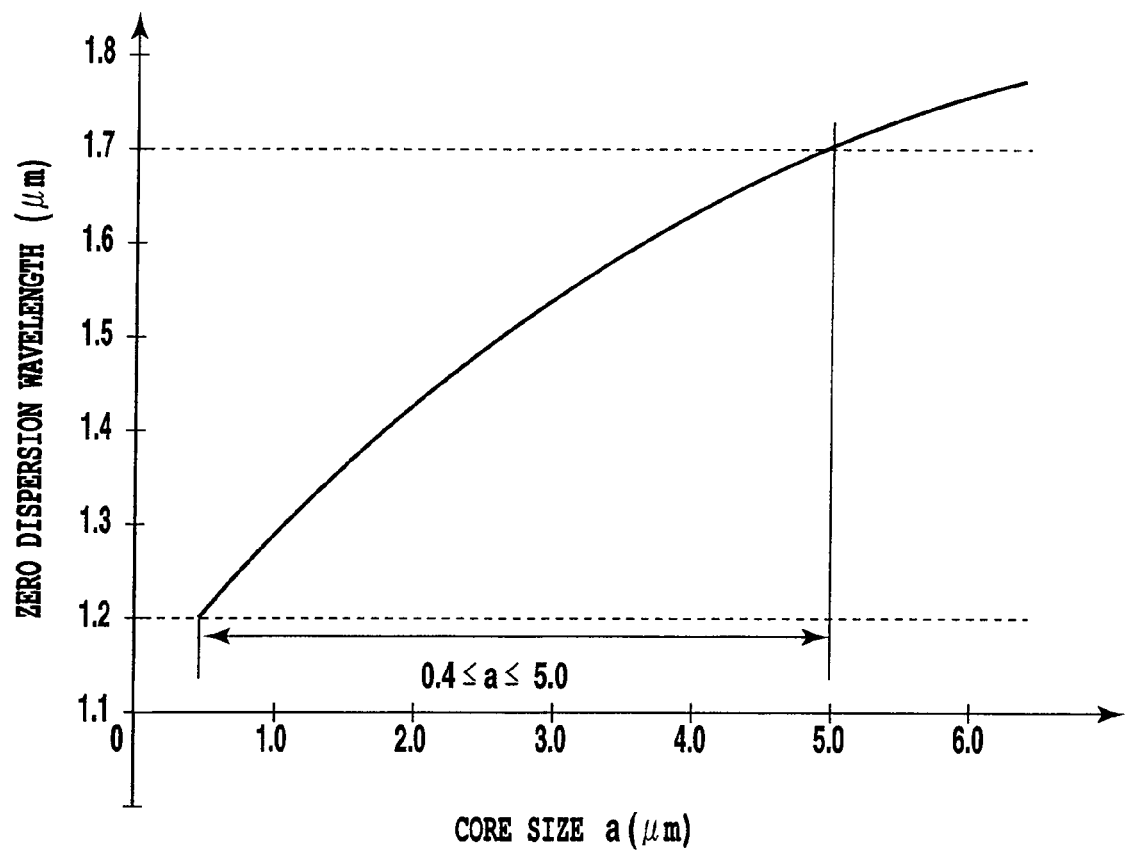
FIG. 74 is a graph illustrating relationships between the zero dispersion wavelength and core size of the optical fiber of the example 30 in accordance with the present invention.

FIG. 74 illustrates the relationships between the zero dispersion wavelength and core size obtained in the present example 30. To set the zero dispersion wavelength in the 1.2 μm-1.7 μm band, it is found that the size of the region to become the core which is surrounded by the air holes and confines the light, that is, the core diameter a, must be controlled in a range of 0.4 μm-5.0 μm.

Example 31

Figure 75:
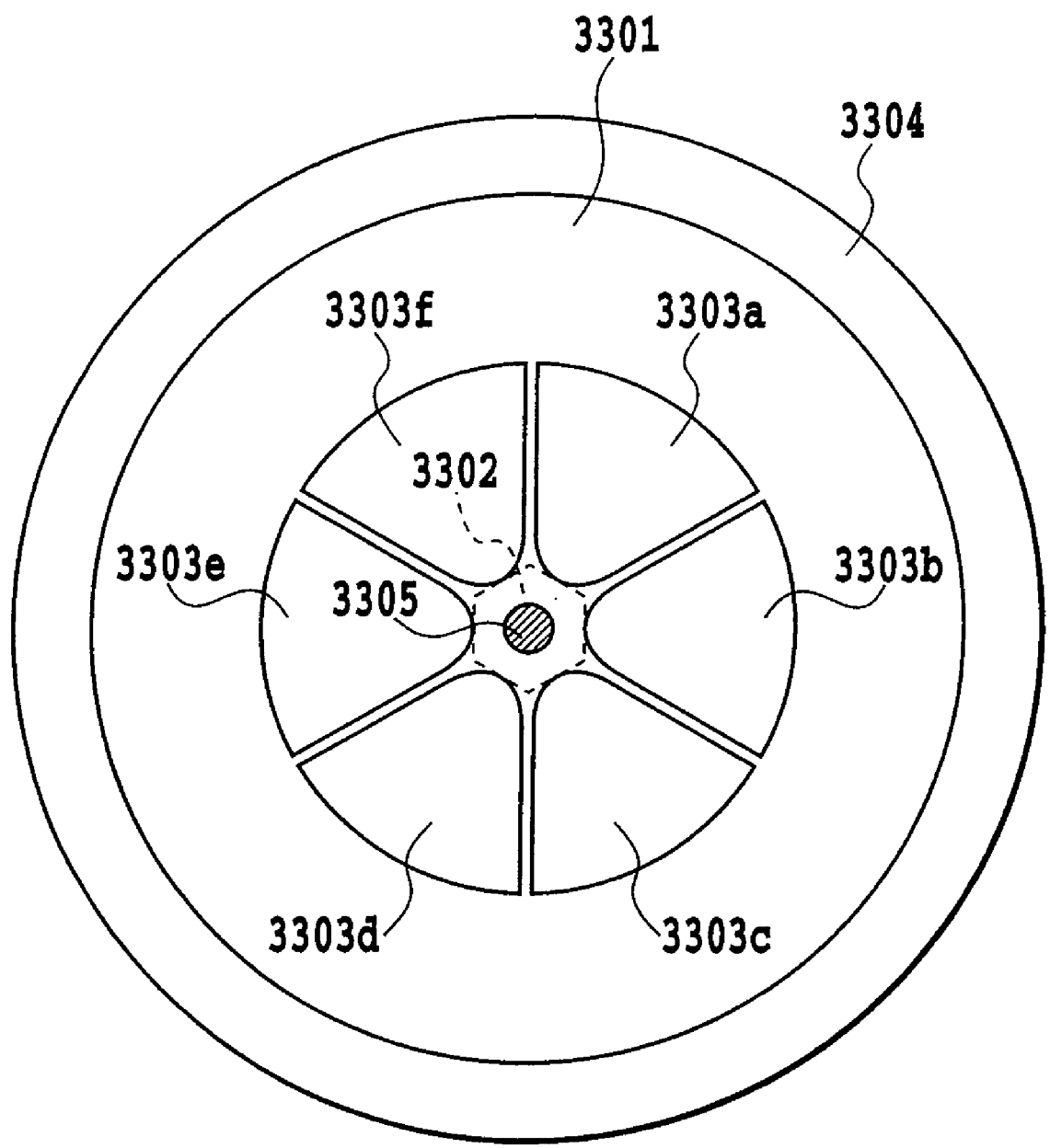
FIG. 75 is a cross-sectional view showing an optical fiber of an example 31 in accordance with the present invention.

FIG. 75 shows an optical fiber of the example 31 in accordance with the present invention. Tellurite glass 3301 with the No. 17 composition of the foregoing Table 1, which is inserted into a jacket tube 3304, has six air holes 3303a-3303f (designated by a generic number 3303) formed therein, and the air holes 3303 are filled with air so that the refractive index is approximately equal to one. The portion surrounded by the six air holes 3303 is a region 3302 to become a core for transmitting light.

Figure 76:
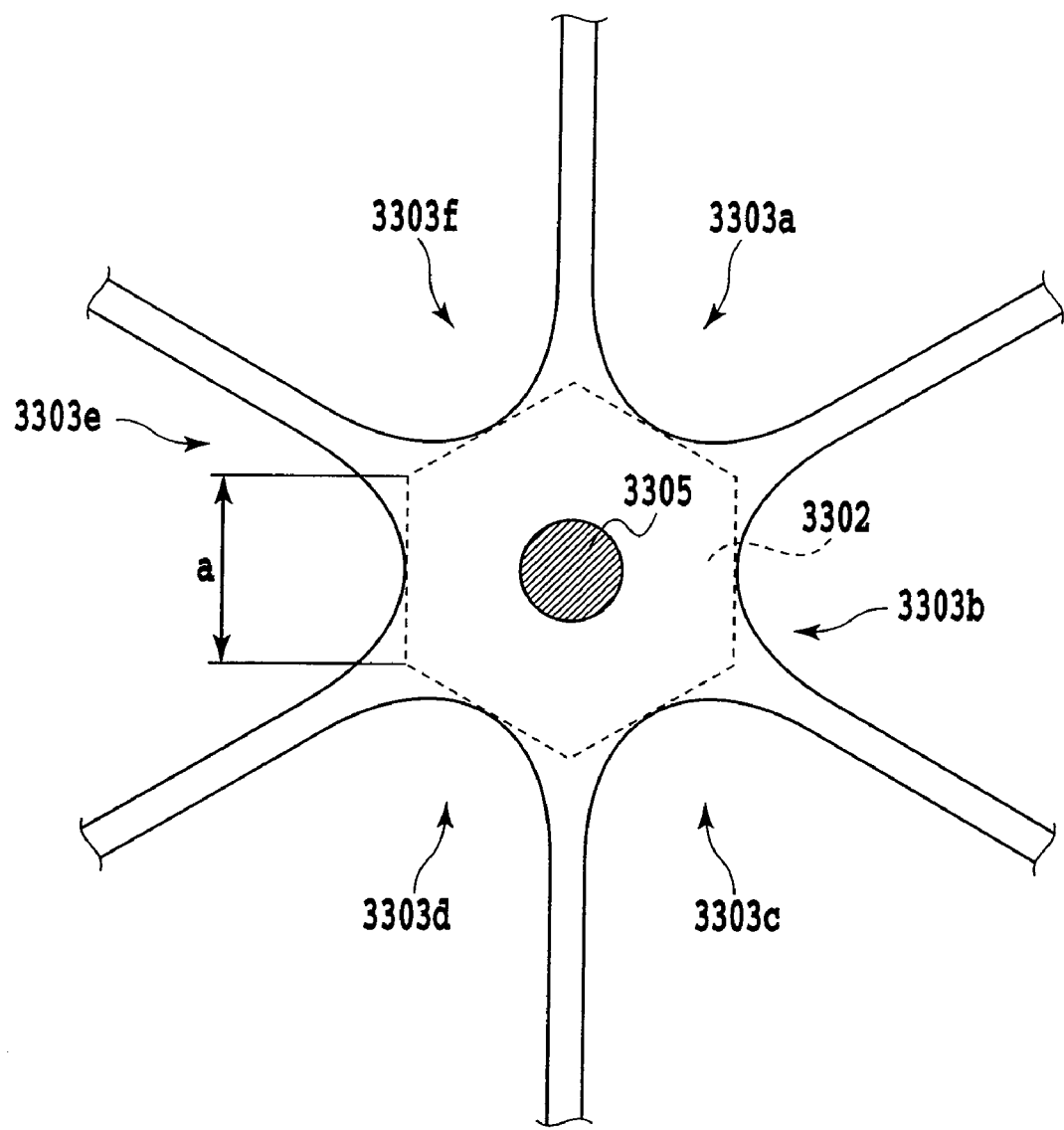
FIG. 76 is an enlarged view showing a region to become the core of the optical fiber of FIG. 75.

FIG. 76 is an enlarged view of the region to become the core of the optical fiber of FIG. 75. In the region 3302, tellurite glass 3305 is buried which is obtained by changing the composition of tellurite glass, and which has a zero-material dispersion wavelength of 2.3 μm and a refractive index lower than that of the tellurite glass 3301 by 1.5% in terms of a relative refractive-index difference. In the present example 31, the optical fiber was fabricated by the extrusion process. The outside diameter of the tellurite glass 3301 is 95 μm, the inside diameter of the air holes 3303 is 50 μm, and the core diameter is 3.0 μm. The diameter of the tellurite glass 3305 is 1.5 μm. The cross sectional area $A_{eff}$, at which the optical output becomes $1/e^2$ of the peak, is 3.5 μm², and the γ value is 680 $W^{-1}$ $km^{-1}$.

Observing the near field pattern (NFP) and far field pattern (FFP) after cutting and polishing the optical fiber makes it possible to confirm that the light is confined in the fiber central section, and the single mode is achieved.

Figure 77:
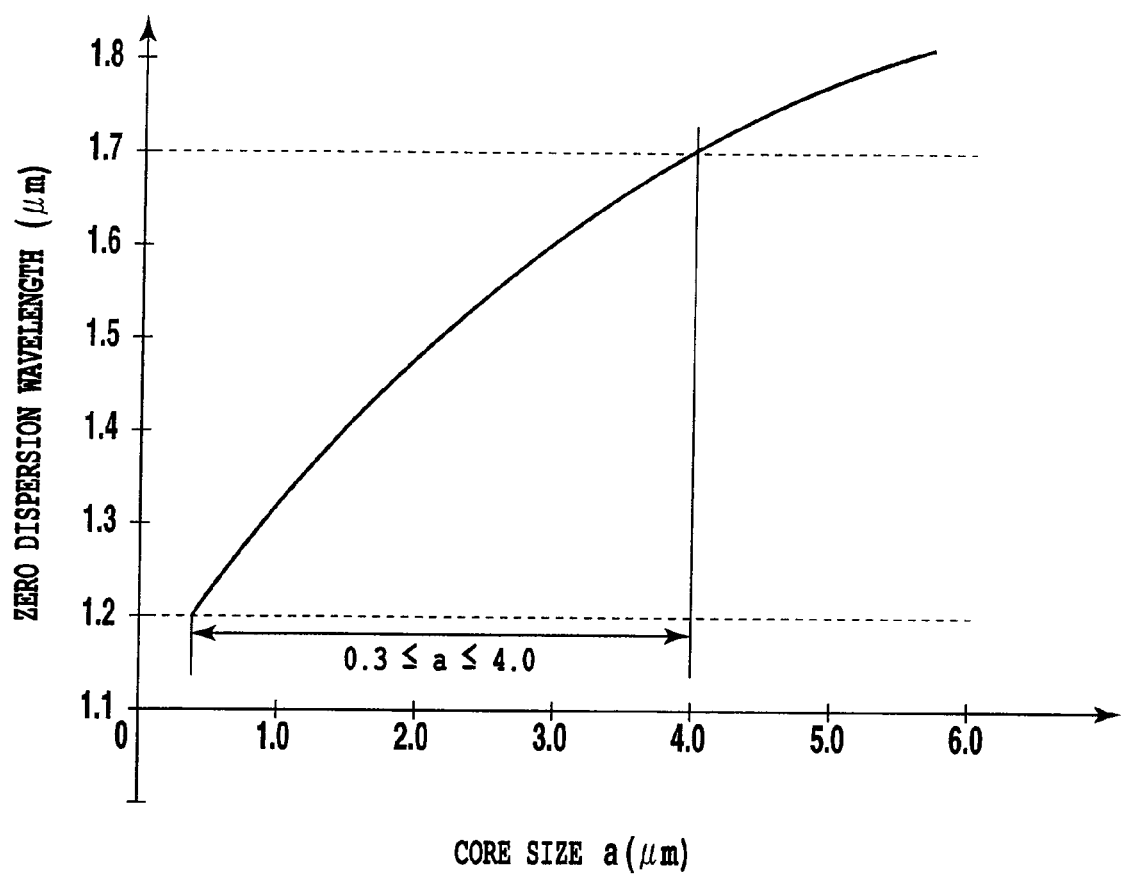
FIG. 77 is a graph illustrating relationships between the zero dispersion wavelength and core size of the optical fiber of the example 31 in accordance with the present invention.

FIG. 77 illustrates the relationships between the zero dispersion wavelength and core size obtained in the present example 31. To set the zero dispersion wavelength in the 1.2 μm-1.7 μm band, it is found that the size of the region to become the core which is surrounded by the air holes and confines the light, that is, the core diameter a, must be controlled in a range of 0.3 μm-4.0 μm.

6. Industrial Applicability

The optical fibers in accordance with the present invention, and the nonlinear devices formed by its fabrication method are effective for enhancing the performance, increasing the capacity and reducing the cost of the optical communication systems, and hence contribute to the improvement and cost reduction of the service using the systems, thereby being very useful for the optical communication industry.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical fiber composed of tellurite glass with a material zero-dispersion wavelength equal to or greater than 2 μm the optical fiber comprising:
    a core region;
    a first cladding section that is formed in such a manner as to enclose said core region, and has a plurality of air holes in a circumferential direction of said core region and along an axial direction of said core region; and
    a second cladding section that is formed in such a manner as to enclose said first cladding section, and has a refractive index approximately equal to an equivalent refractive index of said first cladding section; and
    wherein a relative refractive-index difference between said core region and said first cladding section is equal to or greater than 2%, thereby controlling a zero dispersion wavelength at a 1.55 μm band which is an optical telecommunication window.

2. An optical fiber composed of tellurite glass with a material zero-dispersion wavelength equal to or greater than 2 μm and having a composition of $TeO_2$—$Bi_2O_3$-LO-$M_2O$—$N_2O_3$-$O_2O_5$, where
    L is at least one of Zn, Ba and Mg,
    M is at least one alkaline element selected from Li, Na, K, Rb and Cs,
    N is at least one of B, La, Ga, Al and Y, and
    Q is at least one of P and Nb, and
    components of said tellurite glass are
    $50 < TeO_2 < 90$ (mol %),
    $1 < Bi_2O_3 < 30$ (mol %), and
    $1 < LO + M_2O + N_2O_3 + Q_2O_5 < 50$ (mol %),
    wherein said optical fiber comprises:
    a core region;
    a first cladding section that is formed in such a manner as to enclose said core region, and has a plurality of air holes in a circumferential direction of said core region and along an axial direction of said core region; and
    a second cladding section that is formed in such a manner as to enclose said first cladding section, and has a refractive index approximately equal to an equivalent refractive index of said first cladding section; and
    wherein a relative refractive-index difference between said core region and said first cladding section is equal to or greater than 2%, thereby controlling a zero dispersion wavelength at a 1.55 μm band which is an optical telecommunication window.

3. An optical fiber composed of tellurite glass with a material zero-dispersion wavelength equal to or greater than 2 μm and having a composition of $TeO_2$—$Bi_2O_3$-LO-$M_2O$—$N_2O_3$-$O_2O_5$, where
    L is at least one of Zn, Ba and Mg,
    M is at least one alkaline element selected from Li, Na, K, Rb and Cs,
    N is at least one of B, La, Ga, Al and Y, and
    Q is at least one of P and Nb, and
    components of said tellurite glass are
    $50 < TeO_2 < 90$ (mol %),
    $1 < Bi_2O_3 < 30$ (mol %), and
    $1 < LO + M_2O + N_2O_3 + Q_2O_5 < 50$ (mol %),
    wherein said tellurite material glass is doped with at least one type of rare-earth ions selected from $Ce^{3+}$, $Pr^{3+}$, $Nd^{3+}$, $Pm^{3+}$, $Sm^{3+}$, $Eu^{3+}$, $Tb^{3+}$, $Dy^{3+}$, $Ho^{3+}$, $Er^{3+}$, $Tm^{3+}$ and $Yb^{3+}$, and
    wherein said optical fiber comprises:
    a core region;
    a first cladding section that is formed in such a manner as to enclose said core region, and has a plurality of air holes in a circumferential direction of said core region and along an axial direction of said core region; and
    a second cladding section that is formed in such a manner as to enclose said first cladding section, and has a refractive index approximately equal to an equivalent refractive index of said first cladding section; and
    wherein a relative refractive-index difference between said core region and said first cladding section is equal to or greater than 2%, thereby controlling a zero dispersion wavelength at a 1.55 μm band which is an optical telecommunication window.

4. The optical fiber as claimed in claim 1, wherein said air holes of said first cladding section are formed at fixed intervals along the circumferential direction of said core region.

5. The optical fiber as claimed in claim 2, wherein said air holes of said first cladding section are formed at fixed intervals along the circumferential direction of said core region.

6. The optical fiber as claimed in claim 3, wherein said air holes of said first cladding section are formed at fixed intervals along the circumferential direction of said core region.

7. The optical fiber as claimed in claim 1, wherein said air holes of said first cladding section are formed in a multilayer fashion in a radial direction of said first cladding section.

8. The optical fiber as claimed in claim 2, wherein said air holes of said first cladding section are formed in a multilayer fashion in a radial direction of said first cladding section.

9. The optical fiber as claimed in claim 3, wherein said air holes of said first cladding section are formed in a multilayer fashion in a radial direction of said first cladding section.

10. The optical fiber as claimed in claim 1, wherein said air holes of said first cladding section are filled with a material having a refractive index lower than a refractive index of said second cladding section.

11. The optical fiber as claimed in claim 2, wherein said air holes of said first cladding section are filled with a material having a refractive index lower than a refractive index of said second cladding section.

12. The optical fiber as claimed in claim 3, wherein said air holes of said first cladding section are filled with a material having a refractive index lower than a refractive index of said second cladding section.

13. The optical fiber as claimed in claim 1, wherein said core region has a refractive index higher than a refractive index of a material of said first cladding section.

14. The optical fiber as claimed in claim 2, wherein said core region has a refractive index higher than a refractive index of a material of said first cladding section.

15. The optical fiber as claimed in claim 3, wherein said core region has a refractive index higher than a refractive index of a material of said first cladding section.

16. The optical fiber as claimed in claim 1, wherein a central section to become said core has tellurite glass, a refractive index of which differs from the refractive index of said tellurite glass, embedded in said central section.

17. The optical fiber as claimed in claim 2, wherein a central section to become said core has tellurite glass, a refractive index of which differs from the refractive index of said tellurite glass, embedded in said central section.

18. The optical fiber as claimed in claim 3, wherein a central section to become said core has tellurite glass, a refractive index of which differs from the refractive index of said tellurite glass, embedded in said central section.

* * * * *